US012541532B1

(12) United States Patent
Stolze et al.

(10) Patent No.: US 12,541,532 B1
(45) Date of Patent: Feb. 3, 2026

(54) EXTERNAL CONTROL FOR STRUCTURED QUERY LANGUAGE (SQL) STATEMENT EXECUTION

(71) Applicant: Ocient Holdings LLC, Chicago, IL (US)

(72) Inventors: Knut Stolze, Jena (DE); Brendan J. Batliner, Chicago, IL (US); Stefan Renner, Munich (DE)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/790,308

(22) Filed: Jul. 31, 2024

(51) Int. Cl.
*G06F 16/27* (2019.01)
*G06F 16/2455* (2019.01)

(52) U.S. Cl.
CPC .......... *G06F 16/27* (2019.01); *G06F 16/2455* (2019.01)

(58) Field of Classification Search
CPC ............................. G06F 16/27; G06F 16/2455
USPC ........................................................ 707/626
See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,633,772 B2 | 10/2003 | Ford | |
| 7,499,907 B2 | 3/2009 | Brown | |
| 7,908,242 B1 | 3/2011 | Achanta | |
| 2001/0051949 A1 | 12/2001 | Carey | |
| 2002/0032676 A1 | 3/2002 | Reiner | |
| 2004/0162853 A1 | 8/2004 | Brodersen | |
| 2008/0133456 A1 | 6/2008 | Richards | |
| 2009/0063893 A1 | 3/2009 | Bagepalli | |
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |

(Continued)

OTHER PUBLICATIONS

A new high performance fabric for HPC, Michael Feldman, May 2016, Intersect360 Research.

(Continued)

*Primary Examiner* — Robert W Beausoliel, Jr.
*Assistant Examiner* — Lauren Zannah Ganger
(74) *Attorney, Agent, or Firm* — GARLICK & MARKISON; Timothy W. Markison

(57) ABSTRACT

A method for execution by a database system to improve testing, the method includes creating a synchronization database object (SDO) indicating a set of conditions for suspension of execution of queries. The method further includes establishing a first and second session, where the first session applies the SDO to a query expression and the second session monitors the SDO. The method further includes initiating, via the first session, execution of queries, and suspending the execution of queries when detecting a condition is met. The method further includes updating, via the first session, at least one relational database table to include monitoring data indicating suspension of the queries. The method further includes the second session verifying the suspension and instructing the SDO to resume suspended queries. The method further includes resuming, via the first session, the queries until a next condition is met or execution of the queries is finished.

20 Claims, 53 Drawing Sheets

(56) References Cited

U.S. PATENT DOCUMENTS

| | | |
|---|---|---|
| 2011/0219169 A1 | 9/2011 | Zhang |
| 2012/0109888 A1 | 5/2012 | Zhang |
| 2012/0151118 A1 | 6/2012 | Flynn |
| 2012/0185866 A1 | 7/2012 | Couvee |
| 2012/0254252 A1 | 10/2012 | Jin |
| 2012/0311246 A1 | 12/2012 | Mcwilliams |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2015/0205607 A1 | 7/2015 | Lindholm |
| 2015/0244804 A1 | 8/2015 | Warfield |
| 2015/0248366 A1 | 9/2015 | Bergsten |
| 2015/0293966 A1 | 10/2015 | Cai |
| 2015/0310045 A1 | 10/2015 | Konik |
| 2016/0034547 A1 | 2/2016 | Lerios |
| 2024/0419649 A1* | 12/2024 | Geiselhart ........... G06F 16/2455 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

International Searching Authority; International Search Report and Written Opinion; International Application No. PCT/US2017/066145; Mar. 5, 2018; 13 pgs.

International Searching Authority; International Search Report and Written Opinion; International Application No. PCT/US2017/066169; Mar. 6, 2018; 15 pgs.

International Searching Authority; International Search Report and Written Opinion; International Application No. PCT/US2018/025729; Jun. 27, 2018; 9 pgs.

International Searching Authority; International Search Report and Written Opinion; International Application No. PCT/US2018/034859; Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37 node 37 data set

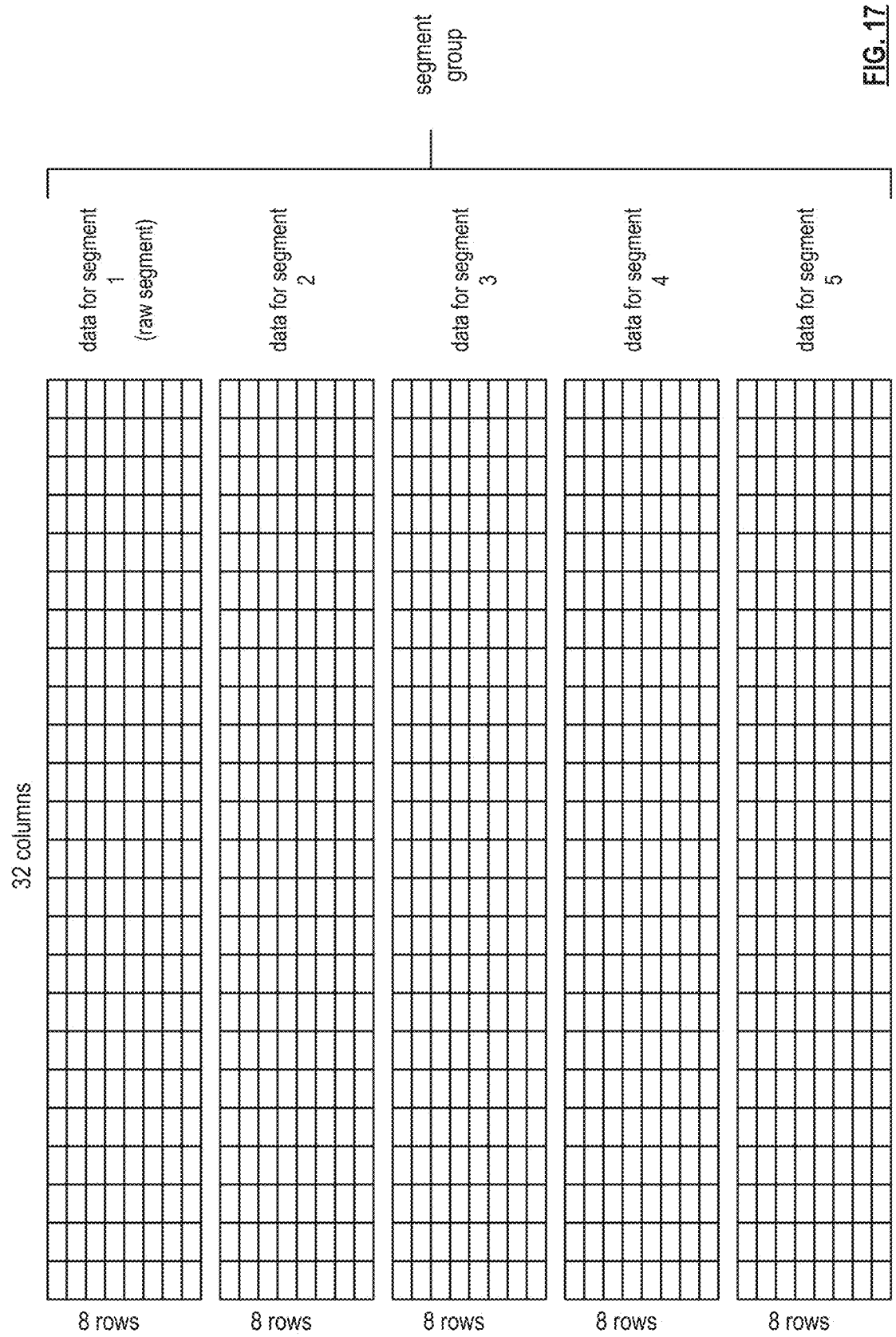

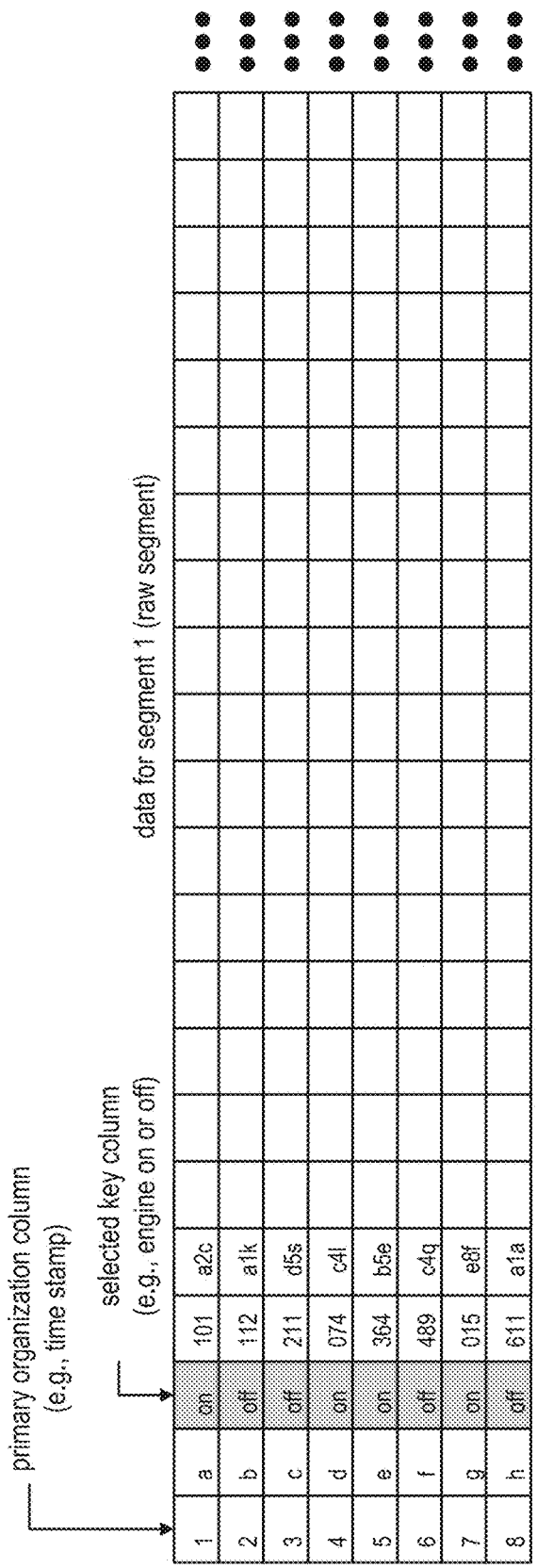

FIG. 21 query processing system 2502

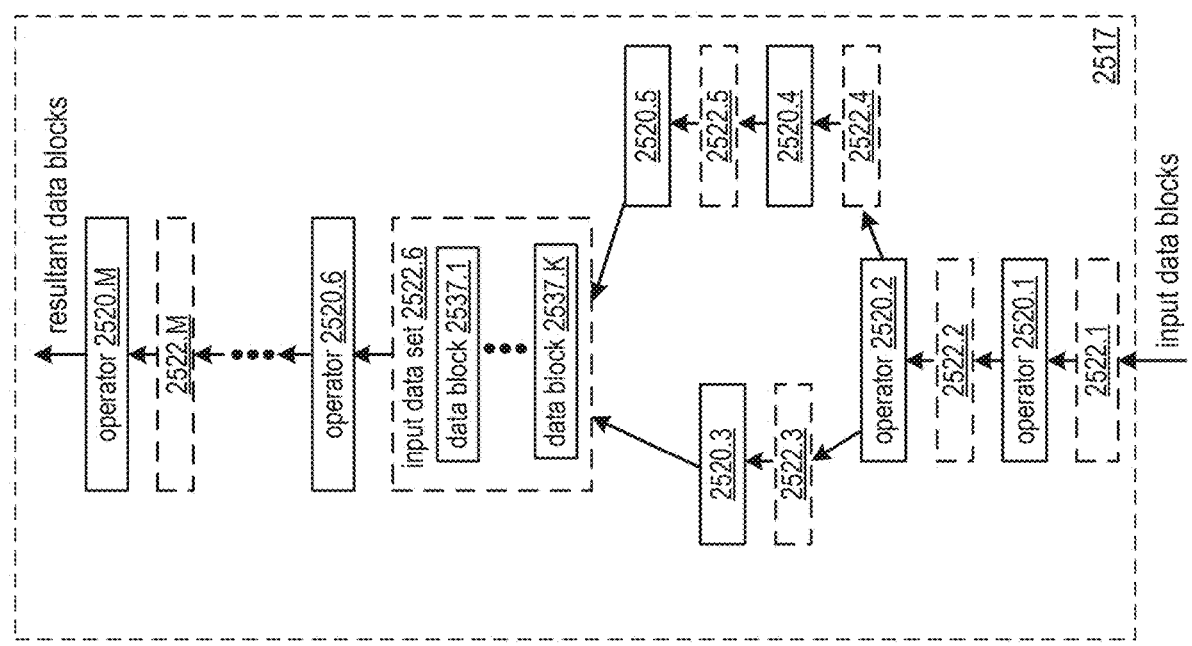

database system 10 database system 10 query execution module 2504 database system 10

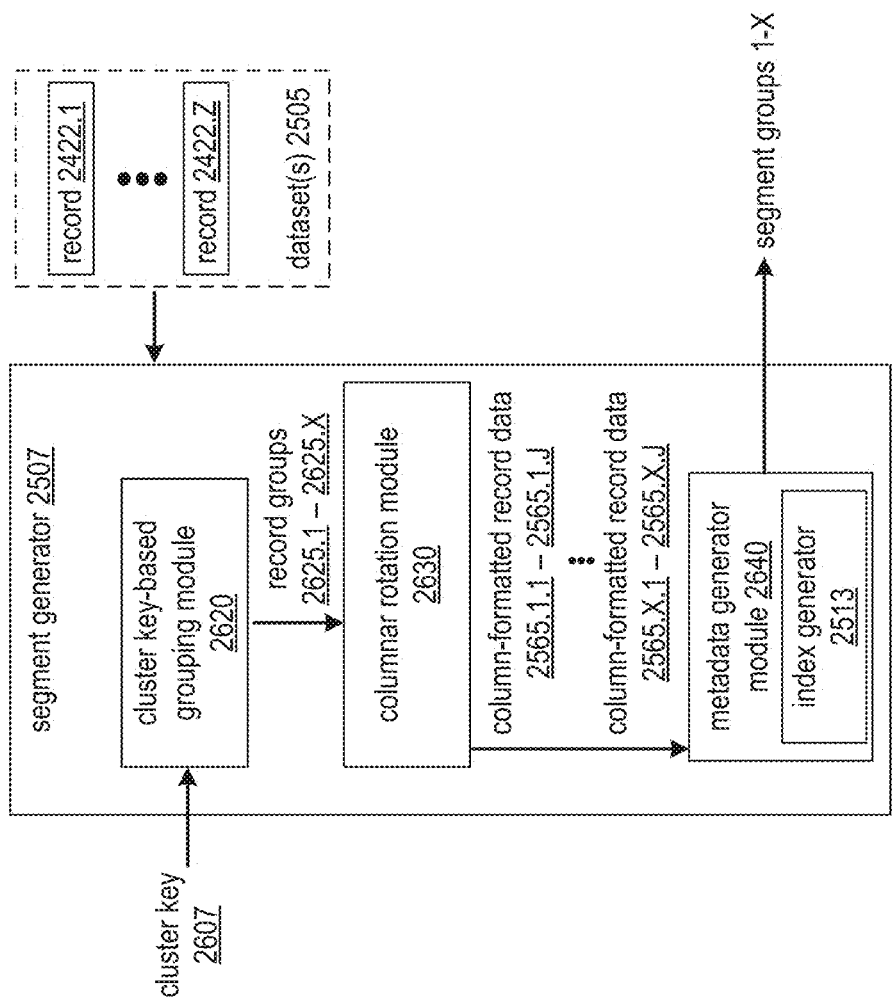

query processing system 2510 query processing system 2510 database system 10 database system 10 database system 10 data ingress module 3505 data ingress module 3505

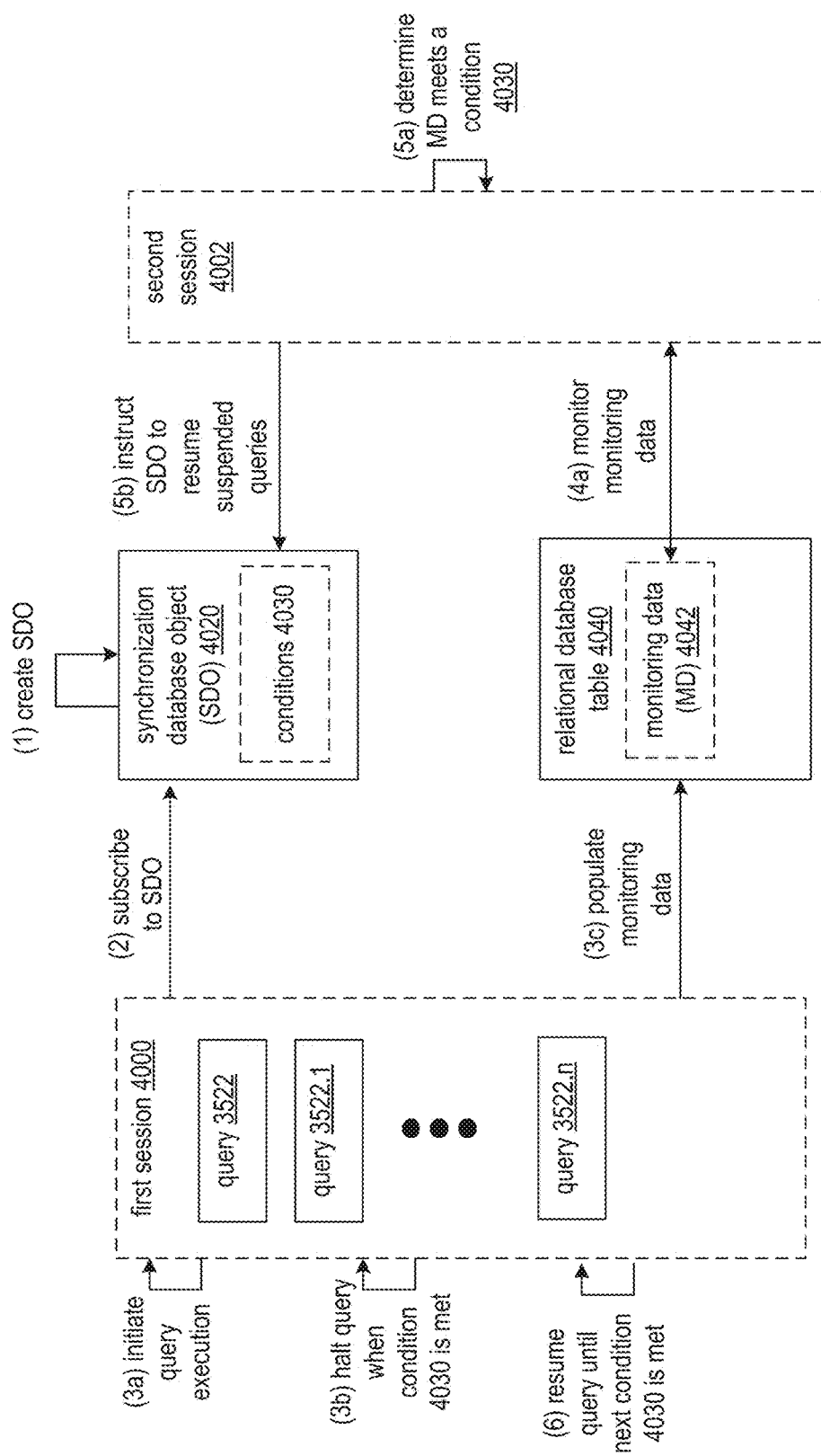
FIG. 26A database system 10

EXTERNAL CONTROL FOR STRUCTURED QUERY LANGUAGE (SQL) STATEMENT EXECUTION

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

FIG. 24H is a schematic block diagram of a query operator execution flow in accordance with various embodiments;

FIG. 24Q is a schematic block diagram of a segment generator that implements a cluster key-based grouping module, a columnar rotation module, and a metadata generator module in accordance with various embodiments;

FIG. 26A is a schematic block diagram of a database system utilizing external control for SQL statement execution in accordance with various embodiments.

DETAILED DESCRIPTION OF THE INVENTION

Figure 1:
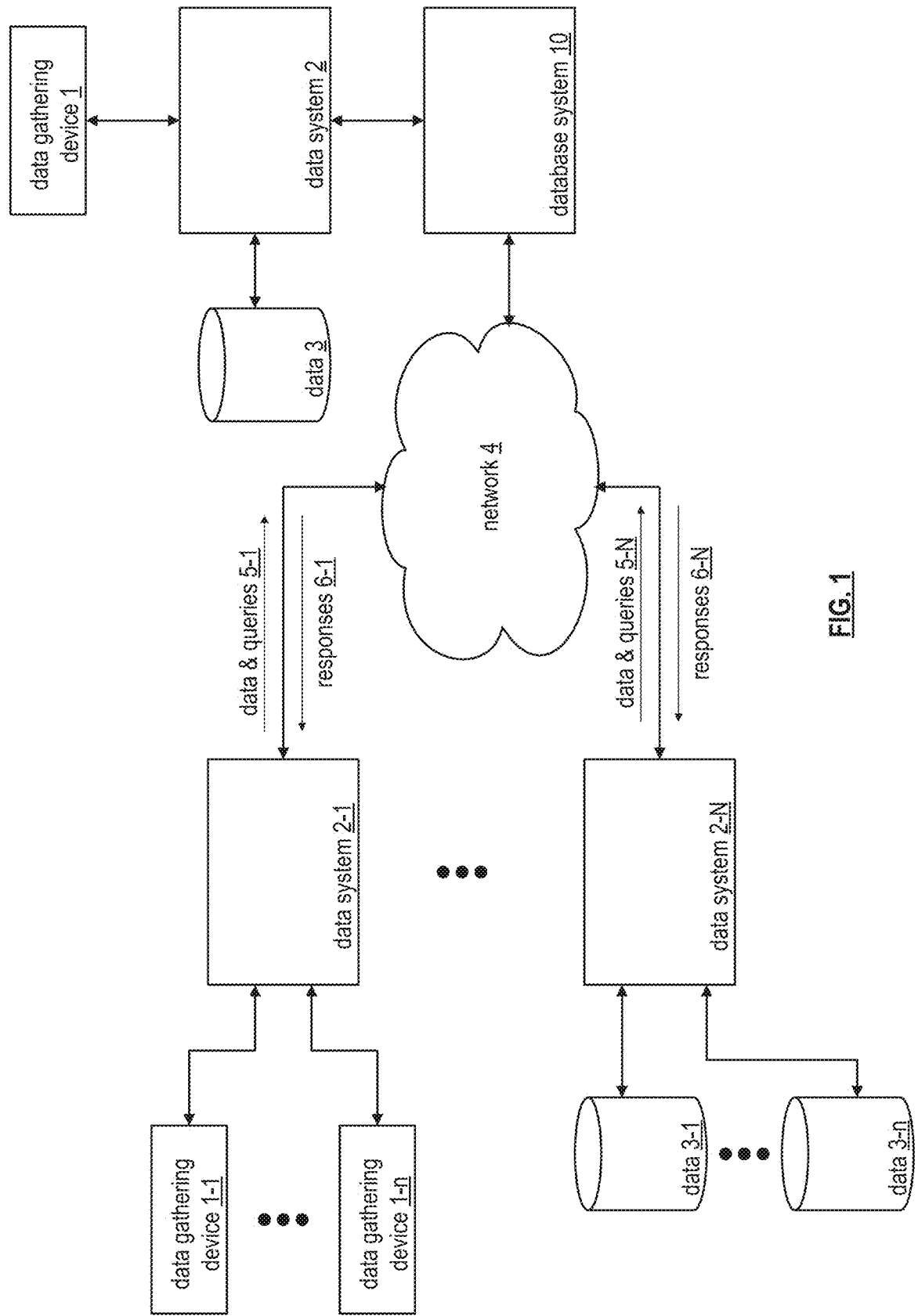
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-$n$), data systems (2, 2-1 through 2-N), data storage systems (3, 3-1 through 3-$n$), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
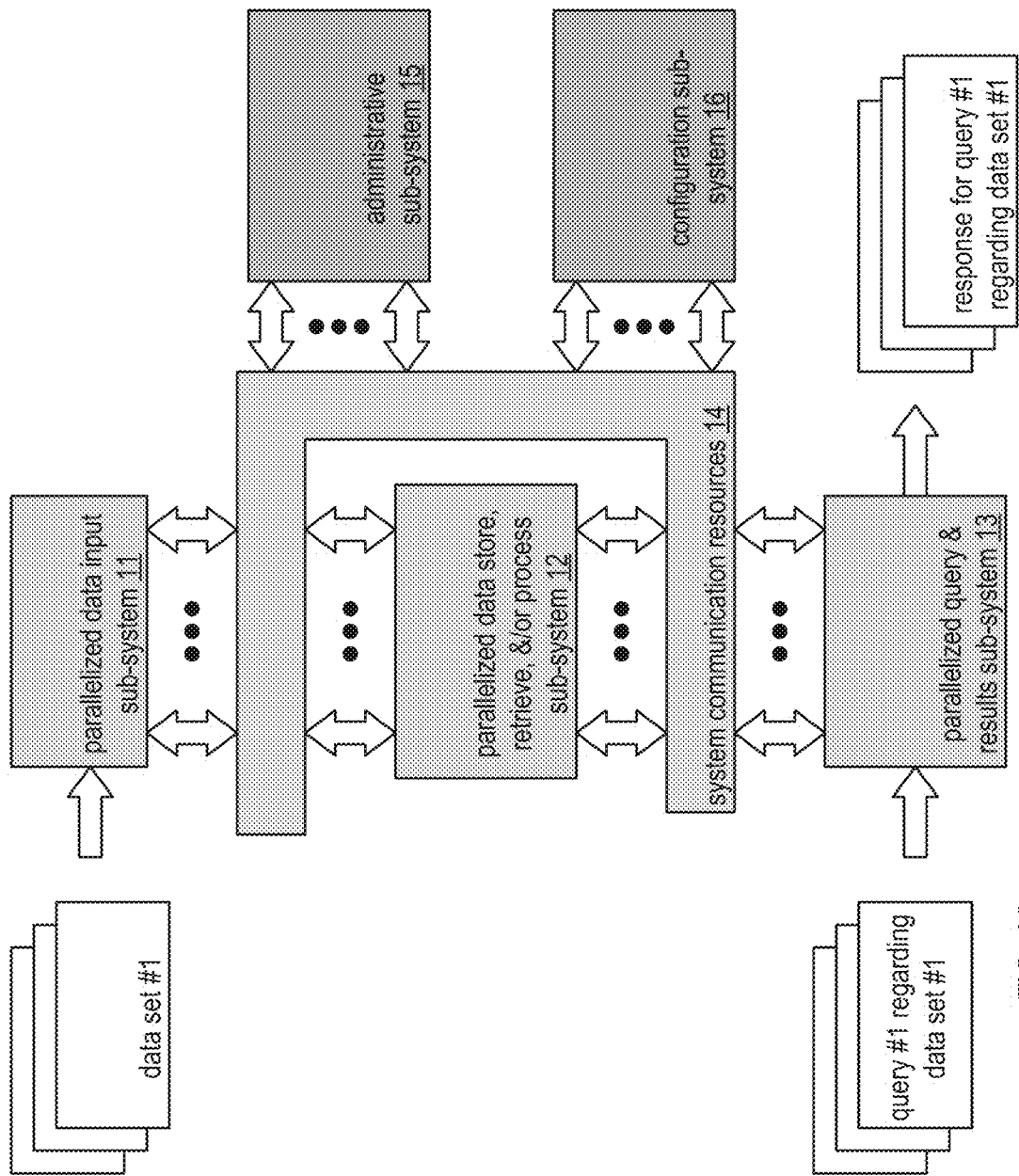
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of: wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
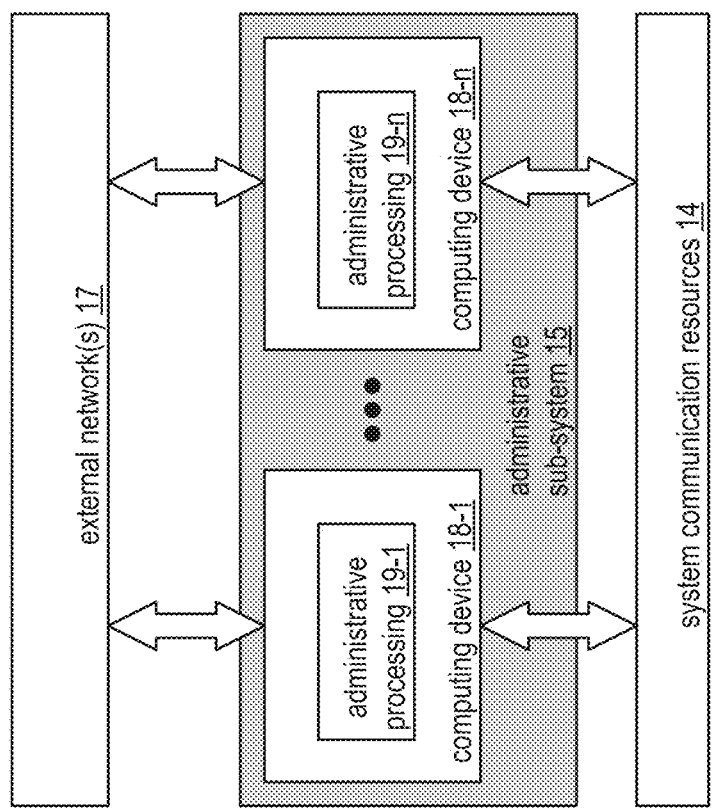
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
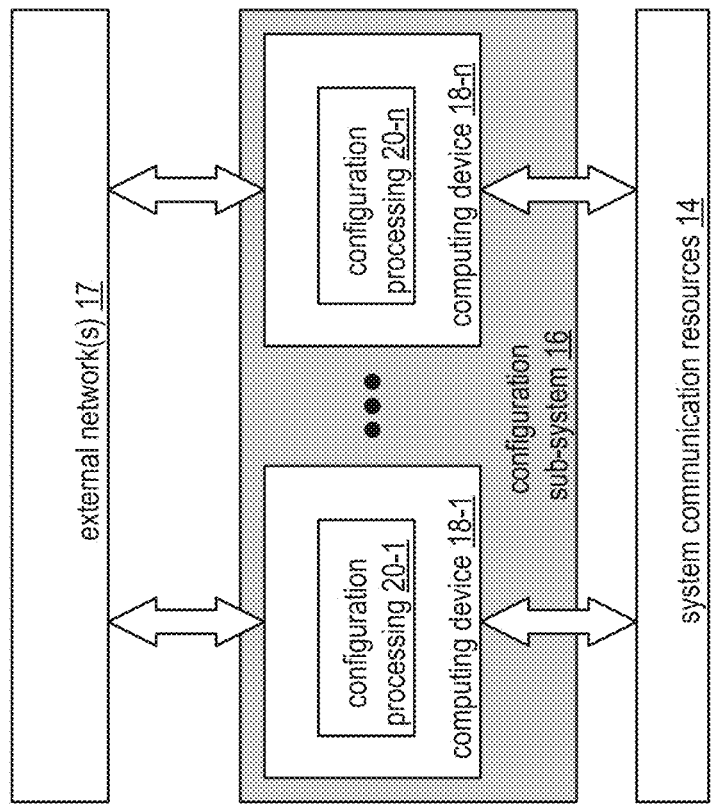
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
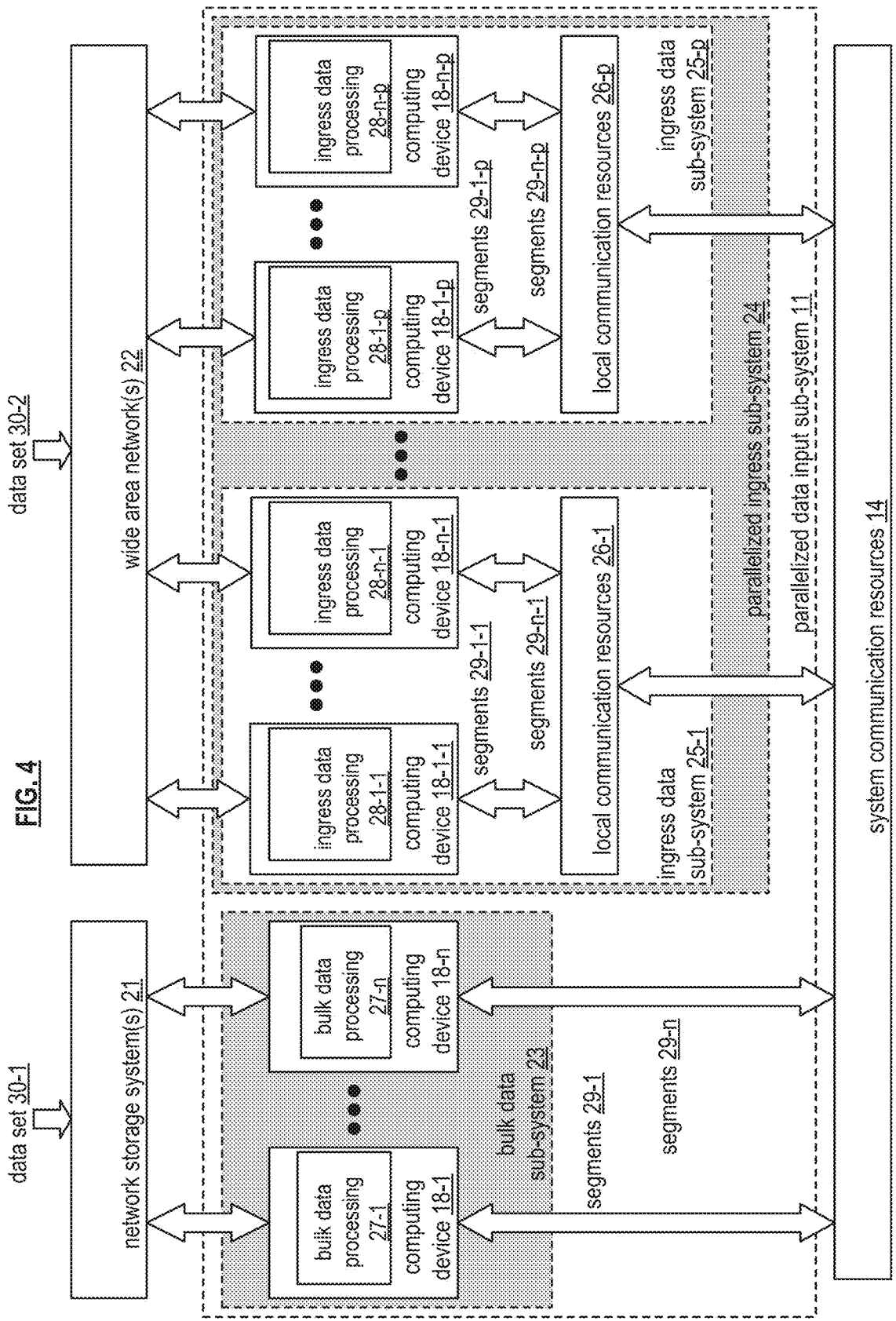
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
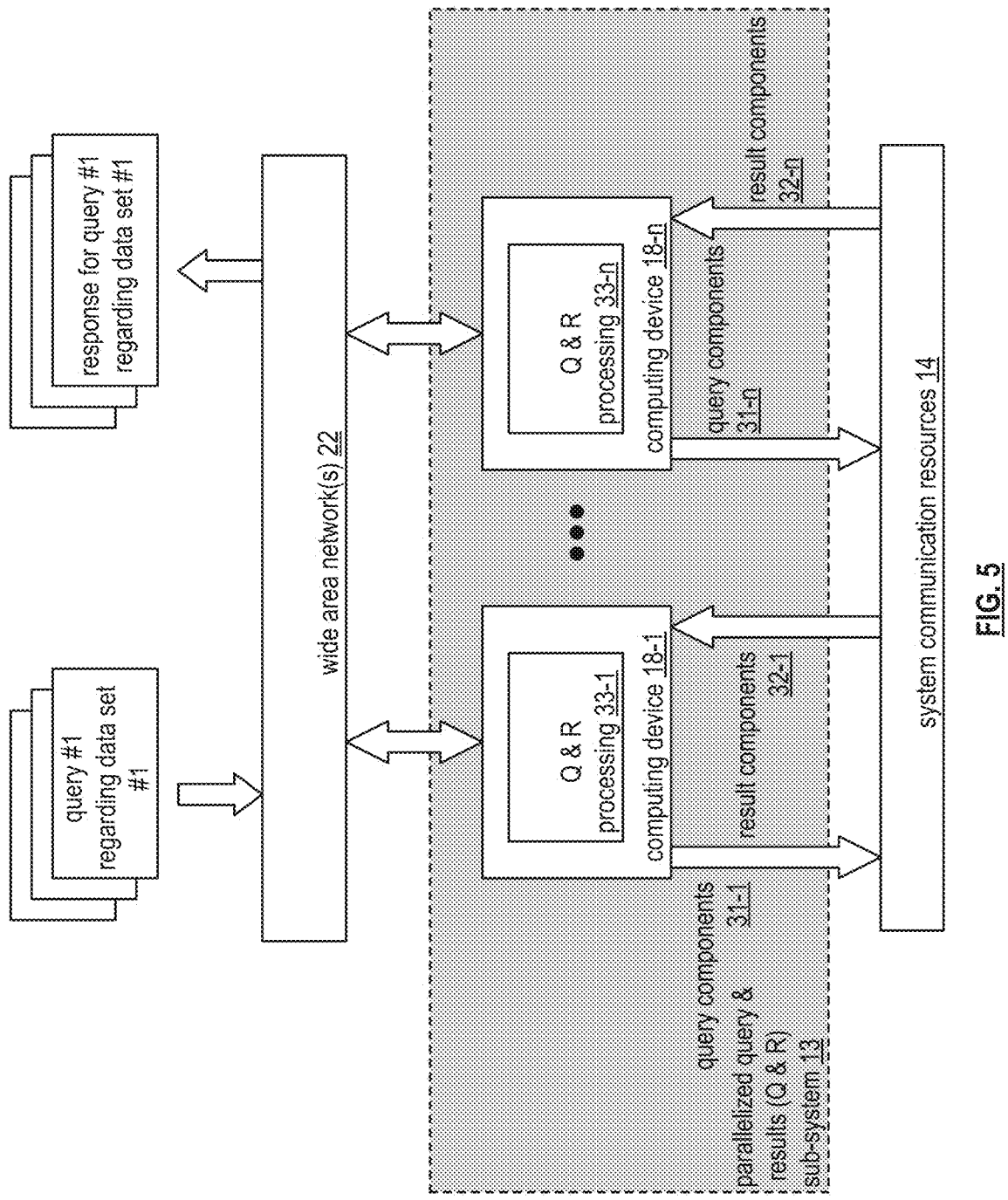
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
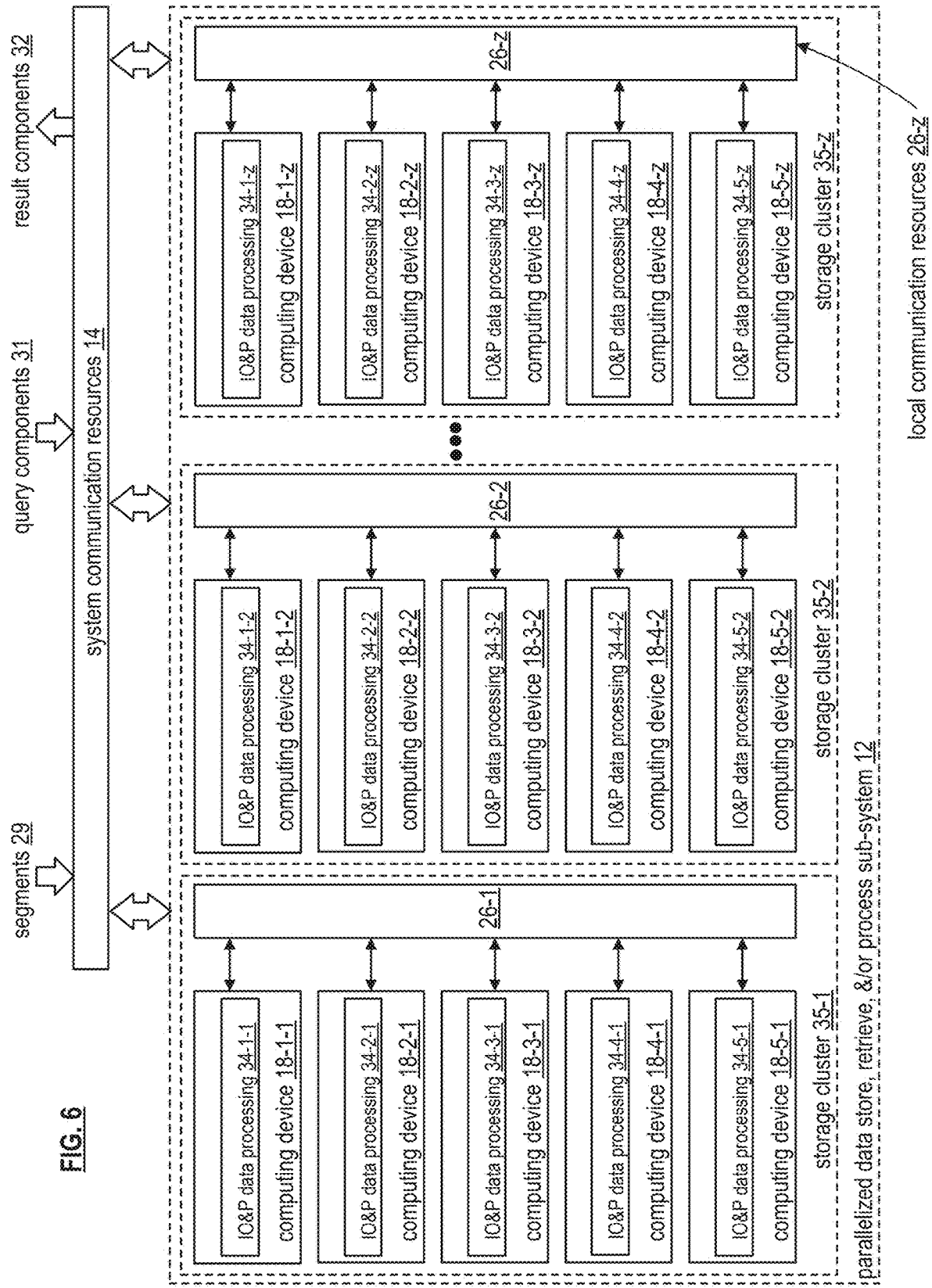
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
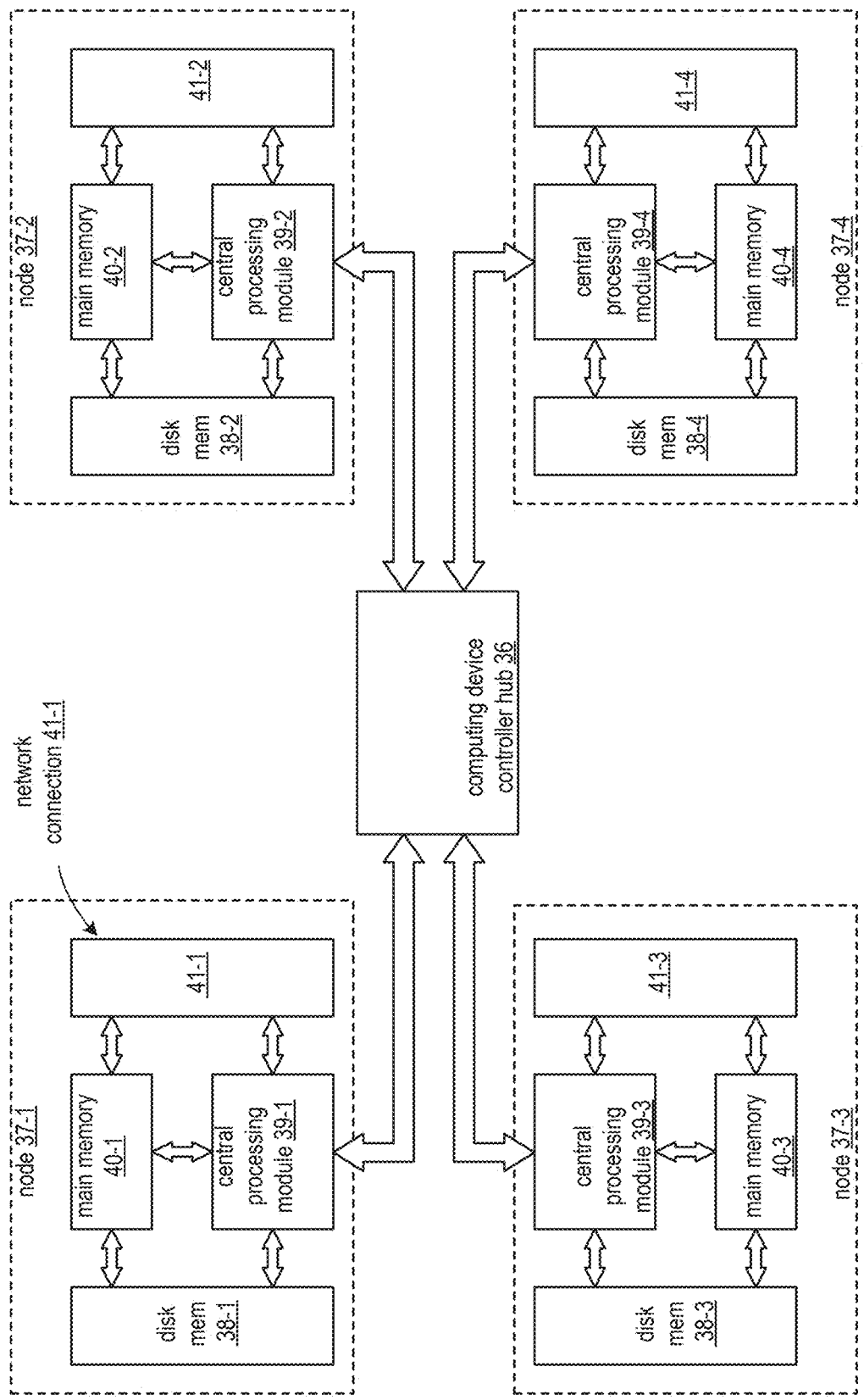
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
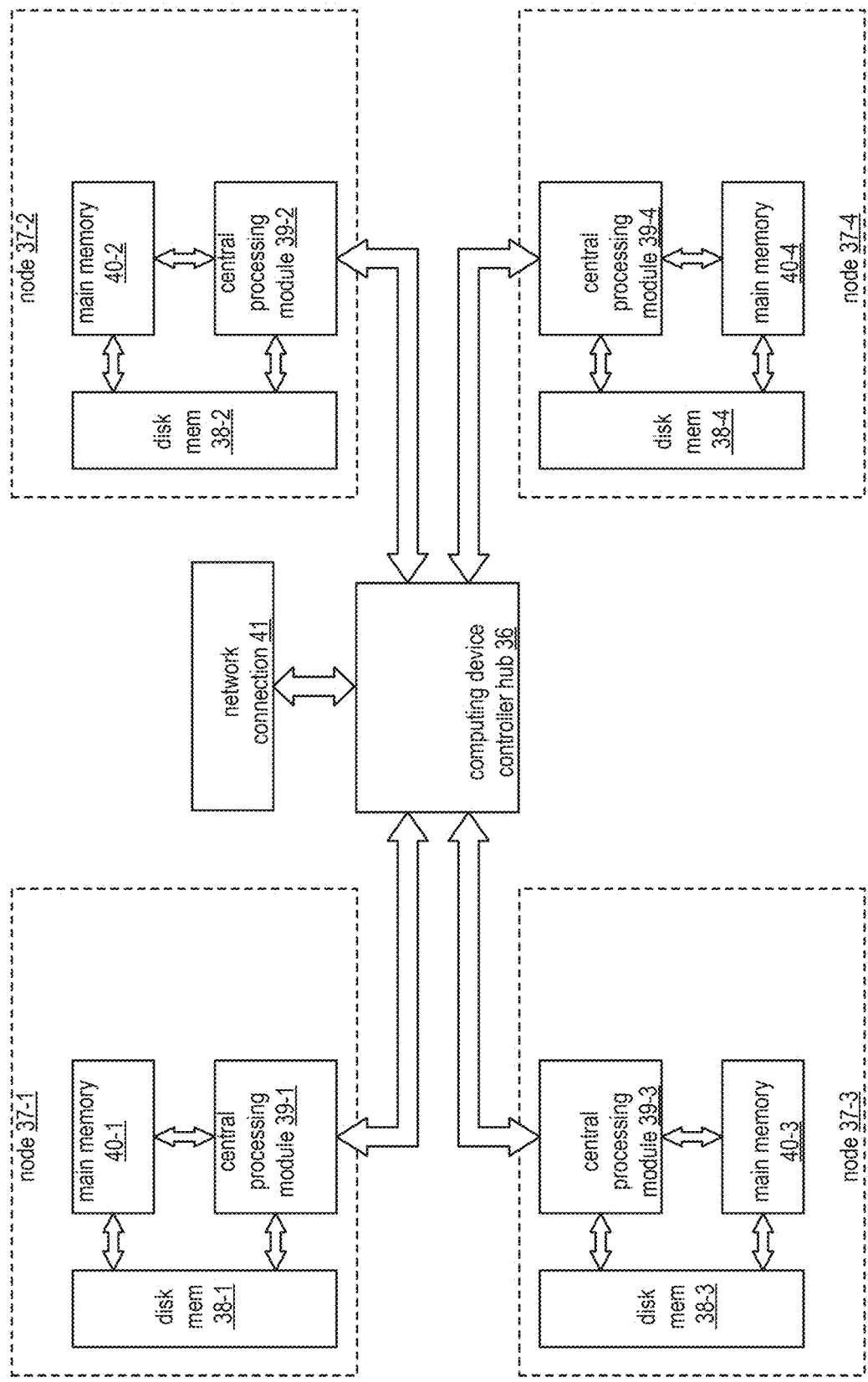
FIG. 8 is a schematic block diagram of another embodiment of a computing device in accordance with various embodiments.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
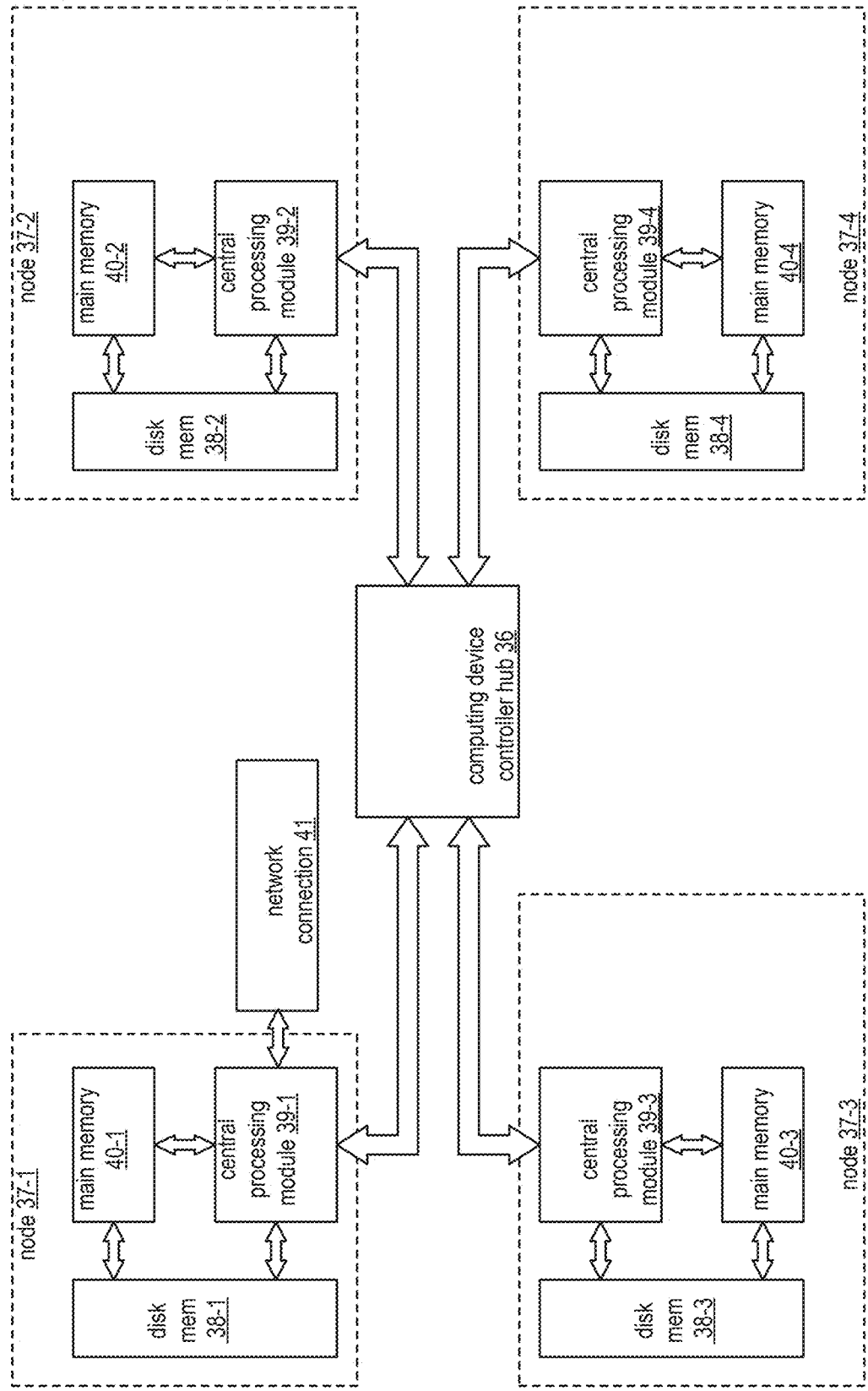
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
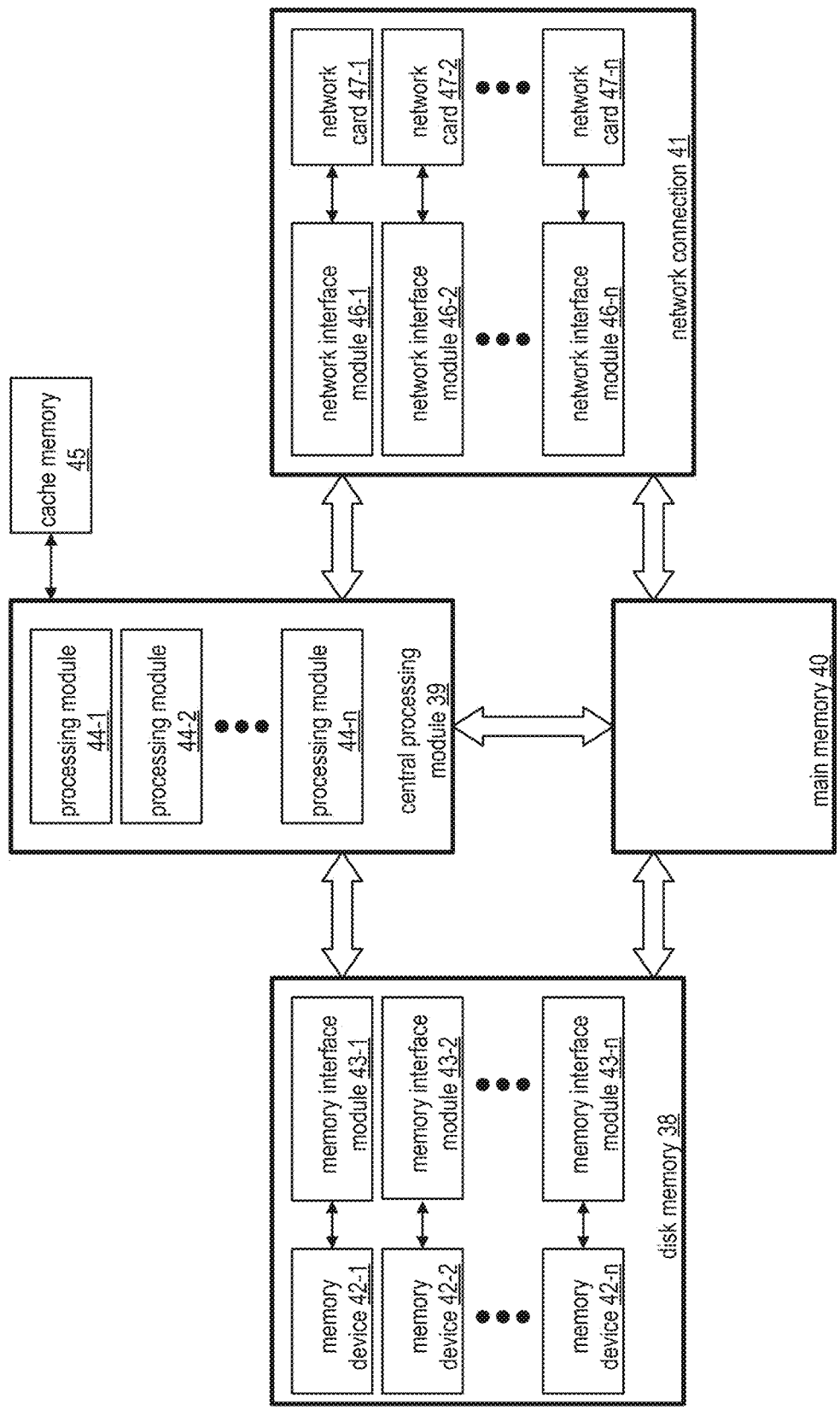
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
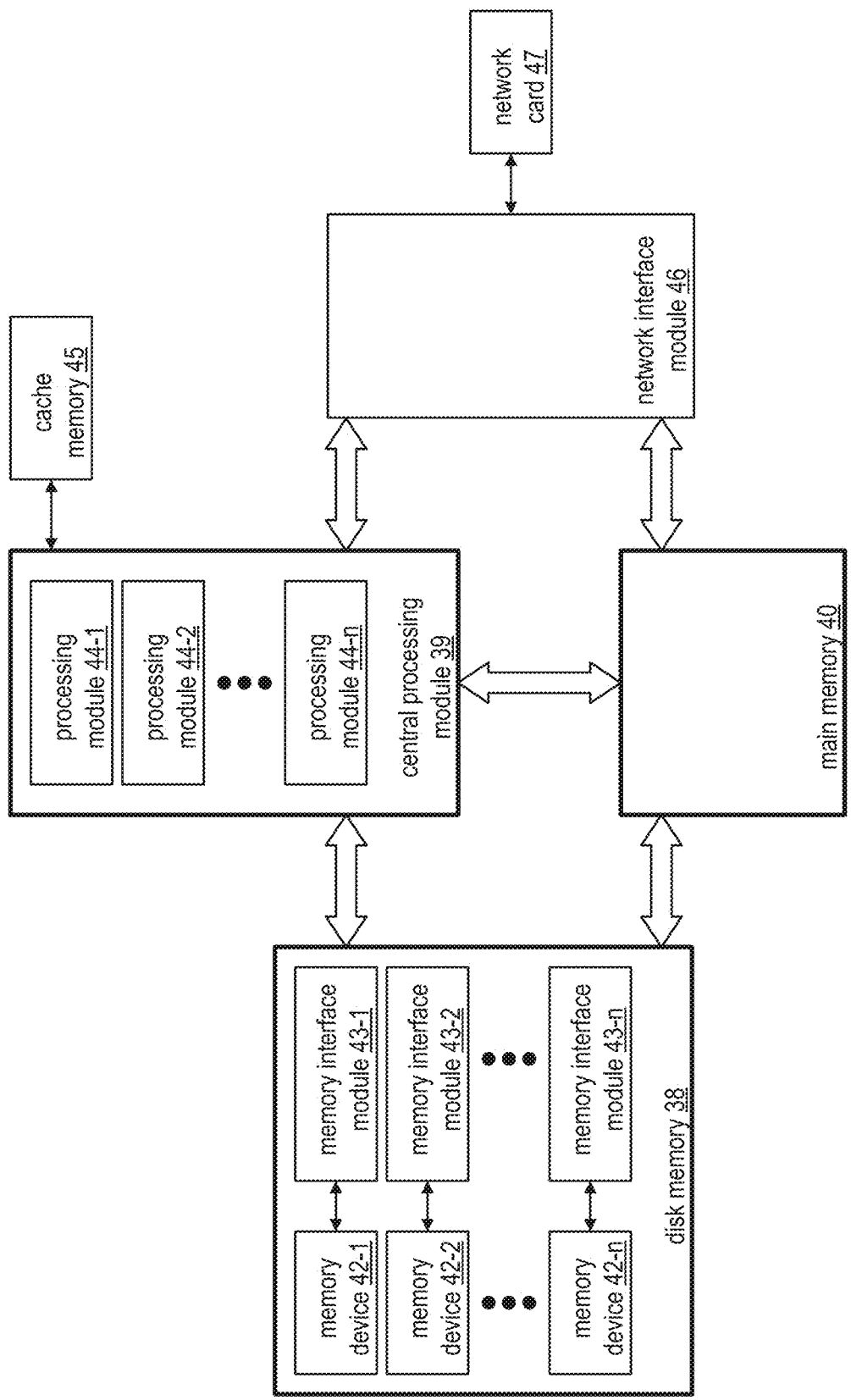
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
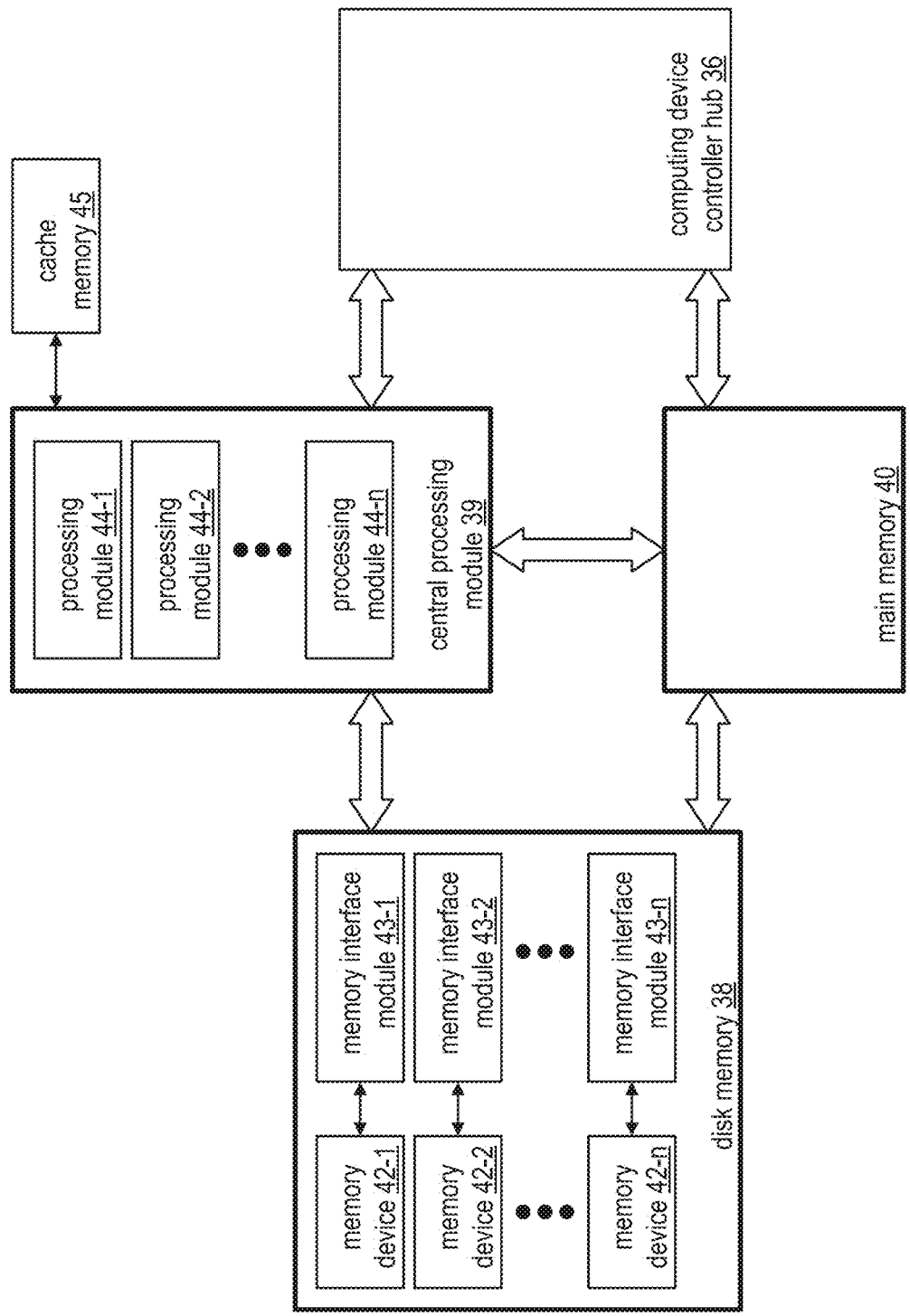
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
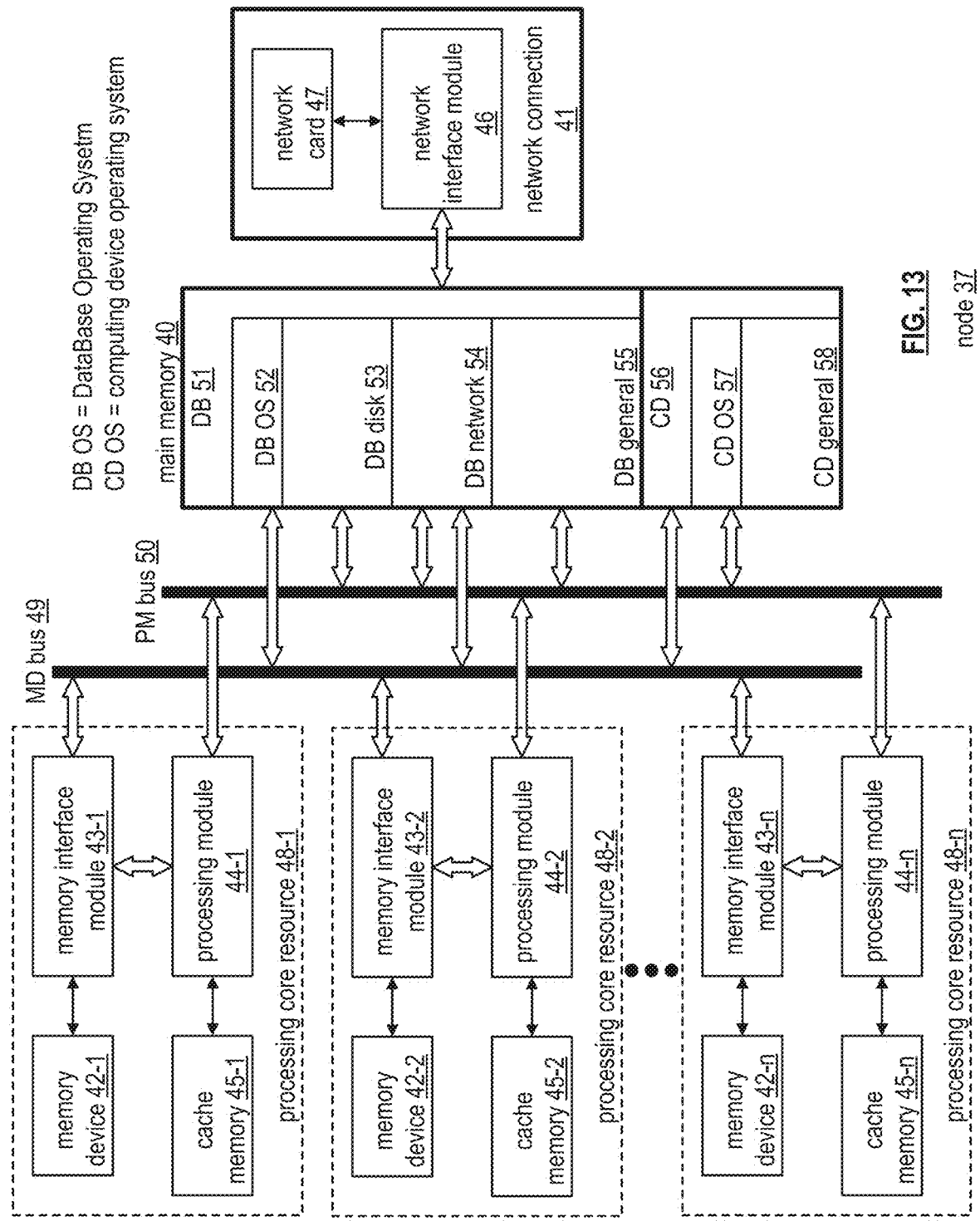
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
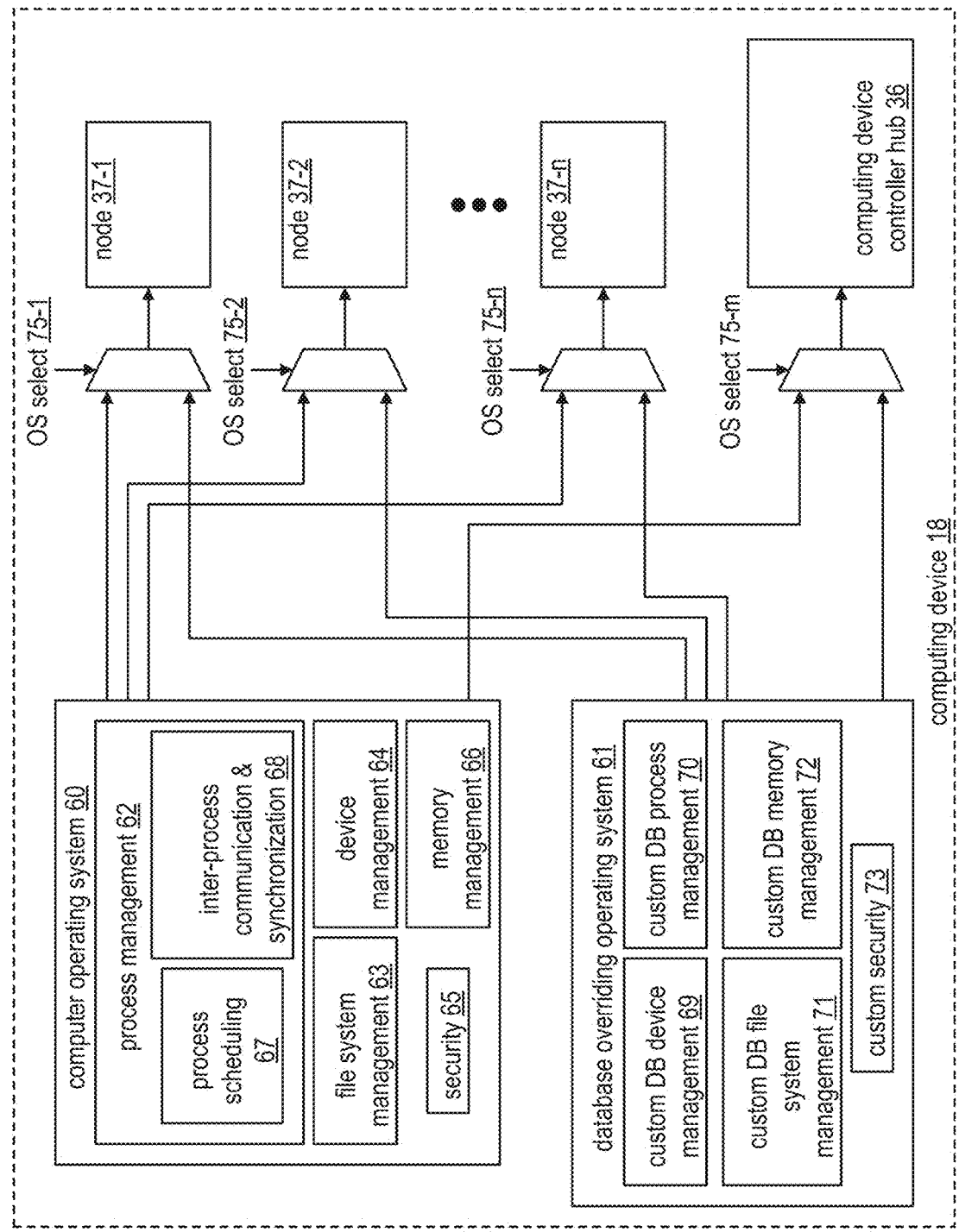
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
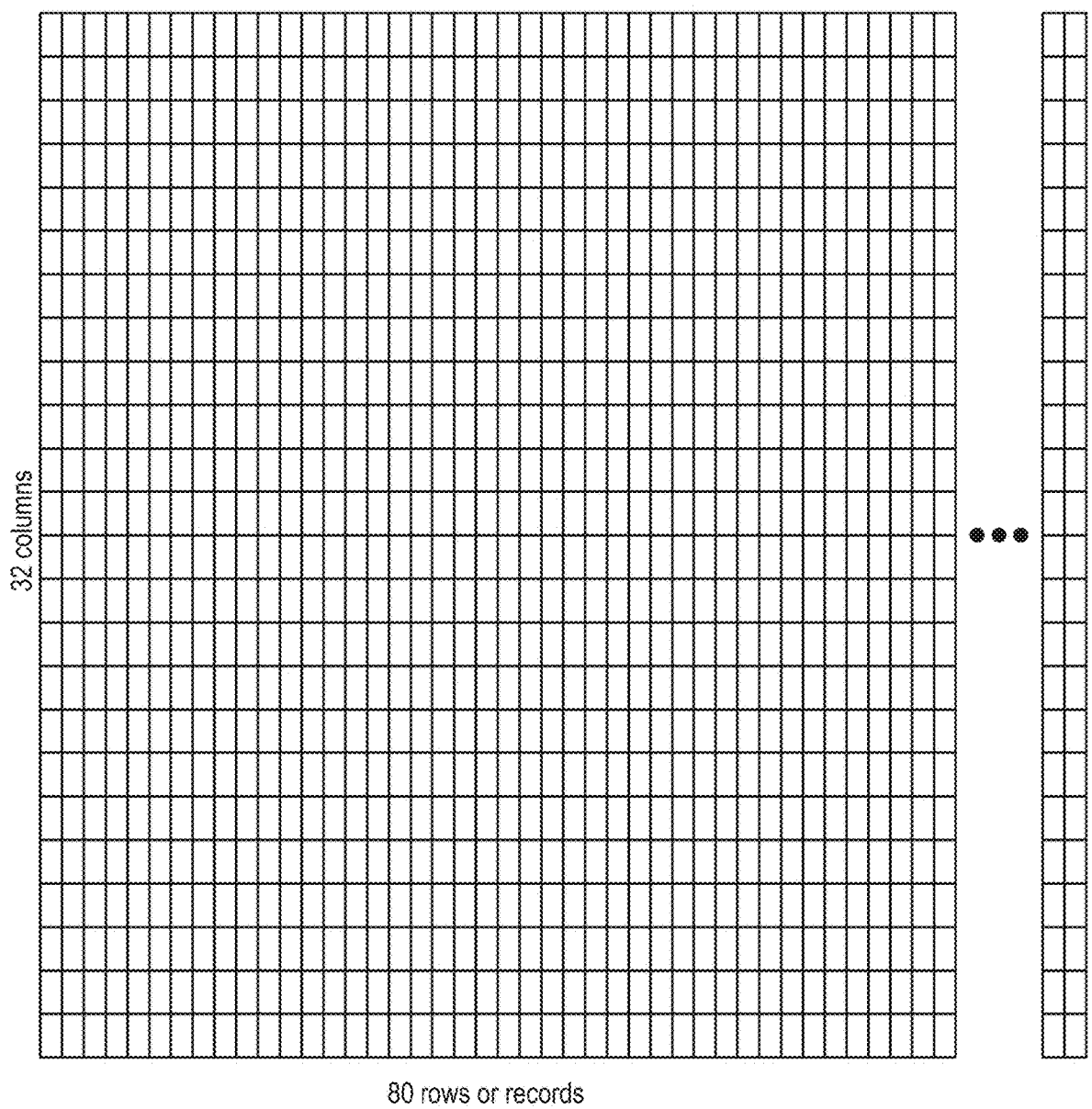

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
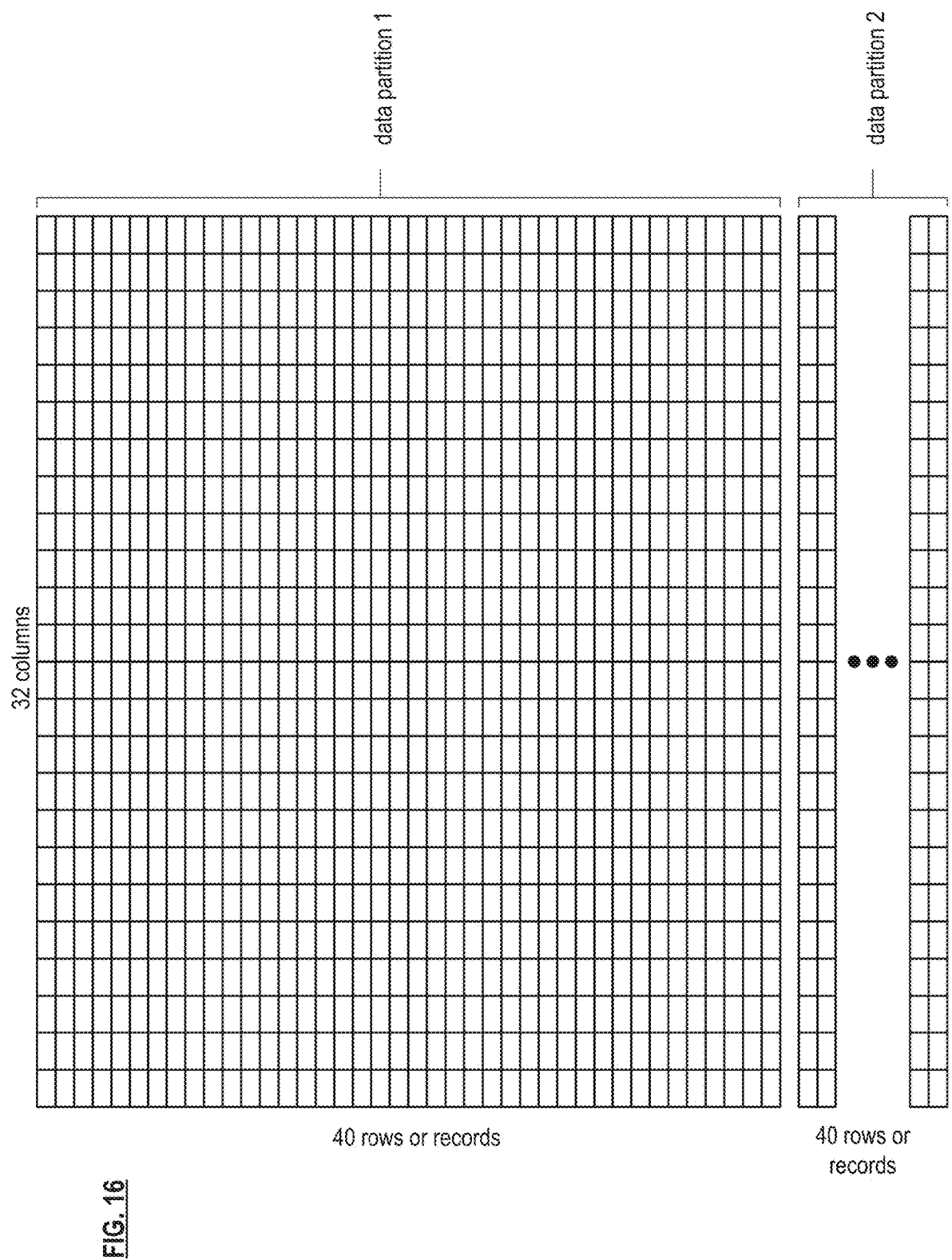

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
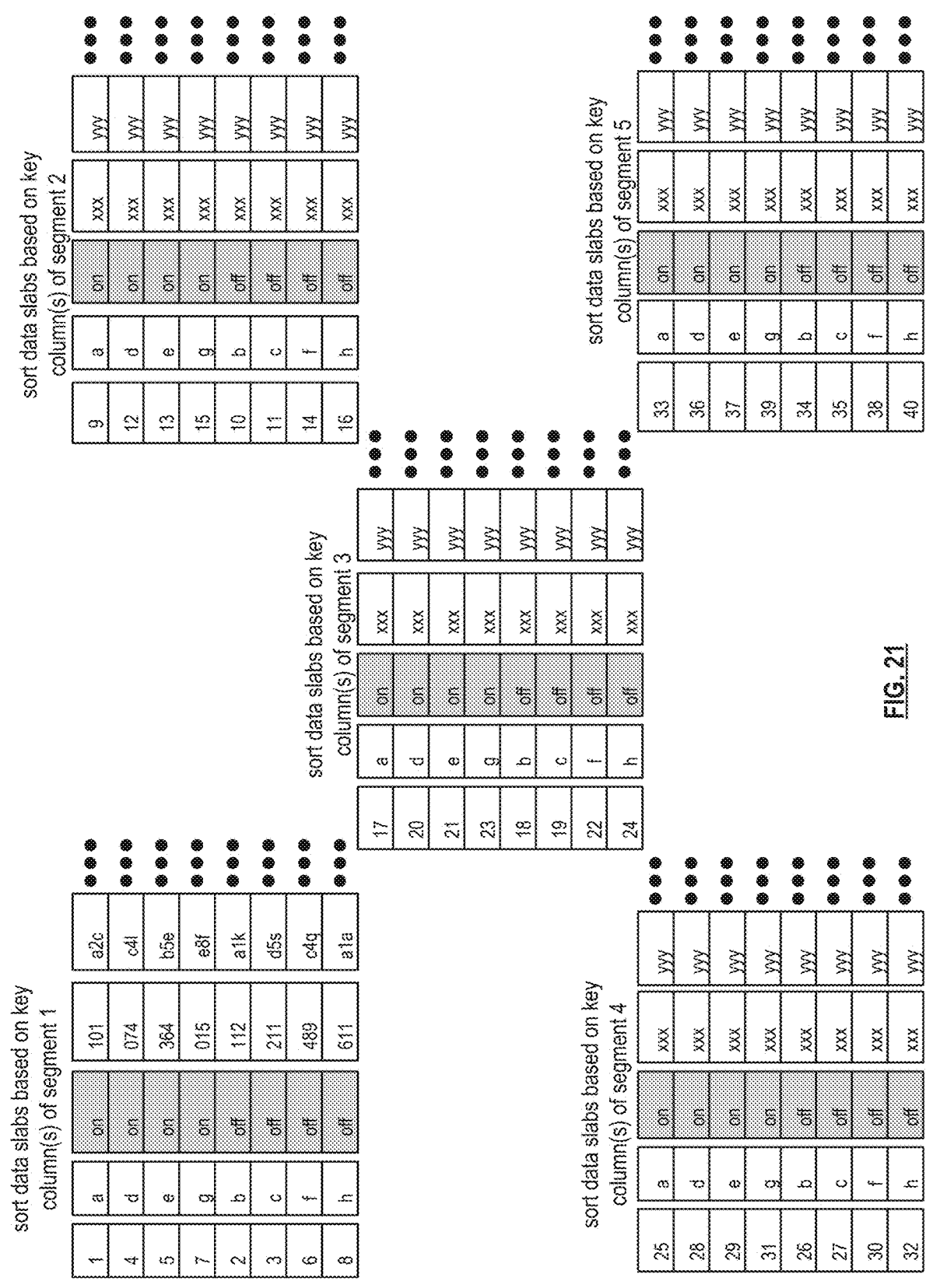

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
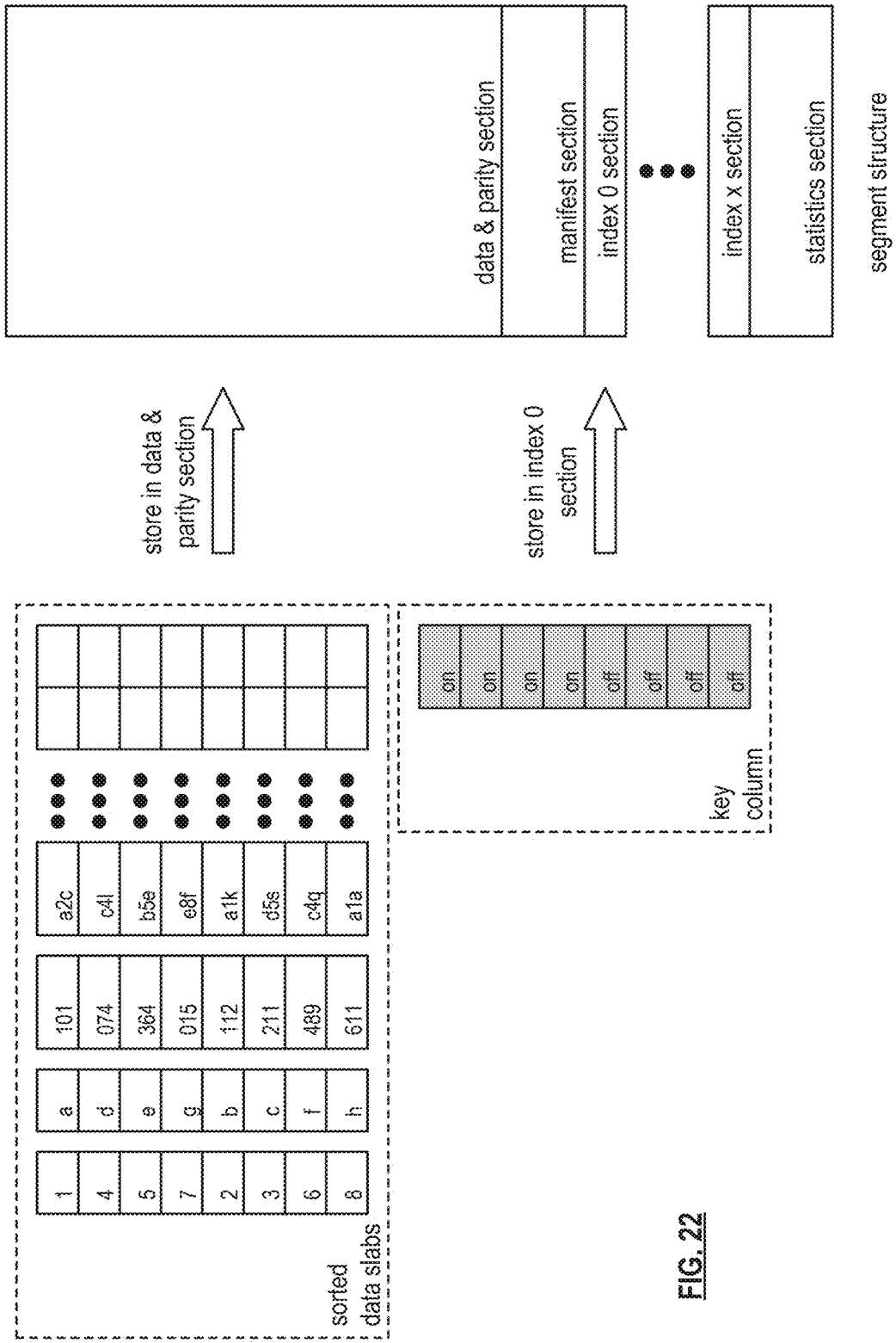

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited to, number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
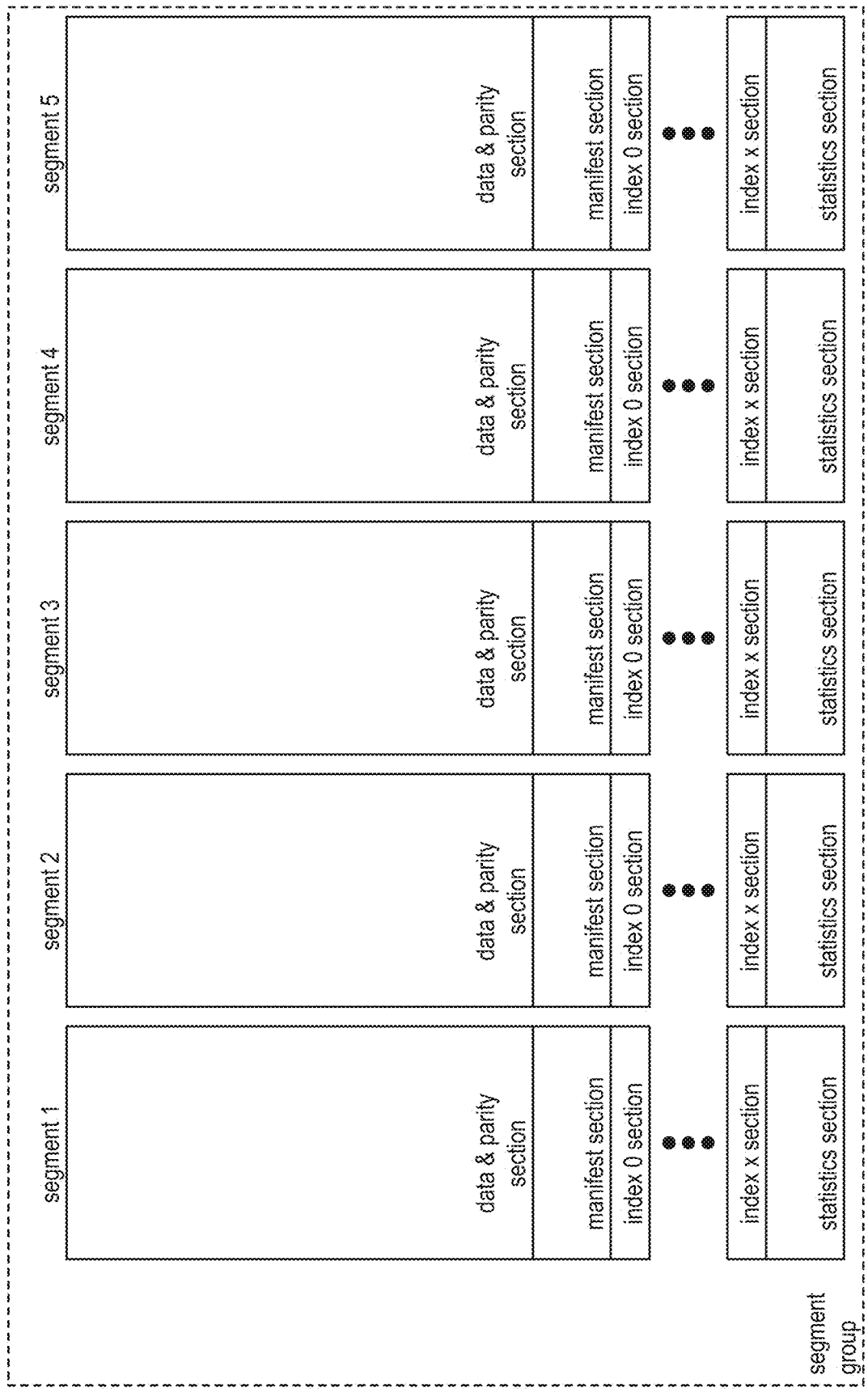

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
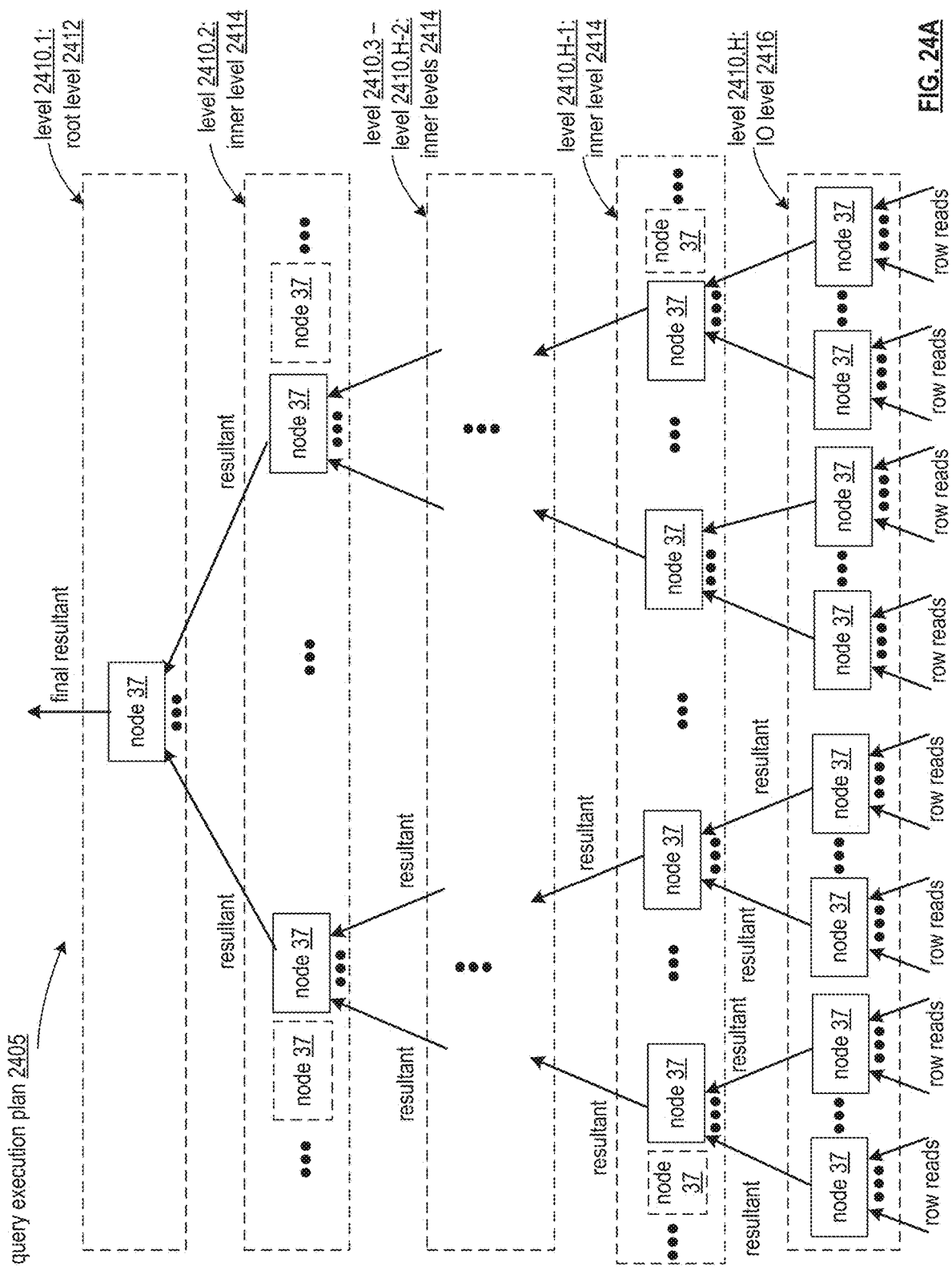
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters **35-1-35-*z*. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set. In some cases, nodes 37 that do not store segments included in segment sets, that do not have access to stored segments, and/or that are not operable to perform row reads are not included at the IO level, but can be included at one or more inner levels 2414 and/or root level 2412**.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Some or all features and/or functionality of FIG. 24A can be performed via at least one node 37 in conjunction with system metadata applied across a plurality of nodes 37, for example, where at least one node 37 participates in some or all features and/or functionality of FIG. 24A based on receiving and storing the system metadata in local memory of the at least one node 37 as configuration data and/or based on further accessing and/or executing this configuration data to participate in a query execution plan of FIG. 24A as part of its database functionality accordingly. Performance of some or all features and/or functionality of FIG. 24A can optionally change and/or be updated over time, and/or a set of nodes participating in executing some or all features and/or functionality of FIG. 24A can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24B:
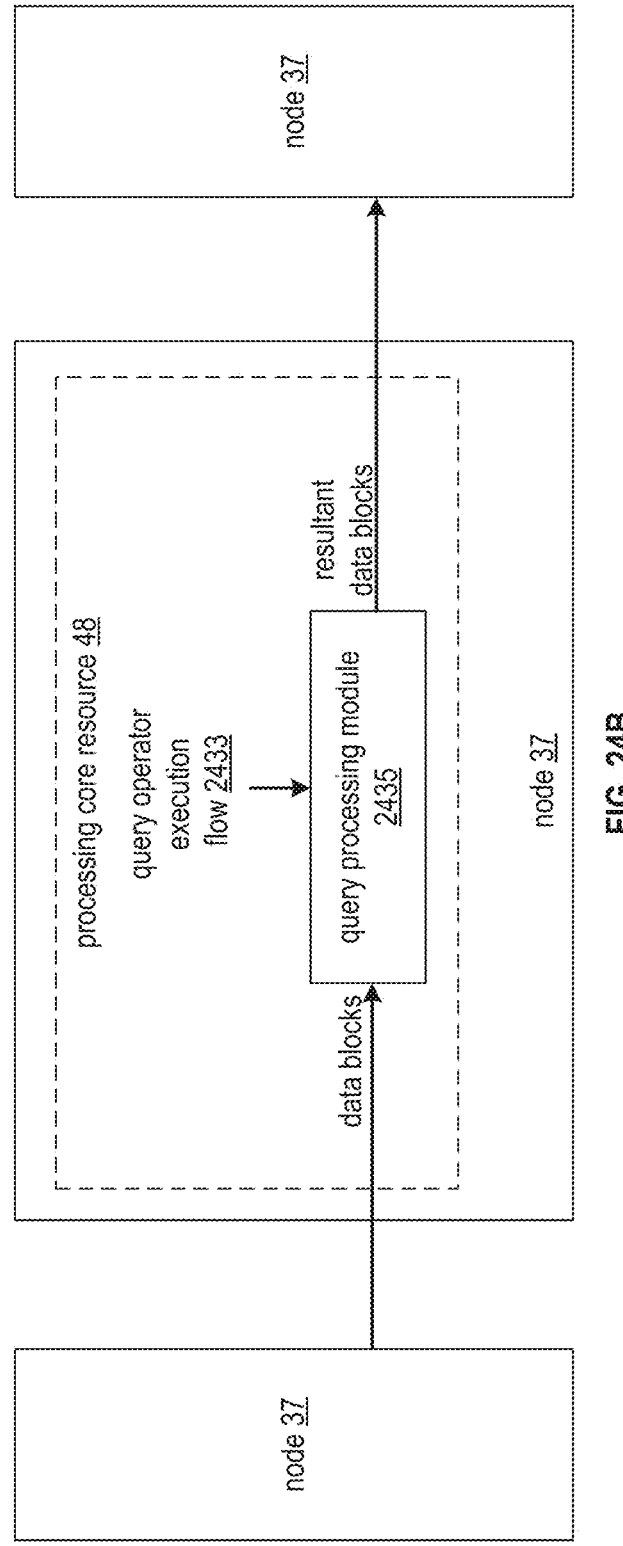
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Some or all features and/or functionality of FIG. 24B can be performed via a corresponding node 37 in conjunction with system metadata applied across a plurality of nodes 37 that includes the given node, for example, where the given node 37 participates in some or all features and/or functionality of FIG. 24B based on receiving and storing the system metadata in local memory of given node 37 as configuration data and/or based on further accessing and/or executing this configuration data to process data blocks via a query processing module as part of its database functionality accordingly. Performance of some or all features and/or functionality of FIG. 24B can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24C:
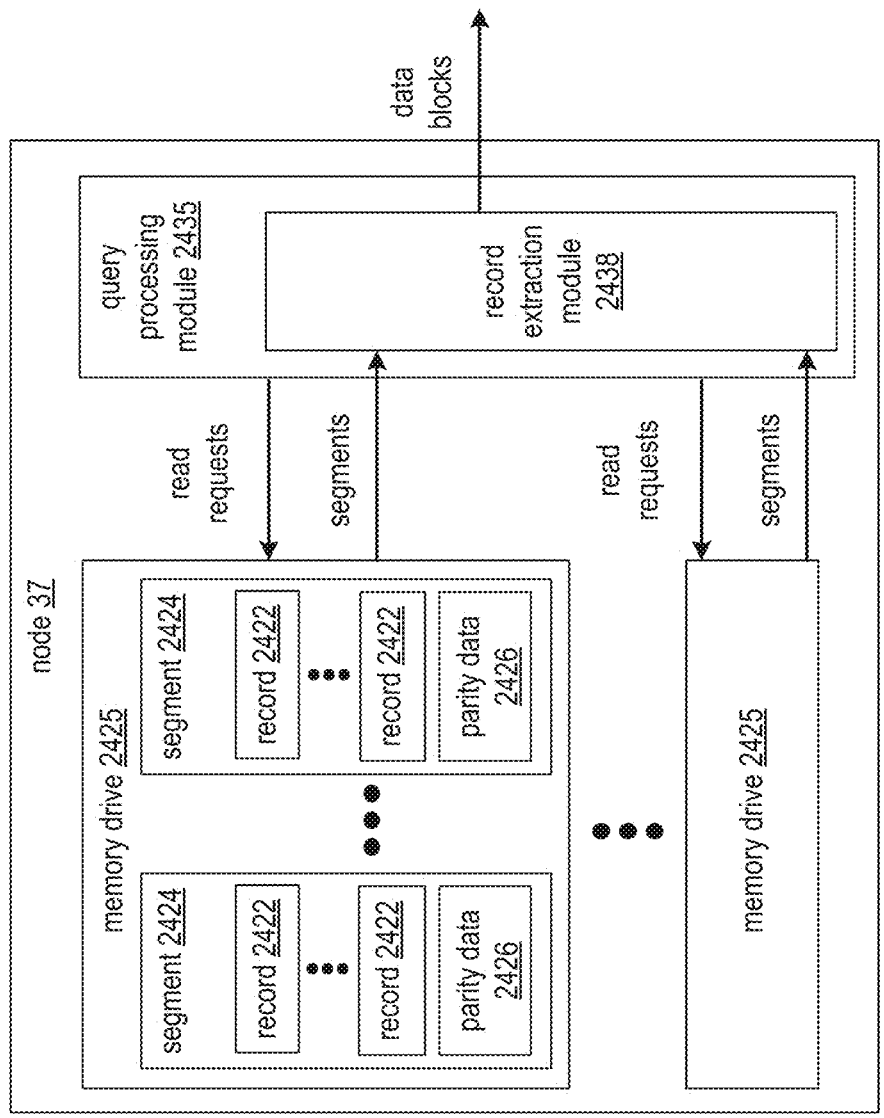

FIG. 24C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Some or all features and/or functionality of FIG. 24C can be performed via a corresponding node 37 in conjunction with system metadata applied across a plurality of nodes 37 that includes the given node, for example, where the given node 37 participates in some or all features and/or functionality of FIG. 24C based on receiving and storing the system metadata in local memory of given node 37 as configuration data and/or based on further accessing and/or executing this configuration data to read segments and/or extract rows from segments via a query processing module as part of its database functionality accordingly. Performance of some or all features and/or functionality of FIG. 24C can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24D:
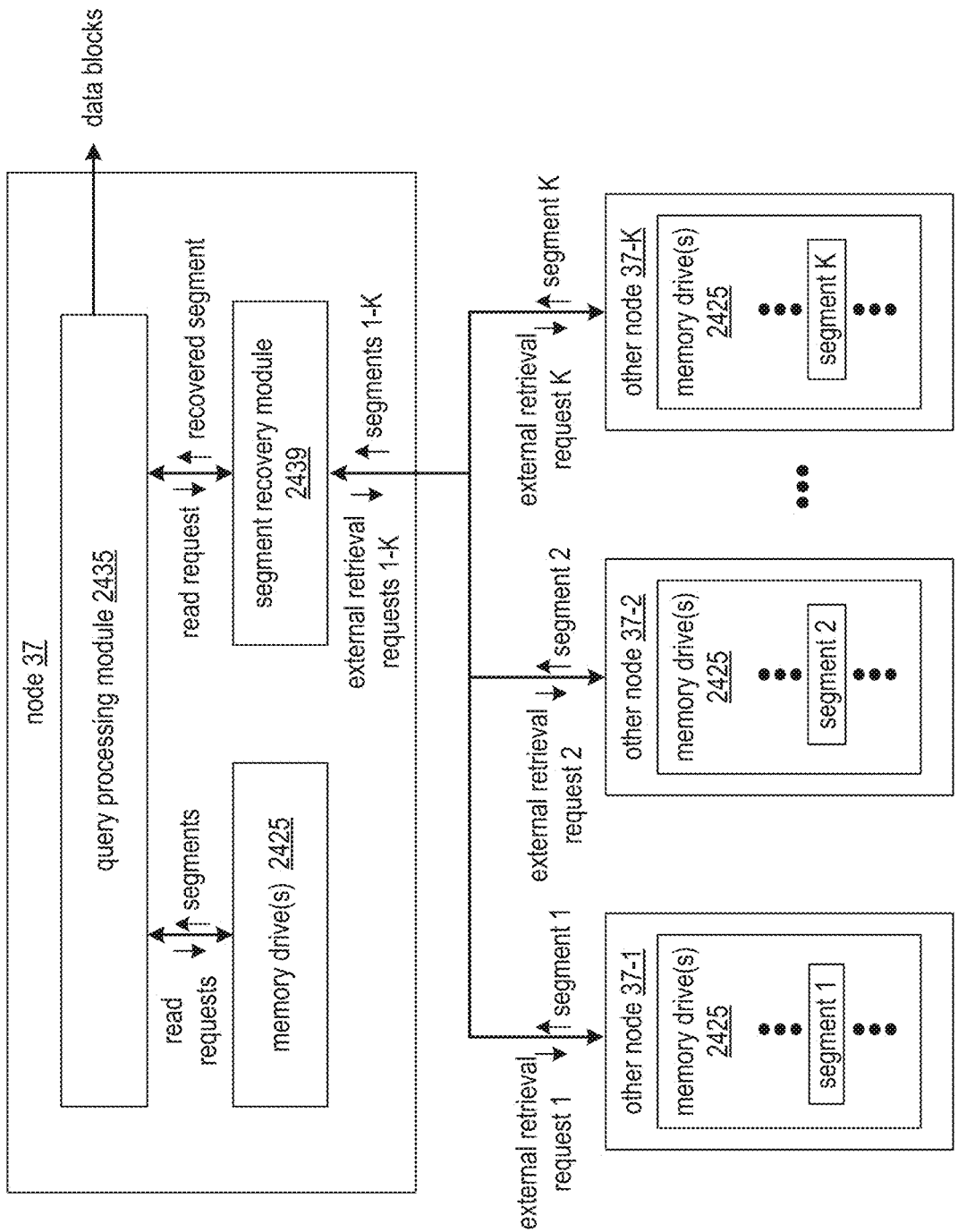

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Some or all features and/or functionality of FIG. 24D can be performed via a corresponding node 37 in conjunction with system metadata applied across a plurality of nodes 37 that includes the given node, for example, where the given node 37 participates in some or all features and/or functionality of FIG. 24D based on receiving and storing the system metadata in local memory of given node 37 as configuration data and/or based on further accessing and/or executing this configuration data to recover segments via external retrieval requests and performing a rebuilding process upon corresponding segments as part of its database functionality accordingly. Performance of some or all features and/or functionality of FIG. 24D can optionally change and/or be updated over time, based on the system metadata applied across a plurality of nodes 37 that includes the given node being updated over time, and/or based on the given node updating its configuration data stored in local memory to reflect changes in the system metadata based on receiving data indicating these changes to the system metadata.

Figure 24E:
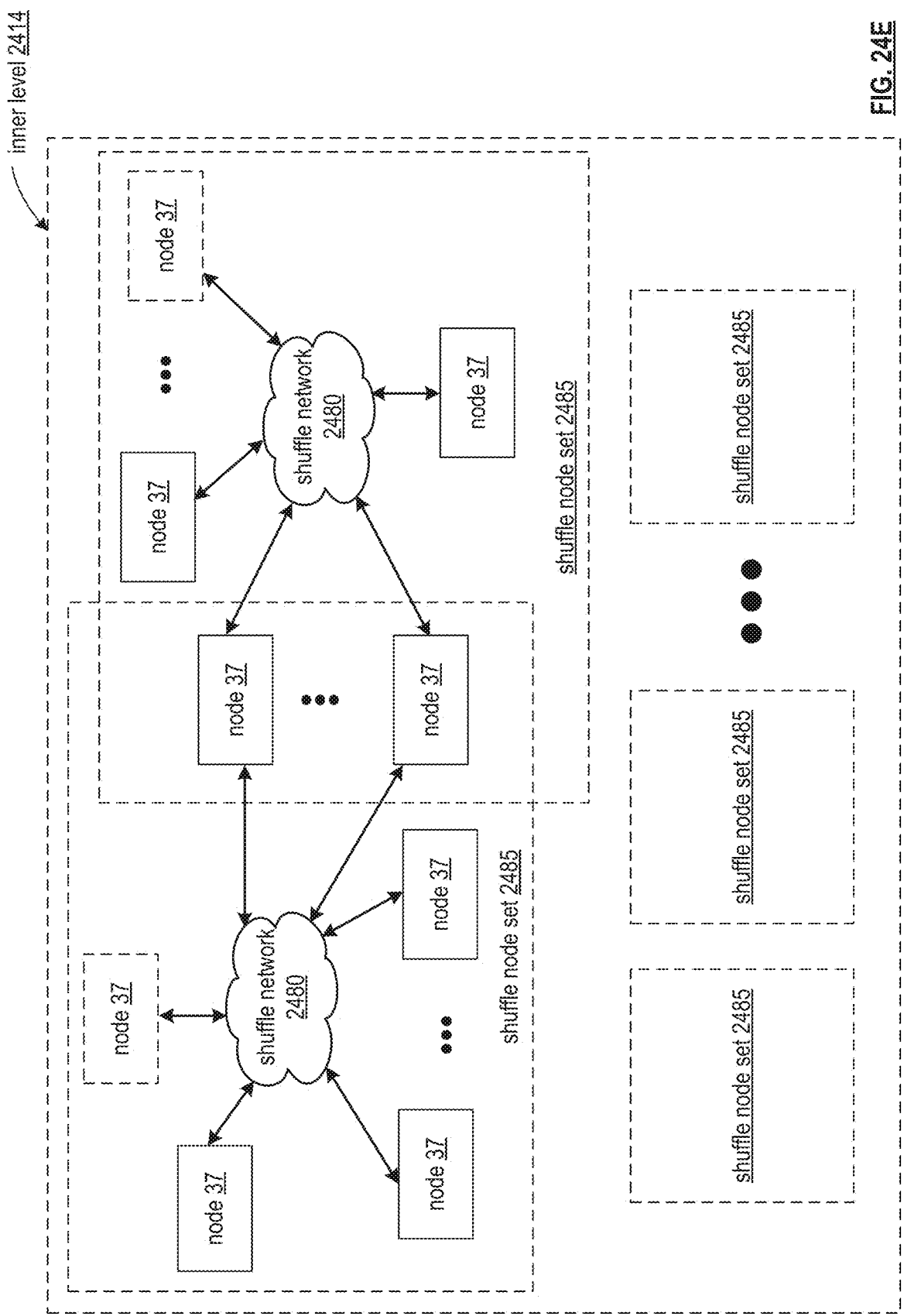
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Some or all features and/or functionality of FIG. 24E can be performed via at least one node 37 in conjunction with system metadata applied across a plurality of nodes 37, for example, where at least one node 37 participates in some or all features and/or functionality of FIG. 24E based on receiving and storing the system metadata in local memory of the at least one node 37 as configuration data and/or based on further accessing and/or executing this configuration data to participate in one or more shuffle node sets of FIG. 24E as part of its database functionality accordingly. Performance of some or all features and/or functionality of FIG. 24E can optionally change and/or be updated over time, and/or a set of nodes participating in executing some or all features and/or functionality of FIG. 24E can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24F:
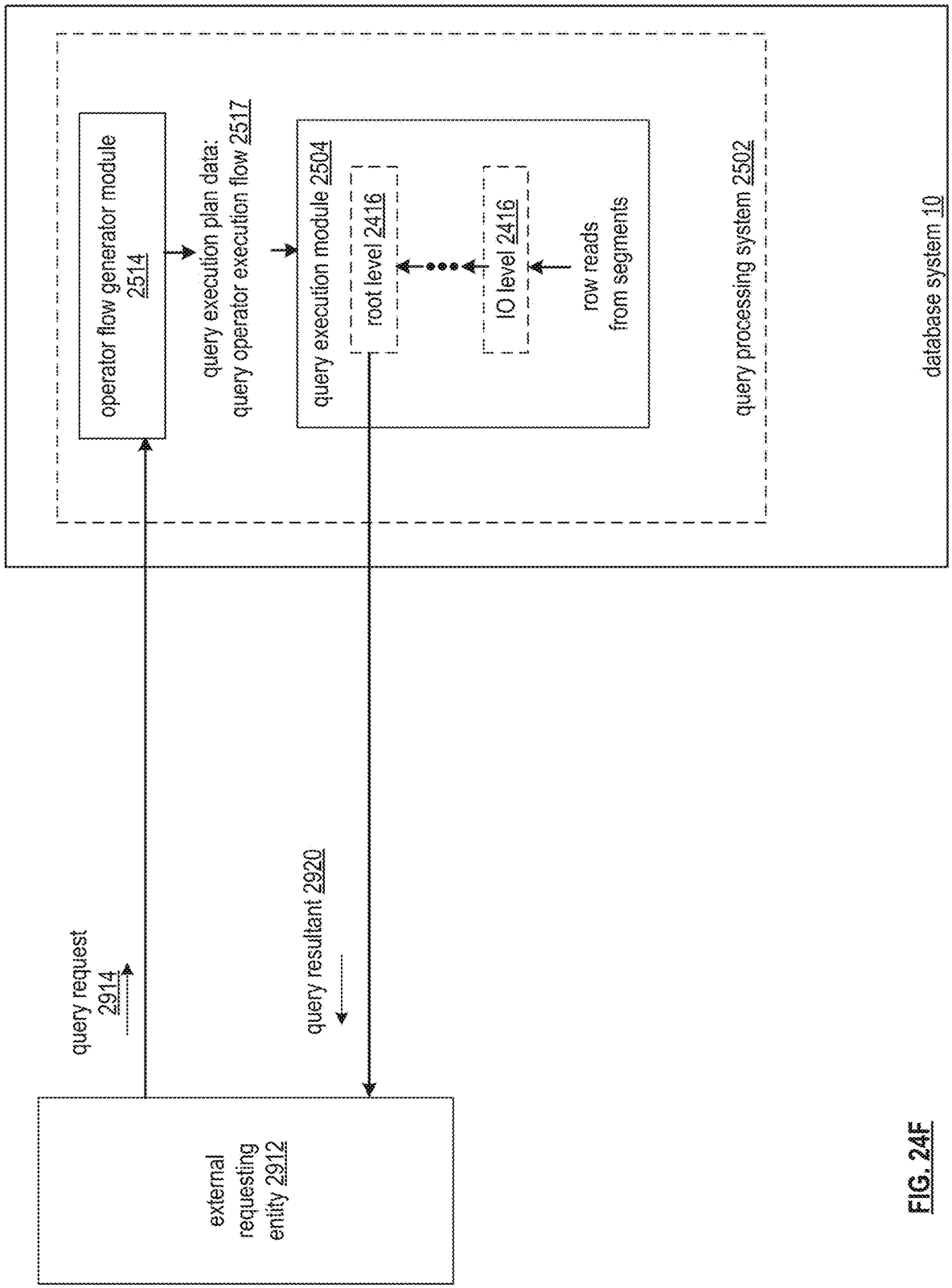
FIG. 24F is a schematic block diagram of a database system communicating with an external requesting entity in accordance with various embodiments.

FIG. 24F illustrates an embodiment of a database system that receives some or all query requests from one or more external requesting entities 2912. The external requesting entities 2912 can be implemented as a client device such as a personal computer and/or device, a server system, or other external system that generates and/or transmits query requests 2914. A query resultant 2920 can optionally be transmitted back to the same or different external requesting entity 2912. Some or all query requests processed by database system 10 as described herein can be received from external requesting entities 2912 and/or some or all query resultants generated via query executions described herein can be transmitted to external requesting entities 2912.

For example, a user types or otherwise indicates a query for execution via interaction with a computing device associated with and/or communicating with an external requesting entity. The computing device generates and transmits a corresponding query request 2914 for execution via the database system 10, where the corresponding query resultant 2920 is transmitted back to the computing device, for example, for storage by the computing device and/or for display to the corresponding user via a display device.

As another example, a query is automatically generated for execution via processing resources via a computing device and/or via communication with an external requesting entity implemented via at least one computing device. For example, the query is automatically generated and/or modified from a request generated via user input and/or received from a requesting entity in conjunction with implementing a query generator system, a query optimizer, generative artificial intelligence (AI), and/or other artificial intelligence and/or machine learning techniques. The computing device generates and transmits a corresponding query request 2914 for execution via the database system 10, where the corresponding query resultant 2920 is transmitted back to the computing device, for example, for storage by the computing device, transmission to another system, and/or for display to at least one corresponding user via a display device.

Some or all features and/or functionality of FIG. 24F can be performed via at least one node 37 in conjunction with system metadata applied across a plurality of nodes 37, for example, where at least one node 37 participates in some or all features and/or functionality of FIG. 24F based on receiving and storing the system metadata in local memory of the at least one node 37 as configuration data, and/or based on further accessing and/or executing this configuration data to generate query execution plan data from query requests by implementing some or all of the operator flow generator module 2514 as part of its database functionality accordingly, and/or to participate in one or more query execution plans of a query execution module 2504 as part of its database functionality accordingly. Performance of some or all features and/or functionality of FIG. 24F can optionally change and/or be updated over time, and/or a set of nodes participating in executing some or all features and/or functionality of FIG. 24F can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24G:
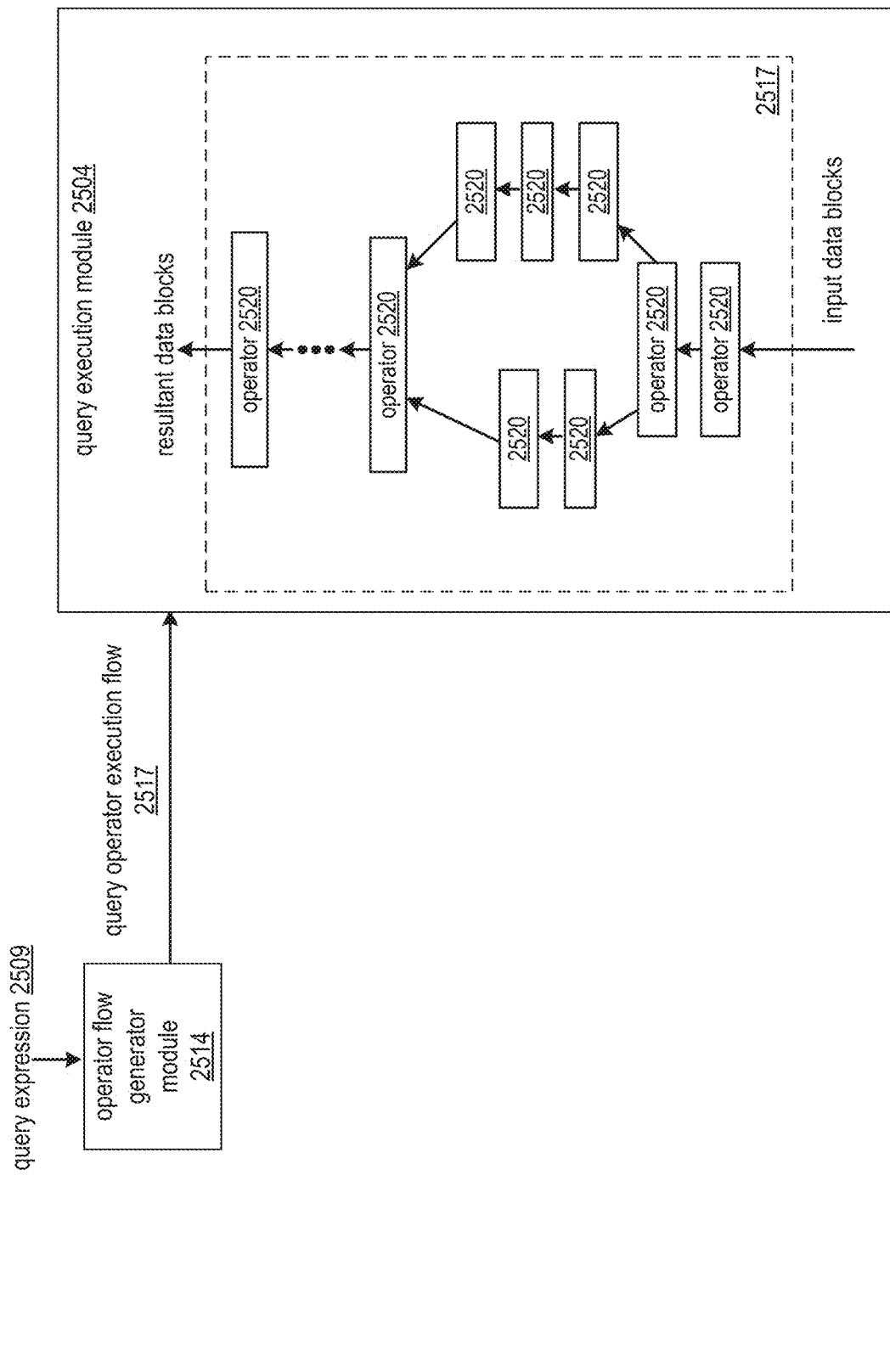
FIG. 24G is a schematic block diagram of a query processing system in accordance with various embodiments.

FIG. 24G illustrates an embodiment of a query processing system 2502 that generates a query operator execution flow 2517 from a query expression 2509 for execution via a query execution module 2504. The query processing system 2502 can be implemented utilizing, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 24G, an operator flow generator module 2514 of the query processing system 2502 can be utilized to generate a query operator execution flow 2517 for the query indicated in a query expression 2509. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by perform a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2502 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Some or all features and/or functionality of FIG. 24G can be performed via at least one node 37 in conjunction with system metadata applied across a plurality of nodes 37, for example, where at least one node 37 participates in some or all features and/or functionality of FIG. 24G based on receiving and storing the system metadata in local memory of the at least one node 37 as configuration data and/or based on further accessing and/or executing this configuration data to generate query execution plan data from query requests by executing some or all operators of a query operator flow 2517 as part of its database functionality accordingly. Performance of some or all features and/or functionality of FIG. 24G can optionally change and/or be updated over time, and/or a set of nodes participating in executing some or all features and/or functionality of FIG. 24G can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

Some or all features and/or functionality of FIG. 24H can be performed via at least one node 37 in conjunction with system metadata applied across a plurality of nodes 37, for example, where at least one node 37 participates in some or all features and/or functionality of FIG. 24H based on receiving and storing the system metadata in local memory of the at least one node 37 as configuration data and/or based on further accessing and/or executing this configuration data execute some or all operators of a query operator flow 2517 as part of its database functionality accordingly. Performance of some or all features and/or functionality of FIG. 24H can optionally change and/or be updated over time, and/or a set of nodes participating in executing some or all features and/or functionality of FIG. 24H can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24I:
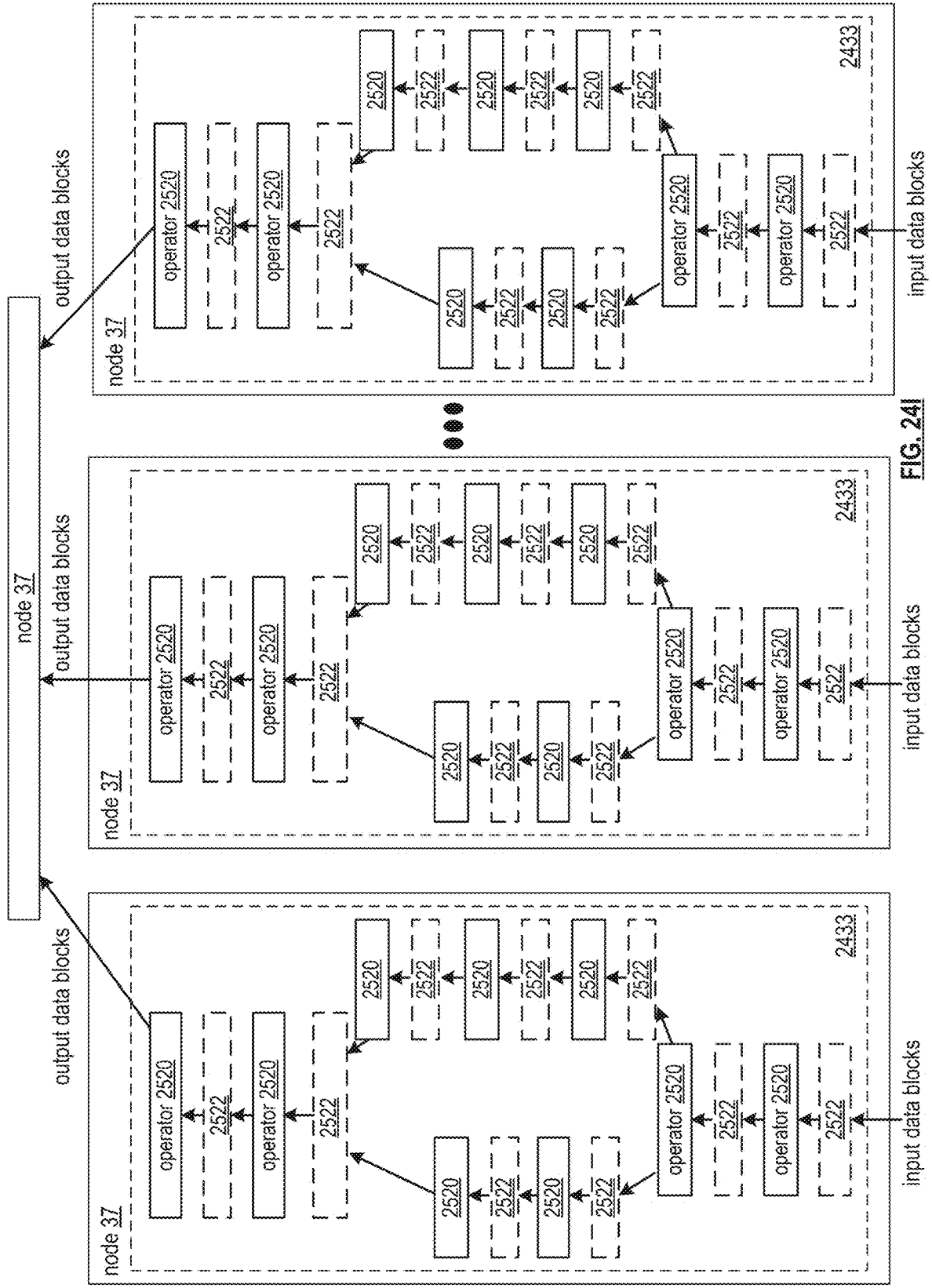
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Some or all features and/or functionality of FIG. 24I can be performed via at least one node 37 in conjunction with system metadata applied across a plurality of nodes 37, for example, where at least one node 37 participates in some or all features and/or functionality of FIG. 24I based on receiving and storing the system metadata in local memory of the at least one node 37 as configuration data and/or based on further accessing and/or executing this configuration data to execute some or all operators of a query operator flow 2517 in parallel with other nodes, send data blocks to a parent node, and/or process data blocks from child nodes as part of its database functionality accordingly. Performance of some or all features and/or functionality of FIG. 24I can optionally change and/or be updated over time, and/or a set of nodes participating in executing some or all features and/or functionality of FIG. 24I can have changing nodes over time, based on the system metadata applied across the plurality of nodes 37 being updated over time, based on nodes on updating their configuration data stored in local memory to reflect changes in the system metadata based on receiving data indicating these changes to the system metadata, and/or based on nodes being added and/or removed from the plurality of nodes over time.

Figure 24J:
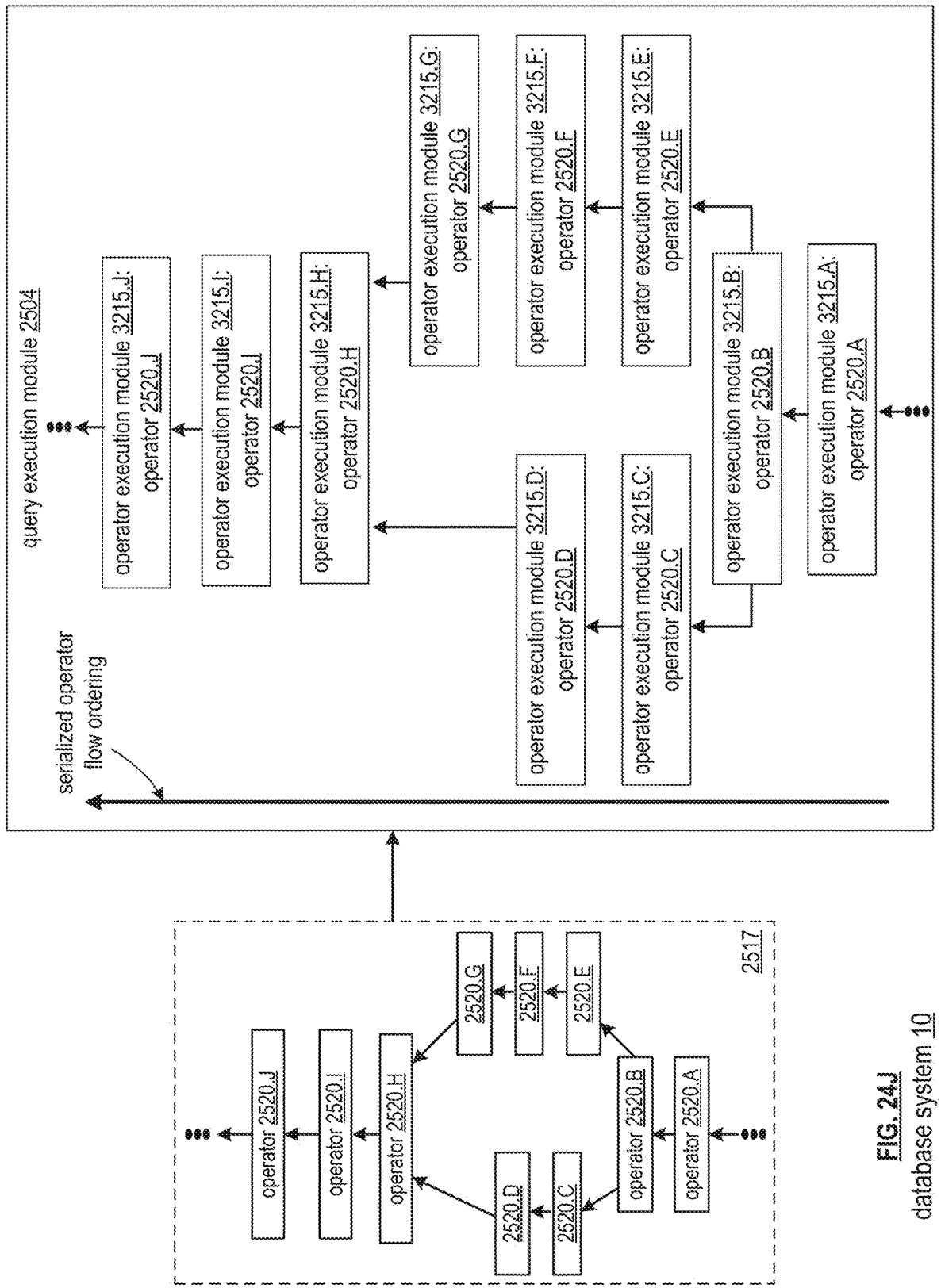
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

Figure 24K:
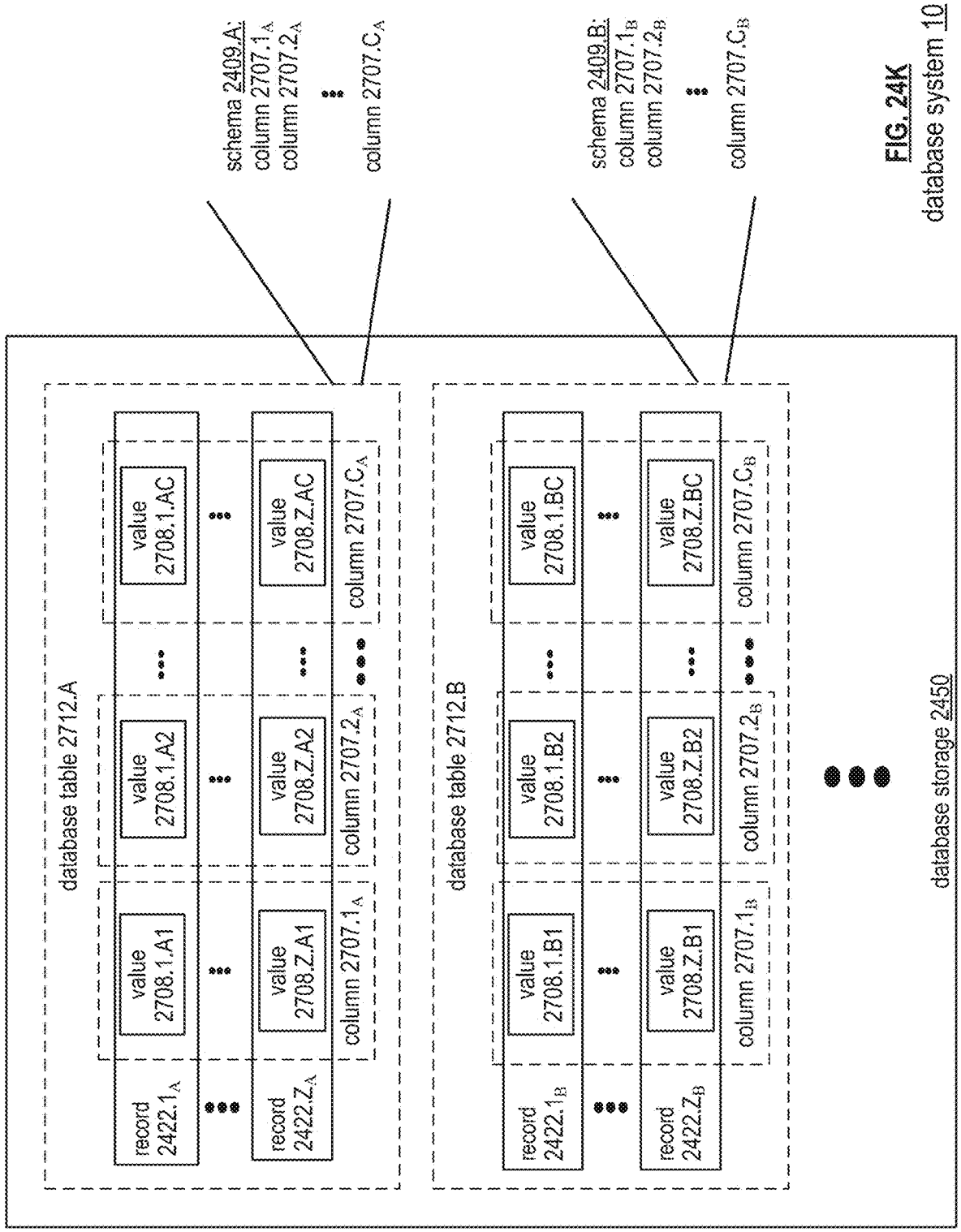
FIG. 24K illustrates an example embodiment of a plurality of database tables stored in database storage in accordance with various embodiments.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.1_A$-$2707.C_A$ of schema 2709.A for database table 2712.A can have a different number of columns than and/or can have different datatypes for some or all columns of the set of columns $2707.1_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types. The schema 2409 for a given database table can denote the name/identifier of a corresponding relational database table.

A given schema 2409 can indicate such schemas for a plurality of tables, for example, of a same dataset, same database, and/or same user entity (e.g. that has access to/supplied data for these tables under the given schema 2409). For example, a given schema 2409 is configured by/otherwise corresponds to a given user entity.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

Figure 24L:
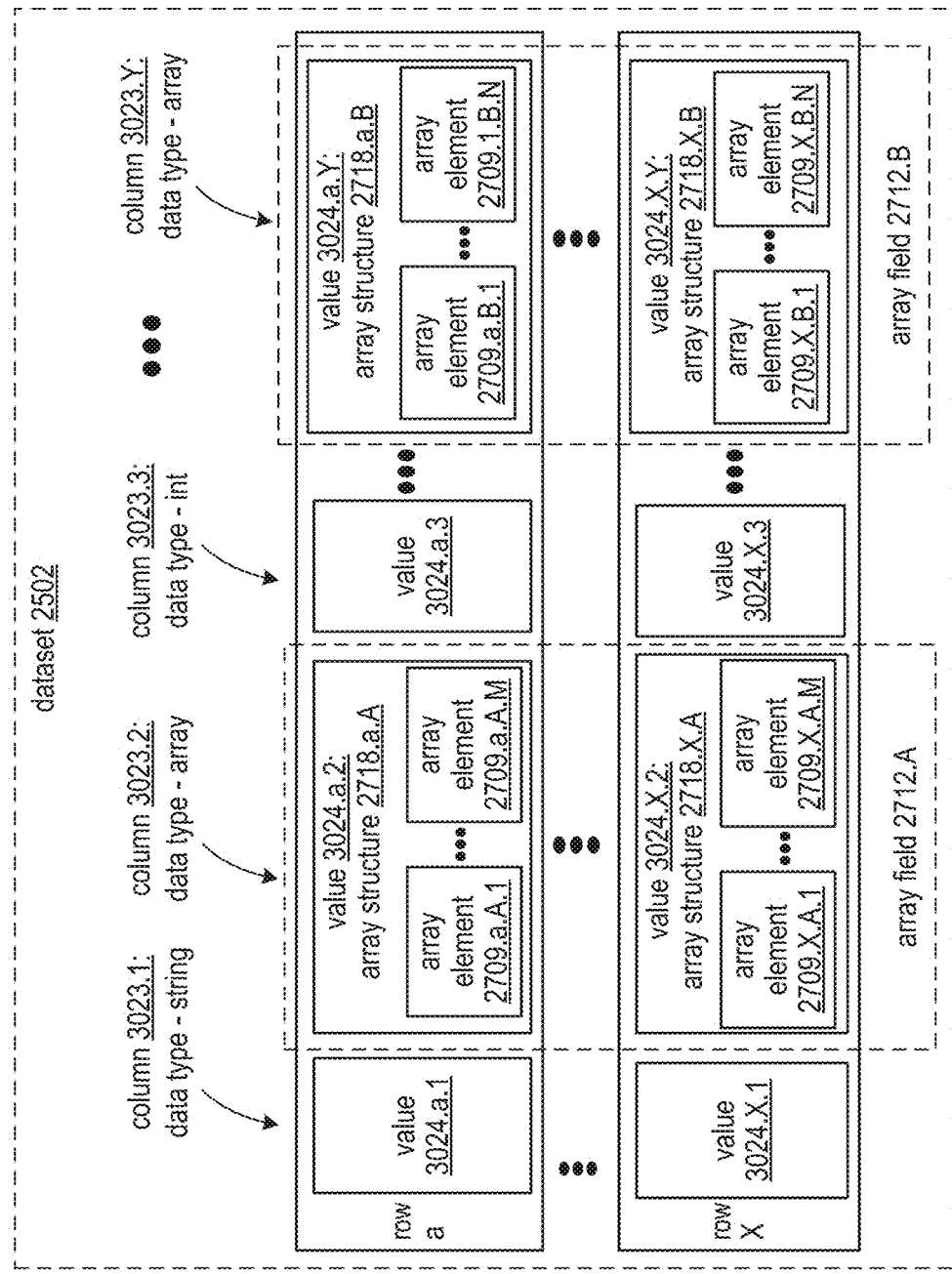
FIG. 24L illustrates an example embodiment of a dataset stored in database storage that includes at least one array field in accordance with various embodiments.

FIG. 24L illustrates an embodiment of a dataset 2502 having one or more columns 3023 implemented as array fields 2712. Some or all features and/or functionality of the dataset 2502 of FIG. 24L can be utilized to implement one or more of the database tables 2712 of FIG. 24K and/or any embodiment of any database table and/or dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values. For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

Figure 24M:
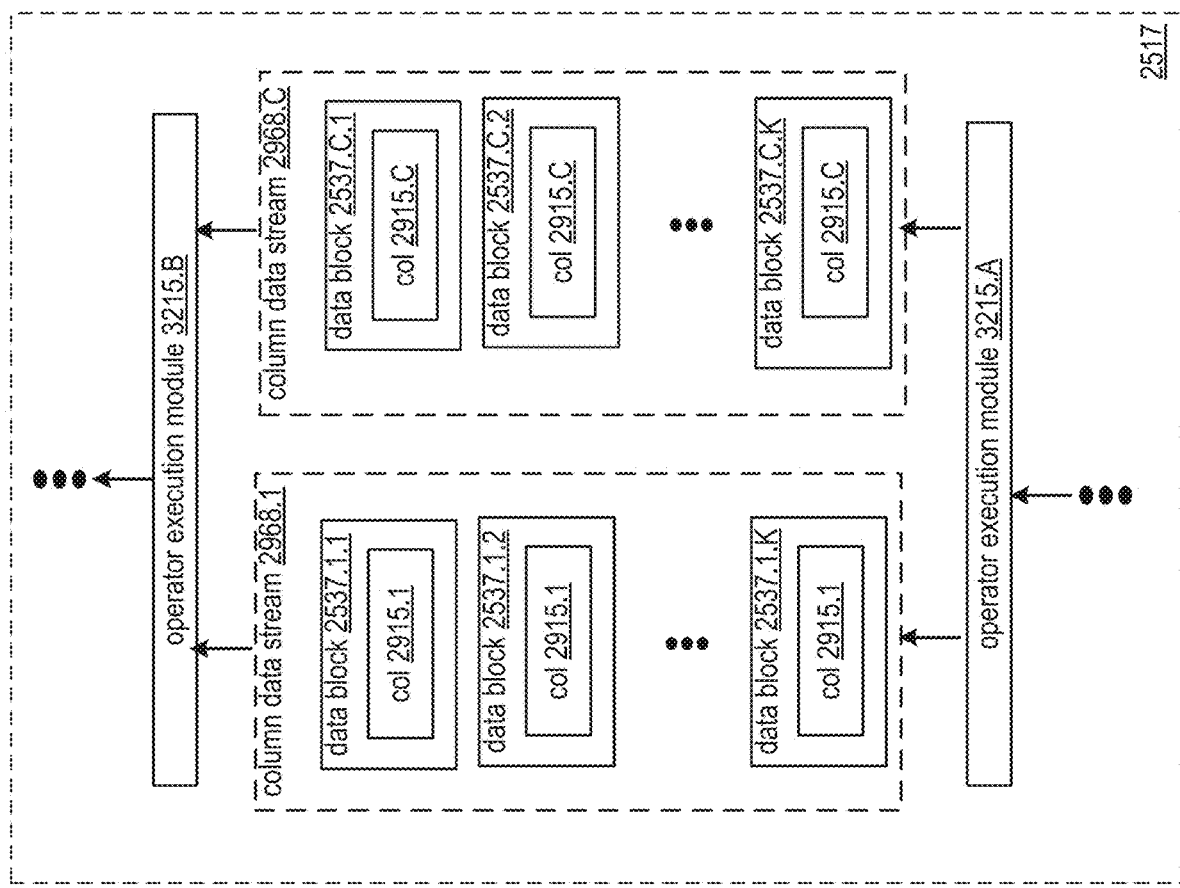
FIG. 24M is a schematic block diagram of a query execution module that implements a plurality of column data streams in accordance with various embodiments.
Figure 24N:
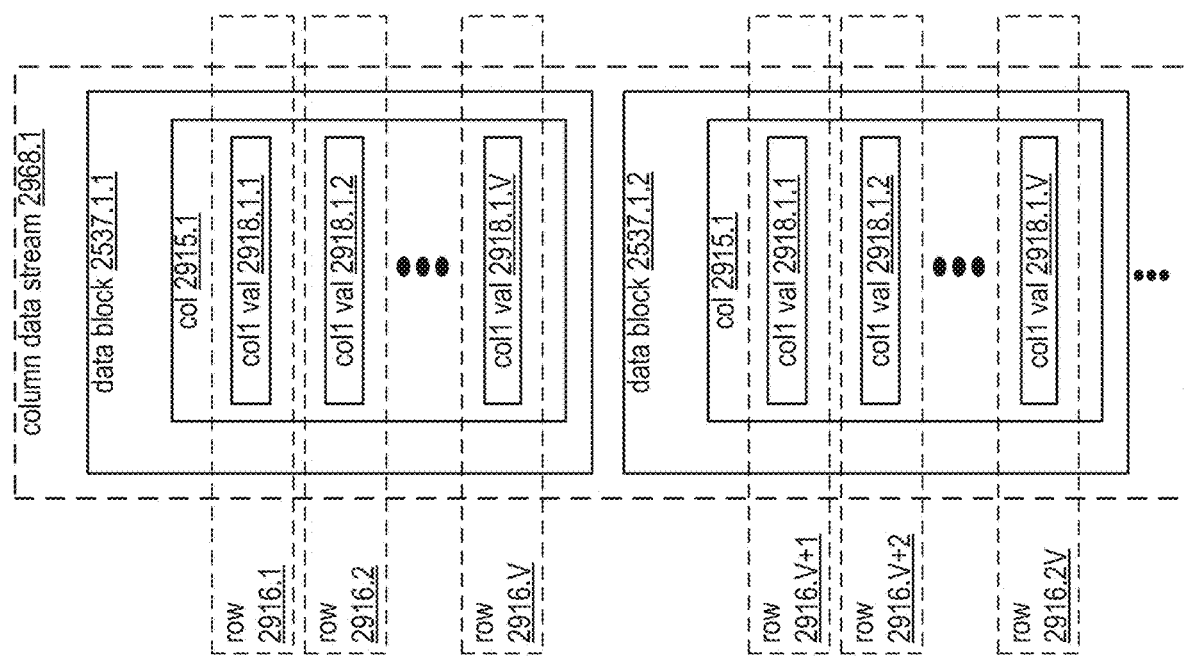
FIG. 24N illustrates example data blocks of a column data stream in accordance with various embodiments.

FIGS. 24M-24N illustrates an example embodiment of a query execution module 2504 of a database system 10 that executes queries via generation, storage, and/or communication of a plurality of column data streams 2968 corresponding to a plurality of columns. Some or all features and/or functionality of query execution module 2504 of FIGS. 24M-24N can implement any embodiment of query execution module 2504 described herein and/or any performance of query execution described herein. Some or all features and/or functionality of column data streams 2968 of FIGS. 24M-24N can implement any embodiment of data blocks 2537 and/or other communication of data between operators 2520 of a query operator execution flow 2517 when executed by a query execution module 2504, for example, via a corresponding plurality of operator execution modules 3215.

As illustrated in FIG. 24M, in some embodiments, data values of each given column 2915 are included in data blocks of their own respective column data stream 2968. Each column data stream 2968 can correspond to one given column 2915, where each given column 2915 is included in one data stream included in and/or referenced by output data blocks generated via execution of one or more operator execution module 3215, for example, to be utilized as input by one or more other operator execution modules 3215. Different columns can be designated for inclusion in different data streams. For example, different column streams are written do different portions of memory, such as different sets of memory fragments of query execution memory resources.

As illustrated in FIG. 24N, each data block 2537 of a given column data stream 2968 can include values 2918 for the respective column for one or more corresponding rows 2916. In the example of FIG. 24N, each data block includes values for V corresponding rows, where different data blocks in the column data stream include different respective sets of V rows, for example, that are each a subset of a total set of rows to be processed. In other embodiments, different data blocks can have different numbers of rows. The subsets of rows across a plurality of data blocks 2537 of a given column data stream 2968 can be mutually exclusive and collectively exhaustive with respect to the full output set of rows, for example, emitted by a corresponding operator execution module 3215 as output.

Values 2918 of a given row utilized in query execution are thus dispersed across different A given column 2915 can be implemented as a column 2707 having corresponding values 2918 implemented as values 2708 read from database table 2712 read from database storage 2450, for example, via execution of corresponding IO operators. Alternatively or in addition, a given column 2915 can be implemented as a column 2707 having new and/or modified values generated during query execution, for example, via execution of an extend expression and/or other operation. Alternatively or in addition, a given column 2915 can be implemented as a new column generated during query execution having new values generated accordingly, for example, via execution of an extend expression and/or other operation. The set of column data streams 2968 generated and/or emitted between operators in query execution can correspond to some or all columns of one or more tables 2712 and/or new columns of an existing table and/or of a new table generated during query execution.

Additional column streams emitted by the given operator execution module can have their respective values for the same full set of output rows across for other respective columns. For example, the values across all column streams are in accordance with a consistent ordering, where a first row's values 2918.1.1-2918.1.C for columns 2915.1-2915.C are included first in every respective column data stream, where a second row's values 2918.2.1-2918.2.C for columns 2915.1-2915.C are included second in every respective column data stream, and so on. In other embodiments, rows are optionally ordered differently in different column streams. Rows can be identified across column streams based on consistent ordering of values, based on being mapped to and/or indicating row identifiers, or other means.

As a particular example, for every fixed-length column, a huge block can be allocated to initialize a fixed length column stream, which can be implemented via mutable memory as a mutable memory column stream, and/or for every variable-length column, another huge block can be allocated to initialize a binary stream, which can be implemented via mutable memory as a mutable memory binary stream. A given column data stream 2968 can be continuously appended with fixed length values to data runs of contiguous memory and/or may grow the underlying huge page memory region to acquire more contiguous runs and/or fragments of memory.

In other embodiments, rather than emitting data blocks with values 2918 for different columns in different column streams, values 2918 for a set of multiple column can be emitted in a same multi-column data stream.

Figure 24O:
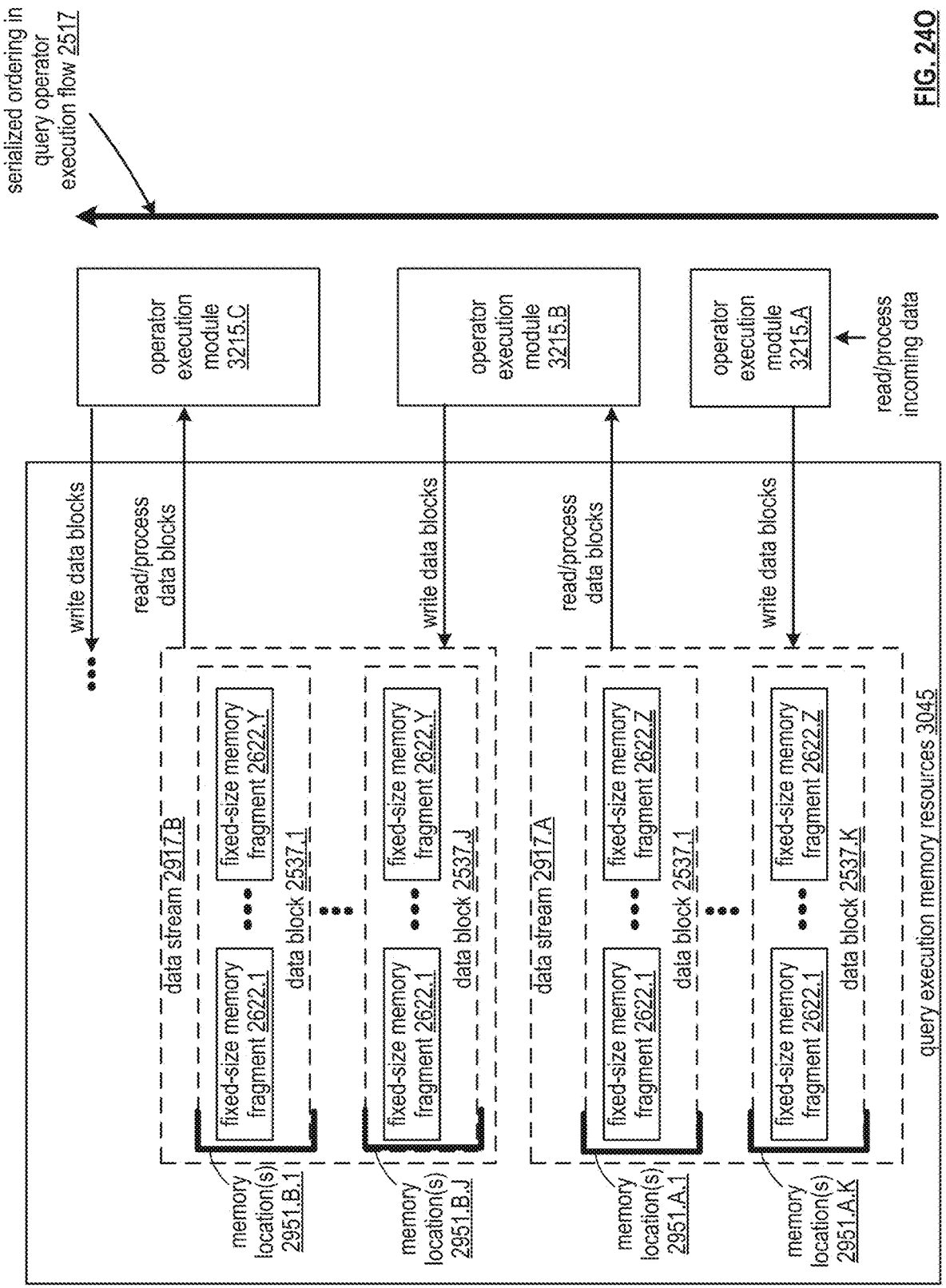
FIG. 24O is a schematic block diagram of a query execution module illustrating writing and processing of data blocks by operator execution modules in accordance with various embodiments.

FIG. 24O illustrates an example of operator execution modules 3215.C that each write their output memory blocks to one or more memory fragments 2622 of query execution memory resources 3045 and/or that each read/process input data blocks based on accessing the one or more memory fragments 2622 Some or all features and/or functionality of the operator execution modules 3215 of FIG. 24O can implement the operator execution modules of FIG. 24J and/or can implement any query execution described herein. The data blocks 2537 can implement the data blocks of column streams of FIGS. 24M and/or 24N, and/or any operator 2520's input data blocks and/or output data blocks described herein.

A given operator execution module 3215.A for an operator that is a child operator of the operator executed by operator execution module 3215.B can emit its output data blocks for processing by operator execution module 3215.B based on writing each of a stream of data blocks 2537.1-2537.K of data stream 2917.A to contiguous or non-contiguous memory fragments 2622 at one or more corresponding memory locations 2951 of query execution memory resources 3045.

Operator execution module 3215.A can generate these data blocks 2537.1-2537.K of data stream 2917.A in conjunction with execution of the respective operator on incoming data. This incoming data can correspond to one or more other streams of data blocks 2537 of another data stream 2917 accessed in memory resources 3045 based on being written by one or more child operator execution modules corresponding to child operators of the operator executed by operator execution module 3215.A. Alternatively or in addition, the incoming data is read from database storage 2450 and/or is read from one or more segments stored on memory drives, for example, based on the operator executed by operator execution module 3215.A being implemented as an IO operator.

The parent operator execution module 3215.B of operator execution module 3215.A can generate its own output data blocks 2537.1-2537.J of data stream 2917.B based on execution of the respective operator upon data blocks 2537.1-2537.K of data stream 2917.A. Executing the operator can include reading the values from and/or performing operations toy filter, aggregate, manipulate, generate new column values from, and/or otherwise determine values that are written to data blocks 2537.1-2537.J.

In other embodiments, the operator execution module 3215.B does not read the values from these data blocks, and instead forwards these data blocks, for example, where data blocks 2537.1-2537.J include memory reference data for the data blocks 2537.1-2537.K to enable one or more parent operator modules, such as operator execution module 3215.C, to access and read the values from forwarded streams.

In the case where operator execution module 3215.A has multiple parents, the data blocks 2537.1-2537.K of data stream 2917.A can be read, forwarded, and/or otherwise processed by each parent operator execution module 3215 independently in a same or similar fashion. Alternatively or in addition, in the case where operator execution module 3215.B has multiple children, each child's emitted set of data blocks 2537 of a respective data stream 2917 can be read, forwarded, and/or otherwise processed by operator execution module 3215.B in a same or similar fashion.

The parent operator execution module 3215.C of operator execution module 3215.B can similarly read, forward, and/or otherwise process data blocks 2537.1-2537.J of data stream 2917.B based on execution of the respective operator to render generation and emitting of its own data blocks in a similar fashion. Executing the operator can include reading the values from and/or performing operations to filter, aggregate, manipulate, generate new column values from, and/or otherwise process data blocks 2537.1-2537.J to determine values that are written to its own output data. For example, the operator execution module 3215.C reads data blocks 2537.1-2537.K of data stream 2917.A and/or the operator execution module 3215.B writes data blocks 2537.1-2537.J of data stream 2917.B. As another example, the operator execution module 3215.C reads data blocks 2537.1-2537.K of data stream 2917.A, or data blocks of another descendent, based on having been forwarded, where corresponding memory reference information denoting the location of these data blocks is read and processed from the received data blocks data blocks 2537.1-2537.J of data stream 2917.B enable accessing the values from data blocks 2537.1-2537.K of data stream 2917.A. As another example, the operator execution module 3215.B does not read the values from these data blocks, and instead forwards these data blocks, for example, where data blocks 2537.1-2537.J include memory reference data for the data blocks 2537.1-2537.J to enable one or more parent operator modules to read these forwarded streams.

This pattern of reading and/or processing input data blocks from one or more children for use in generating output data blocks for one or more parents can continue until ultimately a final operator, such as an operator executed by a root level node, generates a query resultant, which can itself be stored as data blocks in this fashion in query execution memory resources and/or can be transmitted to a requesting entity for display and/or storage.

For example, rather than accessing this large data for some or all potential records prior to filtering in a query execution, for example, via IO level 2416 of a corresponding query execution plan 2405 as illustrated in FIGS. 24A and 24C, and/or rather than passing this large data to other nodes 37 for processing, for example, from IO level nodes 37 to inner level nodes 37 and/or between any nodes 37 as illustrated in FIGS. 24A, 24B, and 24C, this large data is not accessed until a final stage of a query. As a particular example, this large data of the projected field is simply joined at the end of the query for the corresponding outputted rows that meet query predicates of the query. This ensures that, rather than accessing and/or passing the large data of these fields for some or all possible records that may be projected in the resultant, only the large data of these fields for final, filtered set of records that meet the query predicates are accessed and projected.

Figure 24P:
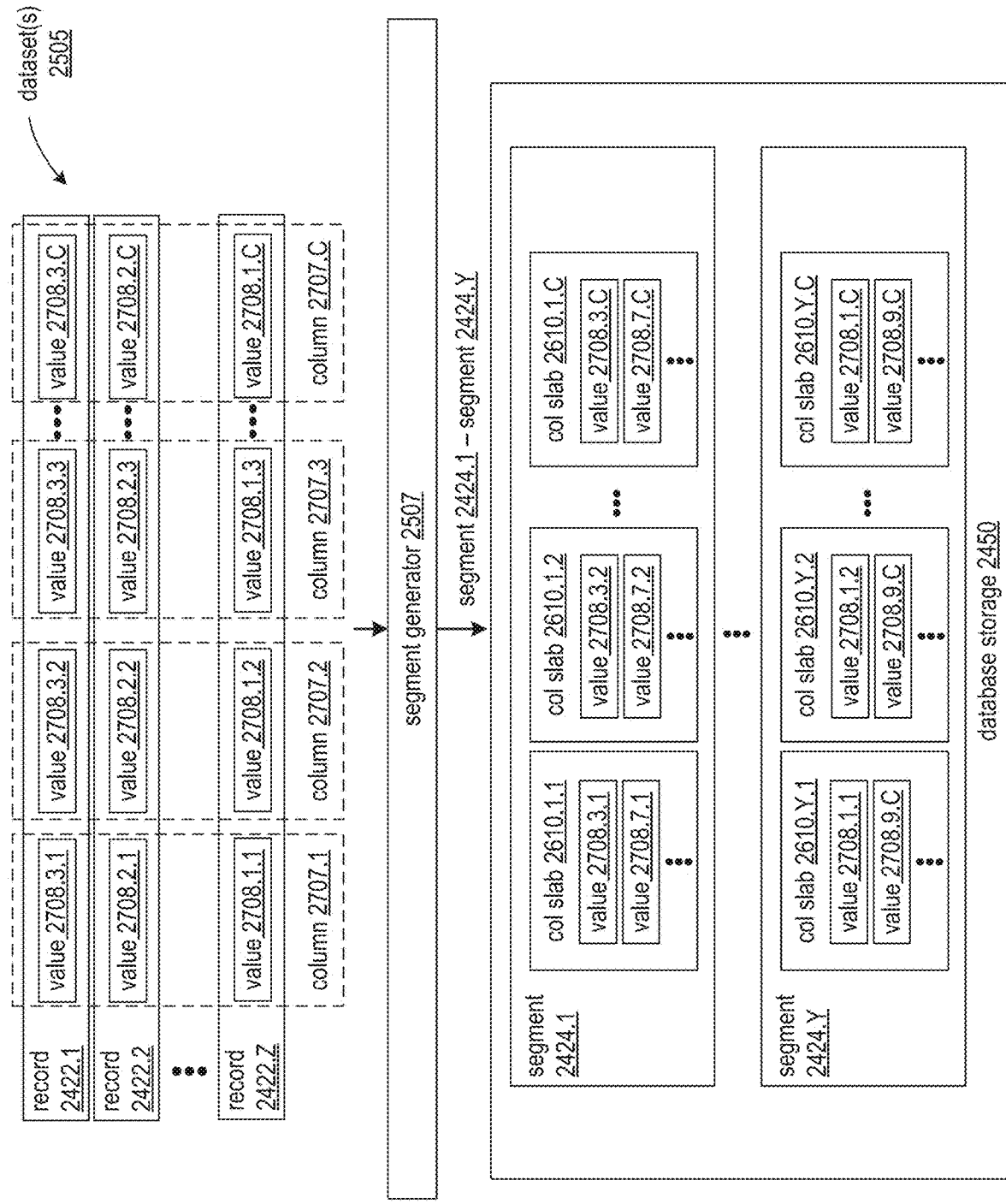
FIG. 24P is a schematic block diagram of a database system that implements a segment generator that generates segments from a plurality of records in accordance with various embodiments.

FIG. 24P illustrates an embodiment of a database system 10 that implements a segment generator 2507 to generate segments 2424. Some or all features and/or functionality of the database system 10 of FIG. 24P can implement any embodiment of the database system 10 described herein. Some or all features and/or functionality of segments 2424 of FIG. 24P can implement any embodiment of segment 2424 described herein.

A plurality of records 2422.1-2422.Z of one or more datasets 2505 to be converted into segments can be processed to generate a corresponding plurality of segments 2424.1-2424.Y. Each segment can include a plurality of column slabs 2610.1-2610.C corresponding to some or all of the C columns of the set of records.

In some embodiments, the dataset 2505 can correspond to a given database table 2712. In some embodiments, the dataset 2505 can correspond to only portion of a given database table 2712 (e.g. the most recently received set of records of a stream of records received for the table over time), where other datasets 2505 are later processed to generate new segments as more records are received over time. In some embodiments, the dataset 2505 can correspond to multiple database tables. The dataset 2505 optionally includes non-relational records and/or any records/files/ data that is received from/generated by a given data source multiple different data sources.

Each record 2422 of the incoming dataset 2505 can be assigned to be included in exactly one segment 2424. In this example, segment 2424.1 includes at least records 2422.3 and 2422.7, while segment 2424 includes at least records 2422.1 and 2422.9. All of the Z records can be guaranteed to be included in exactly one segment by segment generator 2507. Rows are optionally grouped into segments based on a cluster-key based grouping or other grouping by same or similar column values of one or more columns. Alternatively, rows are optionally grouped randomly, in accordance with a round robin fashion, or by any other means.

A given row 2422 can thus have all of its column values 2708.1-2708.C included in exactly one given segment 2424, where these column values are dispersed across different column slabs 2610 based on which columns each column value corresponds. This division of column values into different column slabs can implement the columnar-format of segments described herein. The generation of column slabs can optionally include further processing of each set of column values assigned to each column slab. For example, some or all column slabs are optionally compressed and stored as compressed column slabs.

The database storage 2450 can thus store one or more datasets as segments 2424, for example, where these segments 2424 are accessed during query execution to identify/read values of rows of interest as specified in query predicates, where these identified rows/the respective values are further filtered/processed/etc., for example, via operators 2520 of a corresponding query operator execution flow 2517, or otherwise accordance with the query to render generation of the query resultant.

FIG. 24Q illustrates an example embodiment of a segment generator 2507 of database system 10. Some or all features and/or functionality of the database system 10 of FIG. 24Q can implement any embodiment of the database system 10 described herein. Some or all features and/or functionality of the segment generator 2507 of FIG. 24Q can implement the segment generator 2507 of FIG. 24P and/or any embodiment of the segment generator 2507 described herein.

The segment generator 2507 can implement a cluster key-based grouping module 2620 to group records of a dataset 2505 by a predetermined cluster key 2607, which can correspond to one or more columns. The cluster key can be received, accessed in memory, configured via user input, automatically selected based on an optimization, or otherwise determined. This grouping by cluster key can render generation of a plurality of record groups 2625.1-2625.X.

The segment generator 2507 can implement a columnar rotation module 2630 to generate a plurality of column formatted record data (e.g. column slabs 2610 to be included in respective segments 2424). Each record group 2625 can have a corresponding set of J column-formatted record data 2565.1-2565.J generated, for example, corresponding to J segments in a given segment group.

A metadata generator module 2640 can further generate parity data, index data, statistical data, and/or other metadata to be included in segments in conjunction with the column-formatted record data. A set of X segment groups corresponding to the X record groups can be generated and stored in database storage 2450. For example, each segment group includes J segments, where parity data of a proper subset of segments in the segment group can be utilized to rebuild column-formatted record data of other segments in the same segment group as discussed previously.

In some embodiments, the segment generator 2507 implements some or all features and/or functionality of the segment generator disclosed by: U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes; U.S. Utility application Ser. No. 16/985,957 entitled "PARALLELIZED SEGMENT GENERATION VIA KEY-BASED SUBDIVISION IN DATABASE SYSTEMS", filed Aug. 5, 2020, which is hereby incorporated herein by reference in its entirety and made part of the present U.S. Utility Patent Application for all purposes; and/or U.S. Utility application Ser. No. 16/985, 930, entitled "RECORD DEDUPLICATION IN DATABASE SYSTEMS", filed Aug. 5, 2020, issued as U.S. Pat. No. 11,321,288 on May 3, 2022, which is hereby incorporated herein by reference in its entirety and made part of the present U.S. Utility Patent Application for all purposes. For example, the database system 10 implements some or all features and/or functionality of record processing and storage system of U.S. Utility application Ser. No. 16/985,723, U.S. Utility application Ser. No. 16/985,957, and/or U.S. Utility application Ser. No. 16/985,930.

Figure 24R:
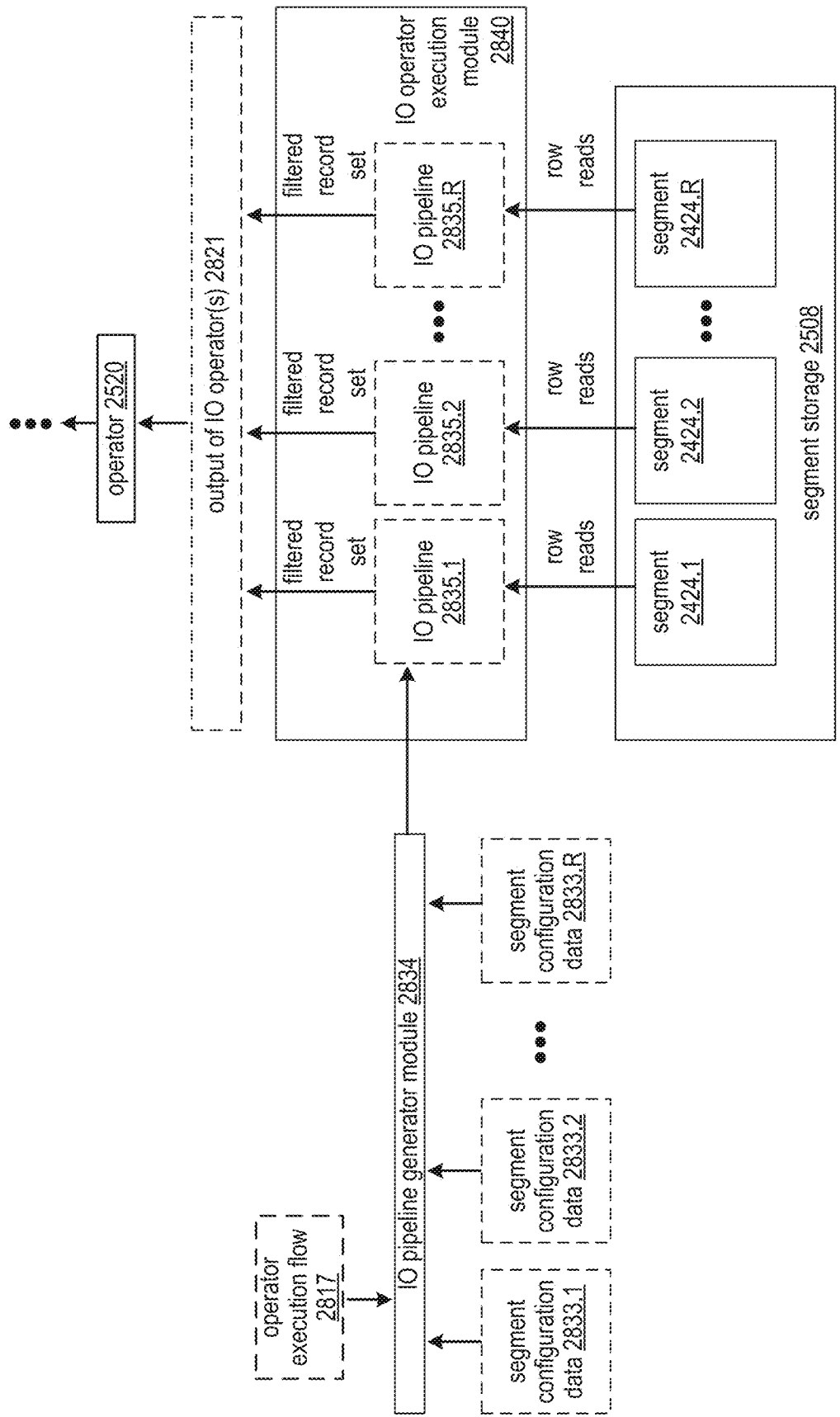
FIG. 24R is a schematic block diagram of a query processing system that generates and executes a plurality of IO pipelines to generate filtered records sets from a plurality of segments in conjunction with executing a query in accordance with various embodiments.

FIG. 24R illustrates an embodiment of a query processing system 2510 that implements an IO pipeline generator module 2834 to generate a plurality of IO pipelines 2835.1-2835.R for a corresponding plurality of segments 2424.1-2424.R, where these IO pipelines 2835.1-2835.R are each executed by an IO operator execution module 2840 to facilitate generation of a filtered record set by accessing the corresponding segment. Some or all features and/or functionality of the query processing system 2510 of FIG. 24R can implement any embodiment of query processing system 2510, any embodiment of query execution module 2504, and/or any embodiment of executing a query described herein.

Each IO pipeline 2835 can be generated based on corresponding segment configuration data 2833 for the corresponding segment 2424, such as secondary indexing data for the segment, statistical data/cardinality data for the segment, compression schemes applied to the column slabs of the segment, or other information denoting how the segment is configured. For example, different segments 2424 have different IO pipelines 2835 generated for a given query based on having different secondary indexing schemes, different statistical data/cardinality data for its values, different compression schemes applied for some of all of the columns of its records, or other differences.

An IO operator execution module 2840 can execute each respective IO pipeline 2835. For example, the IO operator execution module 2840 is implemented by nodes 37 at the IO level of a corresponding query execution plan 2405, where a node 37 storing a given segment 2424 is responsible for accessing the segment as described previously, and thus executes the IO pipeline for the given segment.

This execution of IO pipelines 2835 by IO operator execution module 2840 correspond to executing IO operators 2421 of a query operator execution flow 2517. The output of IO operators 2421 can correspond to output of IO operators 2421 and/or output of IO level. This output can correspond to data blocks that are further processed via additional operators 2520, for example, by nodes at inner levels and/or the root level of a corresponding query execution plan.

Each IO pipeline 2835 can be generated based on pushing some or all filtering down to the IO level, where query predicates are applied via the IO pipeline based on accessing index structures, sourcing values, filtering rows, etc. Each IO pipeline 2835 can be generated to render semantically equivalent application of query predicates, despite differences in how the IO pipeline is arranged/executed for the given segment. For example, an index structure of a first segment is used to identify a set of rows meeting a condition for a corresponding column in a first corresponding IO pipeline while a second segment has its row values sourced and compared to a value to identify which rows meet the condition, for example, based on the first segment having the corresponding column indexed and the second segment not having the corresponding column indexed. As another example, the IO pipeline for a first segment applies a compressed column slab processing element to identify where rows are stored in a compressed column slab and to further facilitate decompression of the rows, while a second segment accesses this column slab directly for the corresponding column based on this column being compressed in the first segment and being uncompressed for the second segment.

Figure 24S:
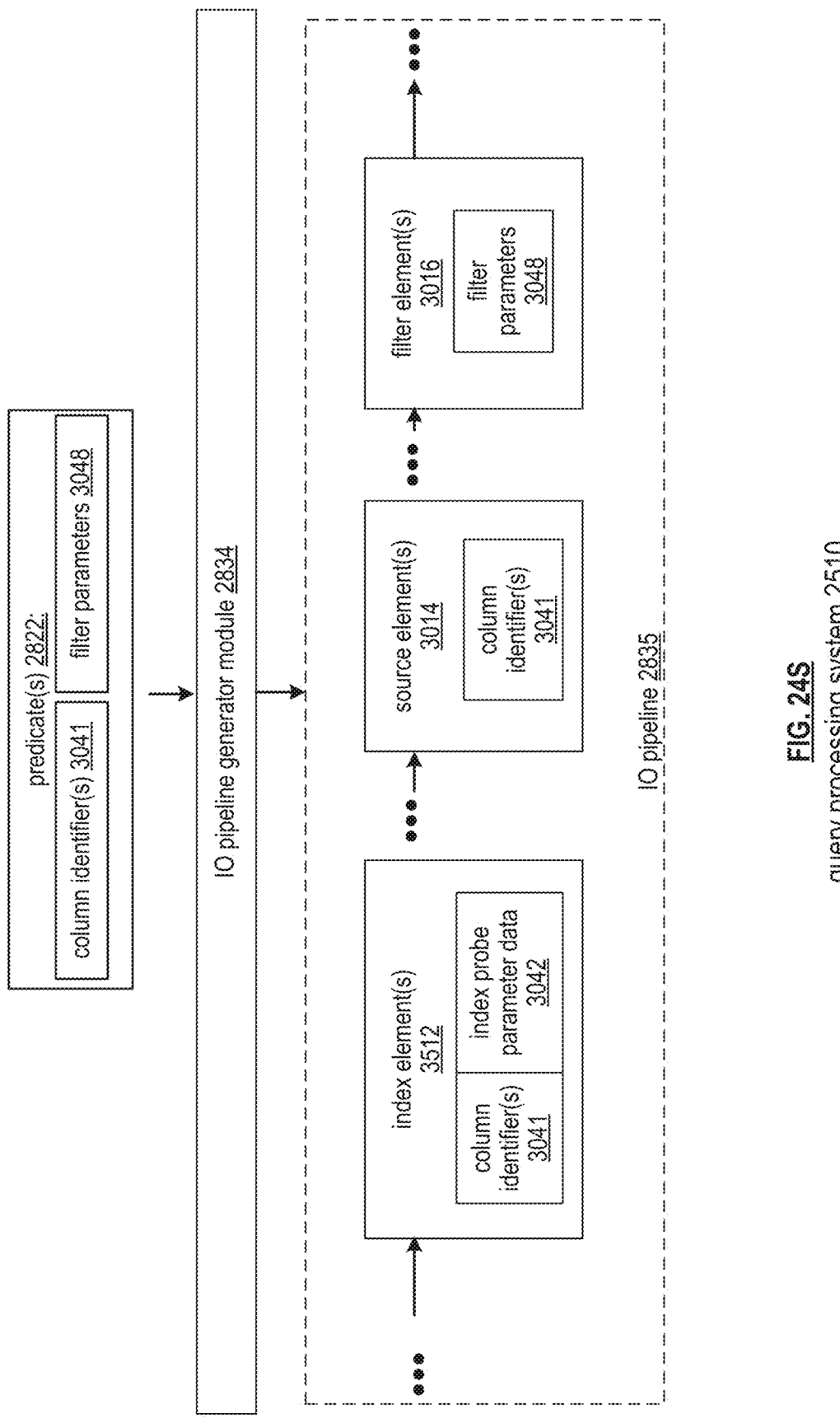
FIG. 24S is a schematic block diagram of a query processing system that generates an IO pipeline for accessing a corresponding segment based on predicates of a query in accordance with various embodiments.

FIG. 24S illustrates an example embodiment of an IO pipeline 2835 that is generated to include one or more index elements 3512, one or more source elements 3014, and/or one or more filter elements 3016. These elements can be arranged in a serialized ordering that includes one or more parallelized paths. These elements can implement sourcing and/or filtering of rows based on query predicates 2822 applied to one or more columns, identified by corresponding column identifiers 3041 and corresponding filter parameters 3048. Some or all features and/or functionality of the IO pipeline 2835 and/or IO pipeline generator module 2834 of FIG. 24S can implement the IO pipeline 2835 and/or IO pipeline generator module 2834 of FIG. 24R, and/or any embodiment of IO pipeline 2835, of IO pipeline generator module 2834, or of any query execution via accessing segments described herein.

In some embodiments, the IO pipeline generator module 2834, IO pipeline 2835, IO operator execution module 2840, and/or any embodiment of IO pipeline generation and/or IO pipeline execution described herein, implements some or all features and/or functionality of the IO pipeline generator module 2834, IO pipeline 2835, IO operator execution module 2840, and/or pushing of filtering and/or other operations to the IO level as disclosed by: U.S. Utility application Ser. No. 17/303,437, entitled "QUERY EXECUTION UTILIZING PROBABILISTIC INDEXING" and filed May 28, 2021; U.S. Utility application Ser. No. 17/450,109, entitled "MISSING DATA-BASED INDEXING IN DATABASE SYSTEMS" and filed Oct. 6, 2021; U.S. Utility application Ser. No. 18/310,177, entitled "OPTIMIZING AN OPERATOR FLOW FOR PERFORMING AGGREGATION VIA A DATABASE SYSTEM" and filed May 1, 2023; U.S. Utility application Ser. No. 18/355,505, entitled "STRUCTURING GEOSPATIAL INDEX DATA FOR ACCESS DURING QUERY EXECUTION VIA A DATABASE SYSTEM" and filed Jul. 20, 2023; and/or U.S. Utility application Ser. No. 18/485,861, entitled "QUERY PROCESSING IN A DATABASE SYSTEM BASED ON APPLYING A DISJUNCTION OF CONJUNCTIVE NORMAL FORM PREDICATES" and filed Oct. 12, 2023; all of which hereby incorporated herein by reference in its entirety and made part of the present U.S. Utility Patent Application for all purposes.

Figure 24T:
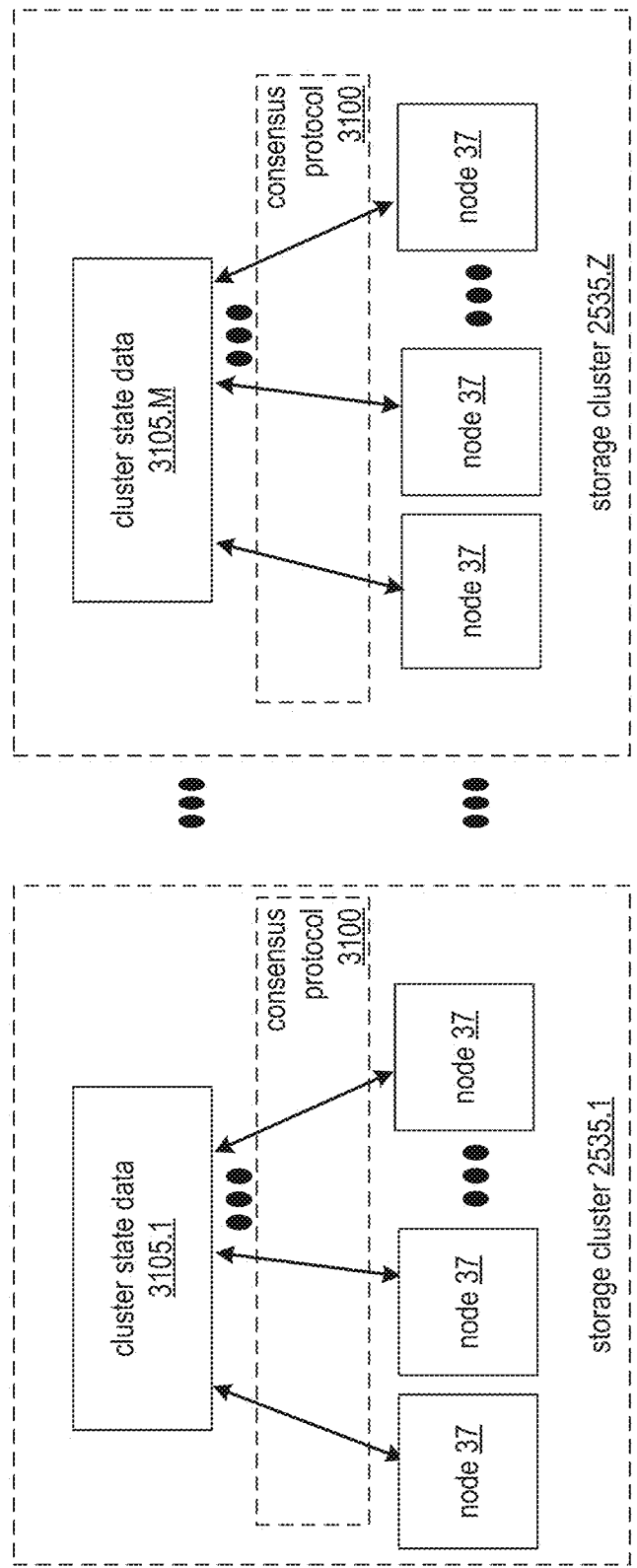
FIG. 24T is a schematic block diagram of a database system that includes a plurality of storage clusters that each mediate cluster state data via a plurality of nodes in accordance with a consensus protocol in accordance with various embodiments.

FIG. 24T presents an embodiment of a database system 10 that includes a plurality of storage clusters 2535. Storage clusters 2535.1-2535.Z of FIG. 24T can implement some or all features and/or functionality of storage clusters 35-1-35-Z described herein, and/or can implement some or all features and/or functionality of any embodiment of a storage cluster described herein. Some or all features and/or functionality of database system 10 of FIG. 24T can implement any embodiment of database system 10 described herein.

Each storage cluster 2535 can be implemented via a corresponding plurality of nodes 37. In some embodiments, a given node 37 of database system 10 is optionally included in exactly one storage cluster. In some embodiments, one or more nodes 37 of database system 10 are optionally included in no storage clusters (e.g. aren't configured to store segments). In some embodiments, one or more nodes 37 of database system 10 can be included in multiple storage clusters.

In some embodiments, some or all nodes 37 in a storage cluster 2535 participate at the IO level 2416 in query execution plans based on storing segments 2424 in corresponding memory drives 2425, and based on accessing these segments 2424 during query execution. This can include executing corresponding IO operators, for example, via executing an IO pipeline 2835 (and/or multiple IO pipelines 2835, where each IO pipeline is configured for each respective segment 2424). All segments in a given same segment group (e.g. a set of segments collectively storing parity data and/or replicated parts enabling any given segment in the segment group to be rebuilt/accessed as a virtual segment during query execution via access to some or all other segments in the same segment group as described previously) are optionally guaranteed to be stored in a same storage cluster 2535, where segment rebuilds and/or virtual segment use in query execution can thus be facilitated via communication between nodes in a given storage cluster 2535 accordingly, for example, in response to a node failing and/or a segment becoming unavailable.

Each storage cluster 2535 can further mediate cluster state data 3105 in accordance with a consensus protocol mediated via the plurality of nodes 37 of the given storage cluster. Cluster state data 3105 can implement any embodiment of state data and/or system metadata described herein. In some embodiments, cluster state data 3105 can indicate data ownership information indicating ownership of each segments stored by the cluster by exactly one node (e.g. as a physical segment or a virtual segment) to ensure queries are executed correctly via processing rows in each segment (e.g. of a given dataset against which the query is executed) exactly once.

Consensus protocol 3100 can be implemented via the raft consensus protocol and/or any other consensus protocol. Consensus protocol 3100 can be implemented be based on distributing a state machine across a plurality of nodes, ensuring that each node in the cluster agrees upon the same series of state transitions and/or ensuring that each node operates in accordance with the currently agreed upon state transition. Consensus protocol 3100 can implement any embodiment of consensus protocol described herein.

Coordination across different storage clusters 2535 can be minimal and/or non-existent, for example, based on each storage cluster coordinating state data and/or corresponding query execution separately. For example, state data 3105 across different storage clusters is optionally unrelated.

Each storage cluster's nodes 37 can perform various database tasks (e.g. participate in query execution) based on accessing/utilizing the state data 3105 of its given storage cluster, for example, without knowledge of state data of other storage clusters. This can include nodes syncing state data 3105 and/or otherwise utilizing the most recent version of state data 3105, for example, based on receiving updates from a leader node in the cluster, triggering a sync process in response to determining to perform a corresponding task requiring most recent state data, accessing/updating a locally stored copy of the state data, and/or otherwise determining updated state data.

In some embodiments, updating of state data (such as configuration data, system metadata, data shared via a consensus protocol, and/or any other state data described herein), for example, utilized by nodes to perform respective functionality over time, can be performed in conjunction with an event driven model. In some embodiments, such updating of state data over time can be performed in a same or similar fashion as updating of configuration data as disclosed by: U.S. Utility application Ser. No. 18/321,212, entitled COMMUNICATING UPDATES TO SYSTEM METADATA VIA A DATABASE SYSTEM, filed May 22, 2023; and/or U.S. Utility application Ser. No. 18/310,262, entitled "GENERATING A SEGMENT REBUILD PLAN VIA A NODE OF A DATABASE", filed May 1, 2023; which are hereby incorporated herein by reference in their entirety and made part of the present U.S. Utility Patent Application for all purposes.

In some embodiments, system metadata can be generated and/or updated over time with different corresponding metadata sequence numbers (MSNs). For example, such generation/updating of metadata over time can be implemented via any features and/or functionality of the generation of data ownership information over time with corresponding OSNs as disclosed by U.S. Utility application Ser. No. 16/778,194, entitled "SERVICING CONCURRENT QUERIES VIA VIRTUAL SEGMENT RECOVERY", filed Jan. 31, 2020, and issued as U.S. Pat. No. 11,061,910 on Jul. 13, 2021, which is hereby incorporated herein by reference in its entirety and made part of the present U.S. Utility Patent Application for all purposes. In some embodiments, the system metadata management system 2702 and/or a corresponding metadata system protocol can be implemented via a consensus protocols mediated via a plurality of nodes, for example, to update system metadata 2710, in a via any features and/or functionality of the execution of consensus protocols mediated via a plurality of nodes as disclosed by this U.S. Utility application Ser. No. 16/778,194. In some embodiments, each version of system metadata 2710 can assign nodes to different tasks and/or functionality via any features and/or functionality of assigning nodes to different segments for access in query execution in different versions of data ownership information as disclosed by this U.S. Utility application Ser. No. 16/778,194. In some embodiments, system metadata indicates a current version of data ownership information, where nodes utilize system metadata and corresponding system configuration data to determine their own ownership of segments for use in query execution accordingly, and/or to execute queries utilizing correct sets of segments accordingly, based on processing the denoted data ownership information as U.S. Utility application Ser. No. 16/778,194.

Figure 24U:
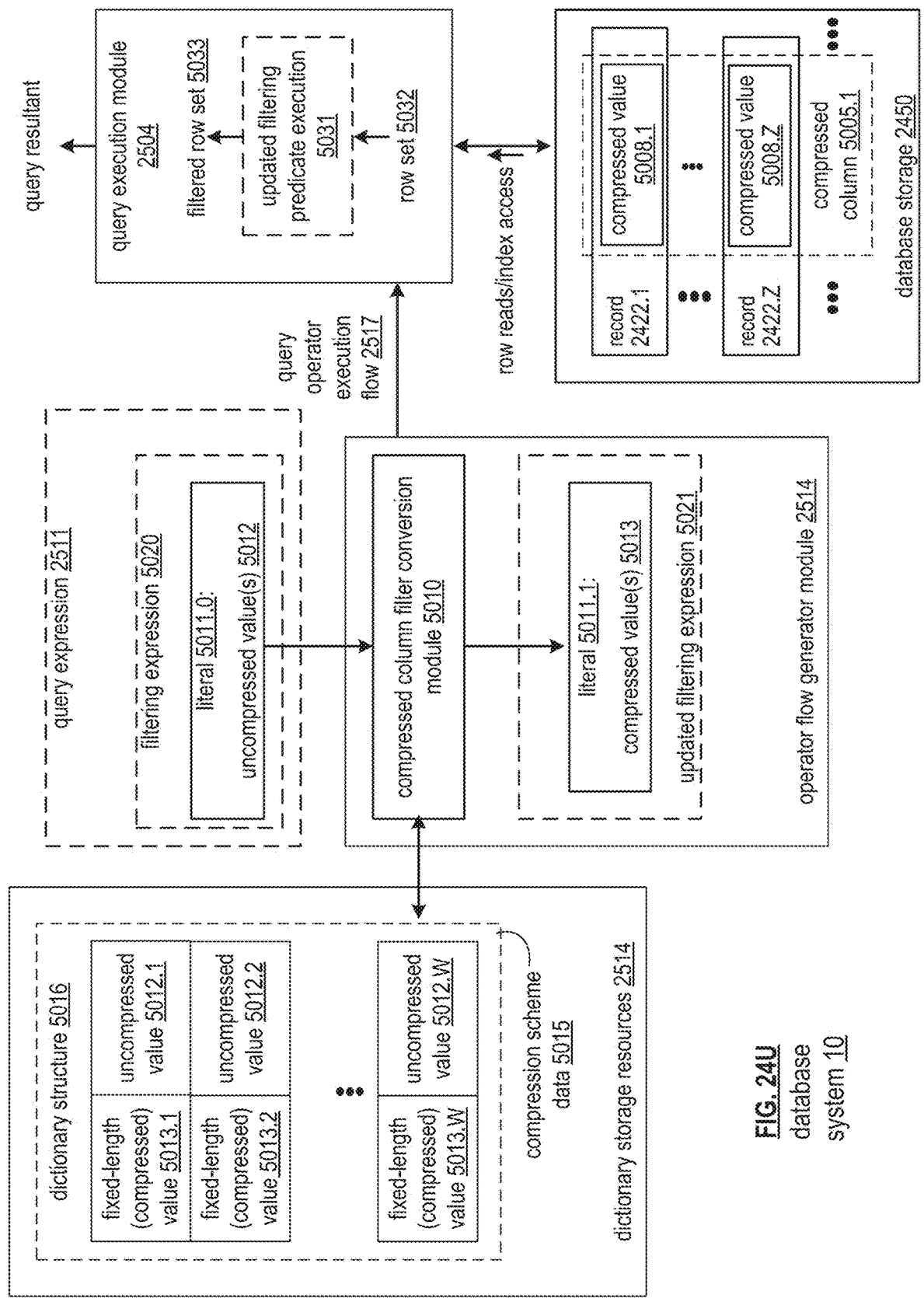
FIG. 24U is a schematic block diagram of a database system that implements a compressed column filter conversion module based on accessing a dictionary structure in accordance with various embodiments.
Figure 24V:
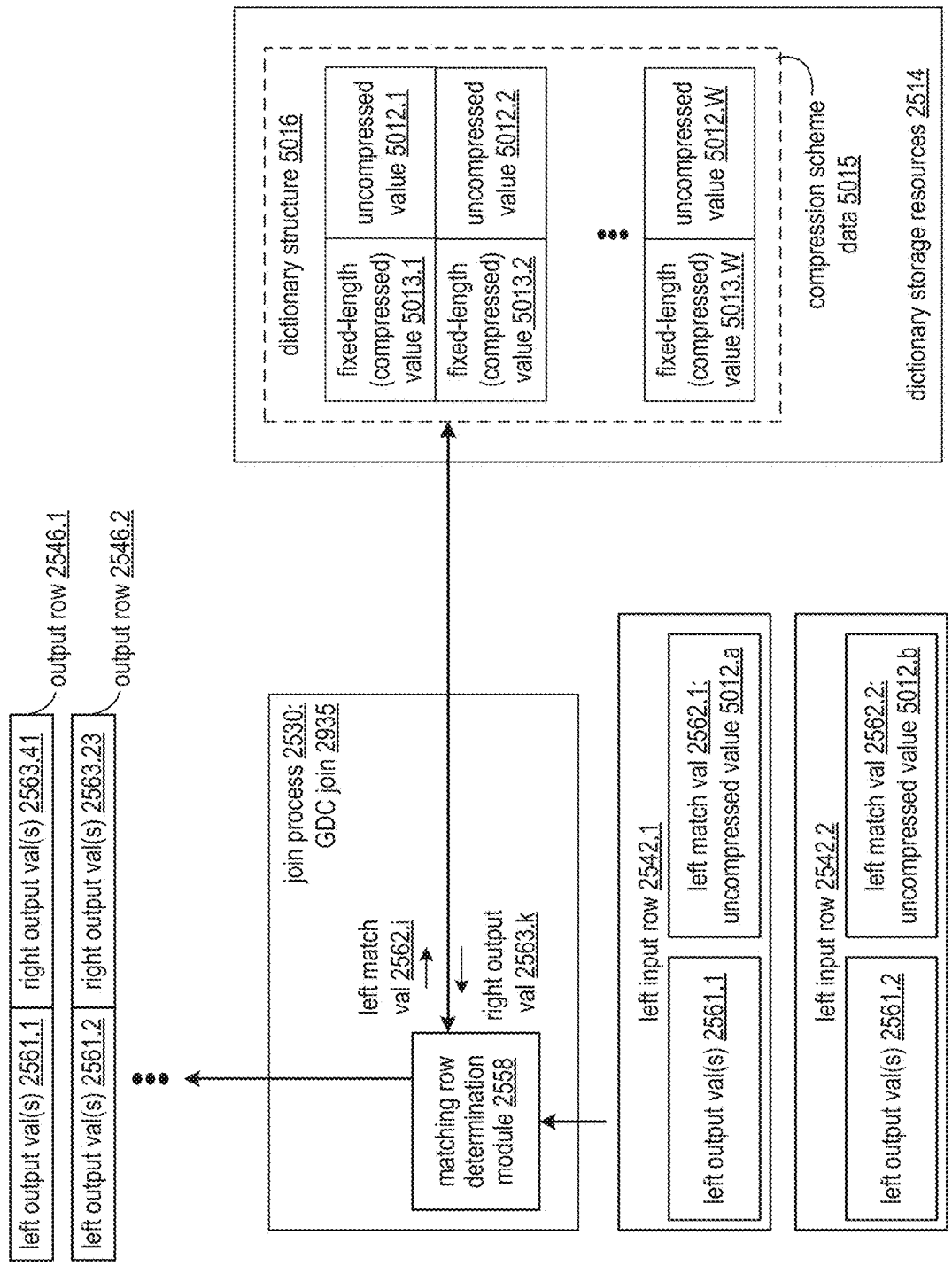
FIG. 24V is a schematic block diagram of a query execution module that implements a Global Dictionary Compression join via access to a dictionary structure in accordance with various embodiments.

FIGS. 24U and 24V illustrate embodiments of a database system 10 that utilizes a dictionary structure to store compressed columns. Some or all features and/or functionality of the dictionary structure 5016 of FIGS. 24U and/or 24V can implement any compression scheme data and/or means of generating and/or accessing compressed columns described herein. Any other features and/or functionality of database system 10 of FIGS. 24U and/or 24V can implement any other embodiment of database system 10 described herein.

In some embodiments, columns are compressed as compressed columns 5005 based on a globally maintained dictionary (e.g. dictionary structure 5016), for example, in conjunction with applying Global Dictionary Compression (GDC). Applying Global Dictionary Compression can include replaces variable length column values with fixed length integers on disk (e.g. in database storage 2450), where the globally maintained dictionary is stored elsewhere, for example, via different (e.g. slower/less efficient) memory resources of a different type/in a different location from the database storage 2450 that stores the compressed columns 5005 accessed during query execution.

The dictionary structure can store a plurality of fixed-length, compressed values 5013 (e.g. integers) each mapped to a single uncompressed value 5012 (e.g. variable-length values, such as strings). The mapping of compressed values 5013 to uncompressed values 5012 can be in accordance with a one-to-one mapping. The mapping of compressed values 5013 to uncompressed values 5012 can be based on utilizing the fixed-length values 5013 as keys of a corresponding map and/or dictionary data structure, and/or can be based on utilizing the uncompressed values 5012 as keys of a corresponding map and/or dictionary data structure.

A given uncompressed value 5012 that is included in many rows of one or more tables can be replaced (i.e. "compressed") via a same corresponding compressed value 5013 mapped to this uncompressed value 5012 as the compressed value 5008 for these rows in compressed column 5005 in database storage. As new rows are received for storage over time, their column values for one or more compressed columns 5005 can be replaced via corresponding compressed values 5008 based on accessing the dictionary structure and determining whether the uncompressed value 5012 of this column is stored in the dictionary structure 5016. If yes, the compressed value 5013 mapped to the uncompressed value 5012 in this existing entry is stored as compressed value 5008 in the compressed column 5005 in the database storage 2450. If no, the dictionary structure 5016 can be updated to include a new entry that includes the uncompressed value 5012 and a new compressed value 5013 (e.g. different from all existing compressed values in the structure) generated for this uncompressed value 5012, where this new compressed value 5013 is stored as is applied as compressed value 5008 in the database storage 2450.

The dictionary structure 5016 can be stored in dictionary storage resources 2514, which can be different types of resources from and/or can be stored in a different location from the database storage 2450 storing the compressed columns for query execution. In some embodiments, the dictionary storage resources 2514 storing dictionary structure 5016 can be considered a portion/type of memory as of database storage 2450 that are accessed during query execution as necessary for decompressing column values. In some embodiments, the dictionary storage resources 2514 storing dictionary structure 5016 can be implemented as metadata storage resources, for example, implemented by a metadata consensus state mediated via a metadata storage cluster of nodes maintaining system metadata such as GDCs of the database system 10.

The dictionary structure 5016 can correspond to a given column 5005, where different columns optionally have their own dictionary structure 5016 build and maintained. Alternatively, a common dictionary structure 5016 can optionally be maintained for multiple columns of a same table/same dataset, and/or for multiple columns across different tables/different datasets. For example, a given uncompressed value 5012 appearing in different columns 5005 of the same or different table is compressed via the same fixed-length value 5013 as dictated by the dictionary structure 5016.

This dictionary structure 5016 can be globally maintained (e.g. across some or all nodes, indicating fixed length values mapped across one or more segments stored in conjunction with storing one or more relational database tables) and can be updated overtime (e.g. as more data is added with new variable length values requiring mapping to fixed length values). For example, the dictionary structure 5016 is maintained/stored in state data that is mediated/accessible by some or all nodes 37 of the database system 10 via the dictionary structure 5016 being included in any embodiment of state data described herein.

In some embodiments, dictionary compression via dictionary structure 5016 can implement the compression scheme utilized to generate (e.g. compress/decompress the values of) compressed columns 5005 of FIG. 24U based on implementing some or all features and/or functionality of the compression of data during ingress via a dictionary as disclosed by U.S. Utility application Ser. No. 16/985,723, entitled "DELAYING SEGMENT GENERATION IN DATABASE SYSTEMS", filed Aug. 5, 2020, which is hereby incorporated herein by reference in its entirety and made part of the present U.S. Utility Patent Application for all purposes.

In some embodiments, dictionary compression via dictionary structure 5016 can implement the compression scheme utilized to generate (e.g. compress/decompress the values of) compressed columns 5005 of FIG. 24U based on implementing some or all features and/or functionality of global dictionary compression as disclosed by U.S. Utility application Ser. No. 16/220,454, entitled "DATA SET COMPRESSION WITHIN A DATABASE SYSTEM", filed Dec. 14, 2018, issued as U.S. Pat. No. 11,256,696 on Feb. 22, 2022, which is hereby incorporated herein by reference in its entirety and made part of the present U.S. Utility Patent Application for all purposes.

In some embodiments, dictionary compression via dictionary structure 5016 can be utilized in performing GDC join processes during query execution to enable recovery of uncompressed values during query execution, for example, based on implementing some or all features and/or functionality of GDC joins as disclosed by U.S. Utility application Ser. No. 18/226,525, entitled "SWITCHING MODES OF OPERATION OF A ROW DISPERSAL OPERATION DURING QUERY EXECUTION", filed Jul. 26, 2023, which is hereby incorporated herein by reference in its entirety and made part of the present U.S. Utility Patent Application for all purposes.

FIG. 24U illustrates an embodiment of database system 10 where a compressed column filter conversion module 5010 accesses a dictionary structure 5016 to generate an updated filtering expression 5021 in conjunction with query execution.

The compressed column filter conversion module 5010 can generate updated filtering expression 5021 based on updating one or more literals 5011.1 from corresponding literals 5011.0 based on replacing uncompressed values 5012 with compressed values 5013 mapped to these compressed values based on accessing dictionary structure 5016 and determining which fixed-length compressed value 5013 is mapped to each given uncompressed value 5012. Such functionality can be implemented for one or more queries executed by database system 10 to reduce access to the dictionary structure during query execution in conjunction with performing one or more optimizations of the query operator execution flow to improve query performance.

FIG. 24V illustrates an embodiment of executing a join process 2530 that is implemented as a global dictionary compression (GDC) join. This can include applying a matching row determination module 2558 via access to a dictionary structure 5016, In some embodiments, unlike hash maps generated during query execution for access in conjunction with executing other types of JOIN operations (e.g. as described in U.S. Utility application Ser. No. 18/266,525), the dictionary structure 5016 can optionally be accessed during GDC join processes based on being globally maintained, and thus being generated prior to execution of the corresponding query. In particular, the dictionary structure 5016 can be implemented in conjunction with compressing one or more columns, such as a variable length values stored in one or more variable length columns, by mapping these variable length, uncompressed values (e.g. strings, other large values of a given column) to corresponding fixed-length, compressed values 5013 (e.g. integers or other fixed length values).

For example, segments can store the fixed length values to improve storage efficiency and/or queries can access and process these fixed length values, where the uncompressed variable length values are only required via access to dictionary structure 5016 to emit an uncompressed value 5012 for a given fixed-length value 5013 of a given input row. This functionality can be achieved via performing a corresponding join as described herein, where the matching condition 2519 is implemented for a compressed column and indicates matching by the value of the compressed column, such as simply emitting the uncompressed value mapped to the compressed column as the right output value 2563 for a given input row, implemented as a left input row 2542 of a join operation.

Figure 24W:
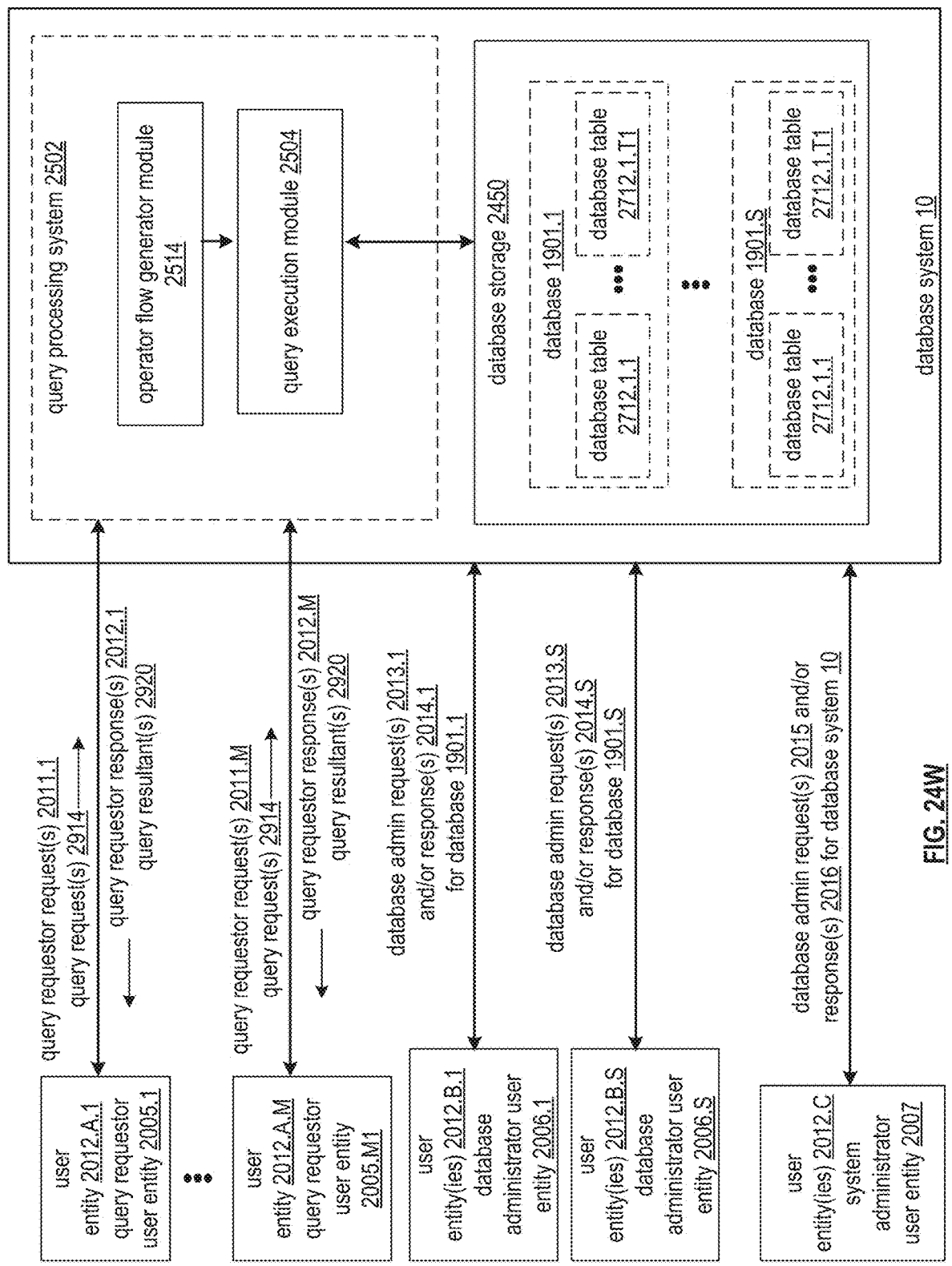
FIG. 24W is a schematic block diagram illustrating communication between database system 10 and a plurality of user entities in accordance with various embodiments.

FIG. 24W illustrates an embodiment of database system 10 operable to communicate with a plurality of user entities.

Some or all features and/or functionality of FIG. 24W can implement any embodiment of database system 10 described herein.

Various users can send data to and/or receive data from database system 10 over time, for example, as corresponding requests and/or responses. Requests can indicate requests for queries to be executed, requests that include data to be loaded/stored, requests that include configuration data configuring any values/functionality utilized by database system 10 to perform its functionality, data supplied in response to a request from database system 10, and/or other requests to database system 10 for processing by database system 10. Responses can indicate query resultants of executed queries, notifications/confirmation that requests were processed successfully or rendered failure, error notifications, data supplied in response to a request from user entity 2012, and/or other information.

Some or all user entities 2012 can be implemented as user entities corresponding to humans that communicate with database system 10 (e.g. requests are configured via user input to a corresponding computing device of database system 10 or communicating with database system 10); user entities corresponding to groups of multiple people, for example, corresponding to companies/establishments that communicate with database system 10; user entities corresponding to automated entities such as one or more computing devices and/or server systems (e.g. implemented via artificial intelligence, machine learning, and/or configured instructions to cause these automated entities to send requests and/or process responses; and/or corresponding to a given person and configured to send/receive data based on user input from a corresponding person); and/or other user entities. Some or all user entities 2012 can be implemented as humans and/or devices included in/associated with database system 10 (e.g. personnel/employees of a service provided by database system 10; computing devices implementing nodes/processing modules of database system 10 that communicate via internal communication resources of database system 10, etc.). Some or all user entities 2012 can be implemented as humans and/or devices external from database system 10 (e.g. humans/companies that are customers of a service provided by database system 10; computing devices external from the computing devices/nodes/processing resources of database system 10 that communicate with database system 10 via a corresponding communication interface, etc.)

User entities 2012 can include various type of user entities 2012, which can include one or more user entities 2012.A, one or more user entities 2012.B, and/or one or more user entities 2012.C. A given user entity can optionally implement multiple types of user entities 2012 (e.g. a given user entity 2012 operates as both a user entity 2012.A and a user entity 2012.B). Multiple different users (e.g. different people, different devices) can implement a given user entity 2012 (e.g. different employees of a given company implement a given user entity 2012 at different times; different devices associated with a given person or company implement a given user entity 2012 at different times, etc.).

In some embodiments, some or all user entities 2012 can configure/perform functionality corresponding to workload management (WLM).

User entities 2012 can include one or more user entities 2012.A.1-2012.A.M corresponding to query requestor user entities 2005.1-2005.M. Query requestor user entities 2005 can send query requests 2914 indicating queries for execution and/or receive query resultants in response 2920. User entities 2012 can optionally be implemented in a same or similar fashion as external requesting entity 2912.

User entities 2012 can include one or more user entities 2012.B.1-2012.B.S corresponding to database administrator user entities 2006 that request/configure/monitor loading/storage of/access to a corresponding database 1901 that stores a corresponding plurality of database tables 2712.1-2712-T (e.g. database administrator user entities 2006 optionally correspond to data sources that load their data to the system for use in query execution, where this data source sources data included in tables 2712 of a corresponding database 1901).

For example, in some embodiments, database system 10 can implement database storage 2450 to store various tables 2712 corresponding to multiple different databases 1902.1-1901.S, for example, each sourced by, accessible by, and/or configured via corresponding user entities 2012.B. Different databases 1901 can store same or different types of data, same or different numbers of tables 2712, etc. Some or all user entities 2012.A can correspond to a given database 1901 (e.g. based on being associated with the corresponding data source and/or user entities 2012.B) for example, where these user entities are only allowed to query against the given database 1901.

User entities 2012 can include one or more user entities 2012.C corresponding to system administrators of the database system 10 that request/configure/monitor loading/storage of/access to databases in query execution and/or otherwise configure/monitor functionality of database system 10 described herein.

Different user entities can have different corresponding permissions/privileges/access types, for example, indicated in corresponding user permissions data stored by and/or accessible by database system 10. In some embodiments, one or more given user entities can configure permissions of other user entities. Such permissions can configure types of requests that can be sent, restrictions on data included in responses, and/or which data can be accessed (e.g. in loading data and/or requesting data). For example, some users entities 2012.A can be restricted to certain types of queries/query functions be performed, access to only some databases 1902 and/or only some tables 2712, limits on how many queries be executed/how much data be returned, certain levels of query priority, certain service classes of query execution defining corresponding attributes of how queries be executed/how query execution be restricted, etc. As another example, some user entities 2012.B can be restricted to certain types/rates of data loading to a corresponding database 1901, certain permissions regarding how much configuration of database system 10 they can have power over, etc. As another example, different user entities 2012.C can have different permissions regarding how much configuration of database system 10 they can have power over, different functionalities/aspects of database system that they have permissions to configure, etc.

Figure 25A:
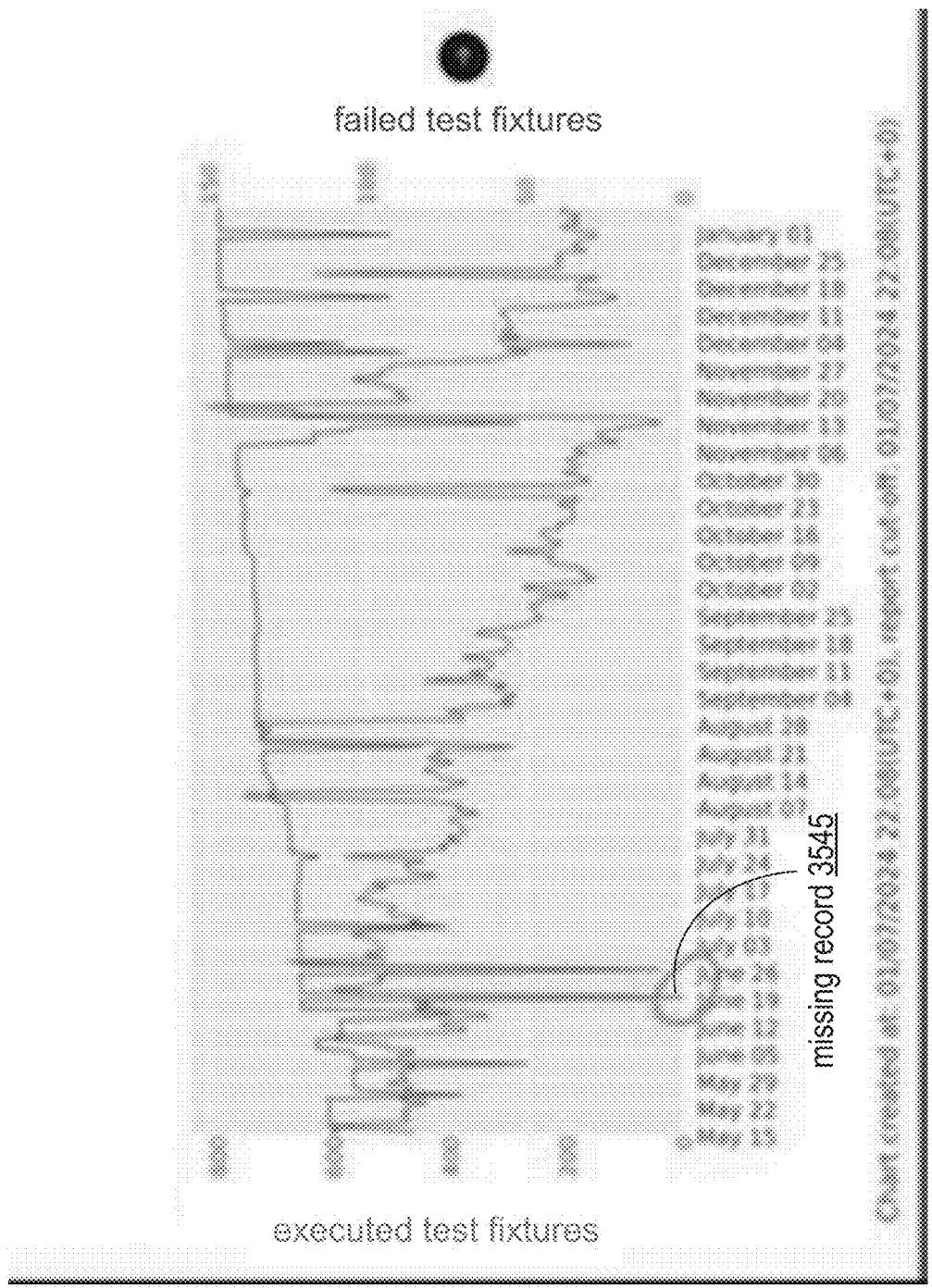
FIG. 25A is a chart illustrating a missing record in test data in accordance with various embodiments.

FIG. 25A is a chart illustrating an example of performing test executions for time series data in accordance with various embodiments. As shown, time series data can have one or more gaps, caused by missing records 3545. In some examples, the missing record 3545 results from broken builds, data corruption, or infrastructure issues. The gaps in the time series data can cause a significant amount of complexity in fulfilling accurate queries and/or maintaining accurate time series data. In an example, the gaps can be propagated to other systems via replication and batch unloading processes.

In the example of FIG. 25A, test executions are run every day. The missing record 3545 results in no value being available for the test for a certain day where a record should have been stored. Without a record for each time period (e.g., a day), the scale of the x-axis is not equi-distant or linear. If the missing record is assigned a value of zero ("0"), the graph gives the wrong impression. For example, in the chart of 25A, it would appear that the date associated with the missing record 3545 had zero text execution failures, which is most cases is not accurate. In some cases, linear interpolation may be more appropriate than entering a zero value, and different interpolations may be adopted for different use cases. Further, querying the data and performing such interpolations in SQL can be complex and expensive.

In some examples, gaps need to be identified. As an example, a gap is two rows of a time series data table with adjacent timestamps, but the difference between those timestamps exceeds a certain threshold (e.g. more than 1 day, more than a minute, more than a tenth of a second, etc.). Such gaps can be found in a SQL query using window functions or joins.

As an example, consider the following table representing time series data:

| Timestamp | Value |
| --- | --- |
| 2024 Feb. 15 14:13:18.706657 | 1 |
| 2024 Feb. 15 14:13:27.249909 | 2 |
| 2024 Feb. 15 14:13:36.288357 | 3 |
| 2024 Feb. 15 14:13:41.547569 | 4 |
| 2024 Feb. 15 14:13:47.571496 | 5 |

An example of an SQL query to identify a gap is shown by the following:
 SELECT cur_timestamp, next_timestamp, cur_value
 FROM (SELECT timestamp AS cur_timestamp,
  value AS cur_value,
  LEAD(timestamp) OVER (ORDER BY timestamp)
   AS next_timestamp
  FROM measurements) AS t
 WHERE DATEDIFF(second, cur_timestamp, next_timestamp)>5;
This produces the following table:

| Current Timestamp | Next Timestamp | Current Value |
| --- | --- | --- |
| 2024 Feb. 15 14:13:18.706657 | 2024 Feb. 15 14:13:27.249909 | 1 |
| 2024 Feb. 15 14:13:27.249909 | 2024 Feb. 15 14:13:36.288357 | 2 |
| 2024 Feb. 15 14:13:41.547569 | 2024 Feb. 15 14:13:47.571496 | 4 |

Thus, this SQL query returns the information which consecutive timestamps have a gap exceeding 5 seconds. However, in this example, the table does not include the next row's value, which is needed for calculating missing values via interpolation, which increases complexity.

As an example of adding the next value, an SQL query expression can include:
 SELECT cur_timestamp, next_timestamp, cur_value,
  m.value AS next_value
 FROM (SELECT timestamp AS cur_timestamp,
  value AS cur_value,
  LEAD(timestamp) OVER (ORDER BY timestamp)
   AS next_timestamp
  FROM measurements) AS t
 JOIN measurements AS m ON
  t.next_timestamp=m.timestamp
 WHERE DATEDIFF(second, cur_timestamp, next_timestamp)>5;
This produces the following table:

| Current Timestamp | Next Timestamp | Current Value | Next Value |
| --- | --- | --- | --- |
| 2024 Feb. 15 14:13:18.706657 | 2024 Feb. 15 14:13:27.249909 | 1 | 5 |
| 2024 Feb. 15 14:13:27.249909 | 2024 Feb. 15 14:13:36.288357 | 2 | 3 |
| 2024 Feb. 15 14:13:41.547569 | 2024 Feb. 15 14:13:47.571496 | 4 | 2 |

In an example where no window functions are available, joins can be employed. However, a join may be even more complex because the same table needs to be joined three times in order to find exactly the one preceding row. Because these specific join conditions have to use greater-than/less-than comparisons, they do not always lend themselves to the best and most efficient join algorithms (e.g. hash joins).

This very simple example already demonstrates the complexity that such a SQL query brings. In one example, this gap-detection mechanism may be implemented in a procedural language like Python or in a stored procedure. In some examples, consecutive rows of the result set can be compared and processed in any way necessary. However, this is much less generic and querying the same data for different purposes (e.g. in new applications) is difficult at best.

In some examples, missing values can be interpolated if the preceding/next values are known. For example, a very simple approach is to calculate the mean is shown by the following equation:

$$interpolated\_value = (prev\_value + next\_value)/2$$

In some examples, more complex calculations can be implemented like cubic splines etc. However, in examples where multiple consecutive values are missing, the interpolation becomes even more complex. Further, expressing the interpolation in SQL syntax can be challenging.

In an example where no next value is known (e.g., because the most recent measurement isn't currently available), extrapolation can be implemented. However, in most examples, extrapolation is more complex than interpolation. Thus, when time series data is stored with a gap, numerous complexities arise when attempting to execute a query on the time series data.

To reduce complexity, ensure data constraint conformity, and/or increase database time series data storage reliability and/or accuracy, the database system defines a table in a relational database system such that it will store measurements deterministically for a time grid. Depending on the defined granularity/resolution, a measurement is guaranteed to exist for each time interval. The measurement is either stored in the table by ingesting it (e.g., an INSERT statement), or by interpolating/extrapolating it from existing values to produce an estimated or synthetic value that attempts to accurately recreate expected data for a particular time of the time series data. In an example, the measured value (or calculated value) is stored persistently. In another example, the synthetic data is also stored persistently. In some examples, if a measure value is later obtained, the measured value replaces the synthetic value. In some examples, once the measured value is obtained, the synthetic value is deleted, hidden, and/or changes storage locations.

In an example, a specification for the storing measurements deterministically is employed to define one or more of: granularity/precision/resolution/interval size (e.g., use an interval size of "1 hour"), a formula for missing values, (e.g., when the next interval (based on CURRENT_TIMESTAMP) expires and no value is available for this interval, calculate a "substitute value", (e.g., via interpolation, extrapolation, merging, substitution, shifting, etc.)) and how to handle/merge multiple values (calculated and/or measured) that fall into a single time interval (e.g., always discard "substitute value", compute the average of multiple measurements, attempt to shift measurements into the previous or next interval in case those intervals don't have a value or just a "substitute value", etc.).

Further, among some of many of the benefits of this system for storing measurements deterministically include the database system guaranteeing the presence of values. Thus, any SQL query processing the data in such a table does not have to worry about the complexities of the following: (a) missing values, (b) handling multiple values in the same interval, and/or (c) dealing with the intervals and their resolutions.

In some examples, the improvements for storing measurements deterministically provide the benefit that no outer joins are needed in the SQL query to detect gaps (for (a)). Further, no formula needs to be embedded into the SQL statement to calculate missing values (for (b)). Still further, truncation of timestamps is needed (for (c)) as would be the case if each measurement is accompanied with a timestamp with nanoseconds precision but having a constraint of only one measurement per minute. In an example, a result of the specification for handling the intervals may lead to all timestamps/intervals to be stored with the same precision. This paves the way for better index exploitation during query execution because of the no longer needed timestamp truncation. That's especially relevant if no simple "drop fractions of seconds" are used to reduce the timestamp's precision but rather "round to the nearest minute". Such rounding mechanisms are more complex, of course.

Further benefits by persistently storing missing values include automatically improving audit-ability. If an SQL query were to calculate missing values (or this is embedded into a view definition), changes to the SQL query/view definition can lead to different results. Auditing such queries is inherently more complex.

In an example, to resolve the issues of missing records, introducing a MIN_DENSITY constraint is proposed for the system. Such a constraint is enforced while submitting DML and on the ingestion from event streaming sources like, for example, Kafka and others. In case of a missing data point, different fill strategies are available: For example, creating a synthetical data point holding default values, creating a synthetical data point holding null values, creating a synthetical data point holding values from a predefined inter/extrapolation method, and creating a synthetical data point holding values calculated by an SQL expression.

As an example, one SQL expression for calculating a synthetic data point include:
CREATE TABLE measures (
　　time float NOT NULL,
　　value int,
　　CONSTRAINT my_constraint MIN_DENSITY (time, 1.0, <SQL expression>) #(column, precision, SQL expression)
);

In an example, a constraint can be added to a table using an ALTER TABLE< >ADD CONSTRAINT< >statement. In an example, when setting up the deterministically storing measurements, the system can perform a function to close all time gaps in the already existing data (e.g., previous records of the time series data) for consistency and to enable the optimizer to use equi-joins unconditionally.

In some examples, another constraint can be implemented that enforces density not backwards and relies on the DBAs filling the gaps in a different manner. Hence, for data points prior to the constraint or the specification for the deterministically storing measurements creation, this is an informational constraint. One of the benefits to this approach is reducing the high level lock contention significantly and allowing constraint creation to be less expensive.

In some examples, the system can determine that a time series has become too dense in some time areas and/or is too dense for a constraint.

In an example, a density SQL expression can be implemented as follows:
CREATE TABLE measures (
　　time float NOT NULL,
　　value int,
　　CONSTRAINT my_constraint DENSITY (time, 1.0, <SQL expression>) #(column, precision, SQL expression)
);

In some examples where the times series data is determined to have a density exceeding a threshold density, the database e system can create synthetical data points by merging existing data points of the dense time series data to achieve the desired density.

As a few examples of generating synthetical data, the database system may create a synthetical data point with a default values, create a synthetical data point with null values, create a synthetical data point holding values from a predefined inter/extrapolation method, create a synthetical data point with values calculated by a generic SQL expression, create a synthetical data point from existing ones using one or more of a linear interpolation (e.g., sum and divide), a proportional interpolation (e.g., dependent on the timely distance), and a percentile value.

In some examples, to ensure the constraints are not violated, the synthetical data points are injected before to the ingestion step where new data points become visible to queries in the database system. Typically, this means before to the page/segment/data file creation but not necessarily before indexing, etc.

In some examples, data points arrive in strict ascending (by time) order: This means that that a missing data point is not hiding in older data. On every new data point that arrives, the database system (e.g., a processing module) can check the delta to the last data point and, if needed, calculate a synthetical data point to fill a potential gap.

In some examples, ascending data points arrive in parallel via multiple streams: In this case the database system can utilize a bloom filter on the received times in every, parallel data receiving agents tracking which times have been seen already. When enough data is received and a segment/page/data file is to be created by one of the agents, all the bloom filter arrays can be checked if a missing data point has been seen in a parallel stream. When the missing data point can not be found and at least one higher value was found in every bloom filter array, the database system determines that the data point is missing and creates a synthetical data point. (Likewise, calculation can be started if the next time interval—as specified in the constraint—has expired.)

In some examples, data arrives without being ordered by time (e.g., in a parallel batch load scenario). In this case, the already received data must be searched for missing data points every time a batch of data was loaded and missing data points are to be created before this data batch becomes visible. Synthetical data points are marked in a hidden column so they can be replaced with real data points when they arrive. Data replication to other targets must be stopped until the whole batch load operation is completed for consistency reasons. If data arrives without being ordered by time but not as part of a finite operation, data replication to other targets must ensure the replacement of synthetical data points when the real ones arrive too. In an example, this is performed using idempotency keys.

In some examples, the database system tracks which data points/rows are synthetical ones, which allows the database system to filter them out again, if needed. For example, the database system filters out the synthetical records to determine various diagnostics about the database system (e.g., event emitting, verifying interpolation precision, etc.).

In some examples, tracking the synthetic records (or portions thereof (e.g., a column of the row associated with the record)) includes one or more of an implicit Boolean column to keep track (e.g., hidden or regular), a hash set that contains the timestamps the database system has actually received, and a flag in the timestamp data type.

In some examples, the time series data is complex (e.g., date and time in two columns). In this case, the database system implements density constraints for complex keys.

In some examples, the database system reduces the overhead for calculating missing values (and filling gaps) by performing the constraint fulfillment "just-in-time". As an example, each table with constraints has a timestamp or segment identifiers for which constraint fulfillment (e.g., gap detection and filling of missing values) has been performed. When a new query is executed by the system (involving such a table), the system checks if there are segments associated with fulfillment of the query for which gap detection and filling of missing values has not been completed. If the system identifies a segment that has not had the constraint fulfillment performed, the database system can initiate constraint fulfillment for this identified segment right before query execution starts. This can be combined with a normal scheduling mechanism, which does these checks and calculations in regular intervals.

These, along with other various embodiments of storing measurements deterministically such as gap filling measures, reduce complexity in fulfilling accurate queries, ensure a value is present that more accurately reflects measured data, and provide numerous other improvements as will be discussed in one or more subsequent Figures.

Figure 25B:
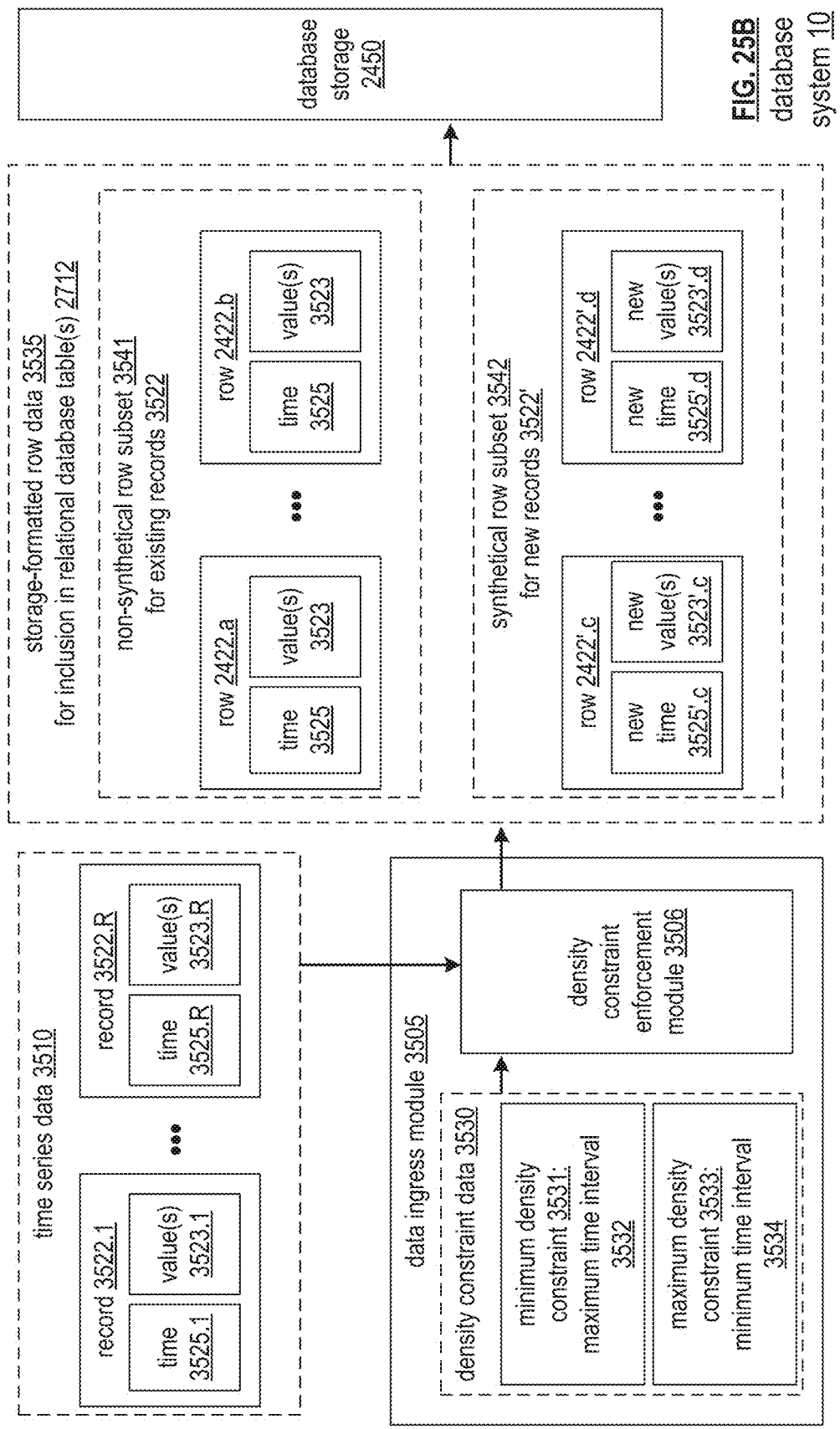
FIG. 25B is a schematic block diagram of a database system enforcing a density constraint on time series data in accordance with various embodiments.

FIG. 25B is a schematic block diagram of a database system enforcing a density constraint on time series data in accordance with various embodiments. Some or all features and/or functionality of the database 10 of FIG. 25B can be utilized to implement any embodiment of database system 10 described herein. In an example, the data ingress module 3505 can be implemented by a query processing module 2435.

In various embodiments, the data ingress module 3505 operates to ensure a record exists for each time in a time period associated with time series data 3510, that includes records 3522.1 through 3522.R. In an example, the time series data 3510 is data records that include a time 3525, which may include one or more of a date value (e.g., year, month, day), a time value, a time offset value (e.g., UTC offset), a date format value, and a time format value. The data records 3522 also include one or more value(s) 3523, which may be any data associated with a corresponding time 3525. For example, the value 3523 includes frames of a security video as time elapses. In an example, each frame corresponds to a time of a set of times of the time period. As another example, the value 3523 indicates a valve pressure of a valve being monitored. As yet another example, the value(s) 3523 include a first value that indicates the speed of a delivery drone for delivering packages, a second value that indicates a latitude/longitude data value of a location of the delivery drone, and a third value that indicates a current battery voltage for the delivery drone.

In an example, ensuring a record exists is based on density constraint data 3530, which defines a maximum time interval 3532 based on a minimum density constraint 3531. In another example, ensuring a record exists for the time series data 3510 is based on a maximum density constraint 3533 which defines a minimum time interval 3534 for the time series data 3510. The generate density constraint enforcement module 3506 compares the time series data 3510 to the density constraint data 3530 to maintain a desired density of the time series data 3510. For example, density constraint data 3530 indicates a minimum density constraint that a maximum time interval is every second. Thus, the density constraint enforcement module 3506 operates to ensure that each of the records of the time series data 3510 only include a record for every second.

When the density constraint enforcement module 3506 analyzes the time series data 3510 and does not find a record for a particular time (e.g., 15:35:32, 15:35:34, 15:35:35) that should be present according to the density constraint data 3530, the density constraint enforcement module 3506 determines that a data record is missing (e.g., 15:35:33) from the time series data 3510 and generates a new data record 3522' that includes synthetic value(s) for time 3525 and measured value(s) 3523. When the density constraint enforcement module 3506 analyzes the time series data 3510 and finds multiple records for a particular time (e.g., a record at 15:35:33.0, 15:35:33.5, 15:35:34.0), the density constraint enforcement module 3506 determines, based on the maximum time interval 3532, that the data records need to be merged, moved, and/or excluded from the time series data 3510. For example, the density constraint enforcement module 3506 determines to delete the record at 15:35:33.5. As another example, the density constraint enforcement module 3506 determines to store the record at 15:35:33.5 apart from the relational database table 2712. As yet another example, the density constraint enforcement module 3506 determines to merge the record at 15:35:33.5 with the record at 15:35:33.0 to generates a new data record 3522' that includes synthetic value(s) 3523 for times 3525 and/or value(s) 3523.

In an example, the new record 3522' may include a measured value and a synthetic value. In some examples, the merging may include one or more of averaging, combining, weighting, multiplying and other functions. For example, value(s) 3523 from the records 3522 are averaged by added the records together and dividing the total by two. As another example, frame data from a first record 3522 is combined with frame data from a second record, where unchanged frame data is constant (e.g., the same) and changed frame data is weighted based on a weighting function applied to x frames of previous data from x number of previous records 3522 to estimate a value for the changed frame data.

The data ingress module 3505 then generates synthetical row subset 3542 for new records 3522' that include rows 2422'.c through 2422'.d, which include new times 3525' and new values 3523'. In an example, the data ingress module stores these records distinctly from the non-synthetical row subset 3541 (e.g., measured values) for existing records 3522, which can include rows 2422.a through 2422.b. Storing distinctly includes one or more of including a flag within the new record, including a hidden column with the record, storing the new records in a different portion of memory of the database storage 2450, and storing the new records apart from the non-synthetical row subset 3541 within the relational database table(s) 2712. In an example, existing records 3522 include previous records that include measured (e.g., non-synthetical) values and records within time series data 3510 that include measured values.

Figure 25C:
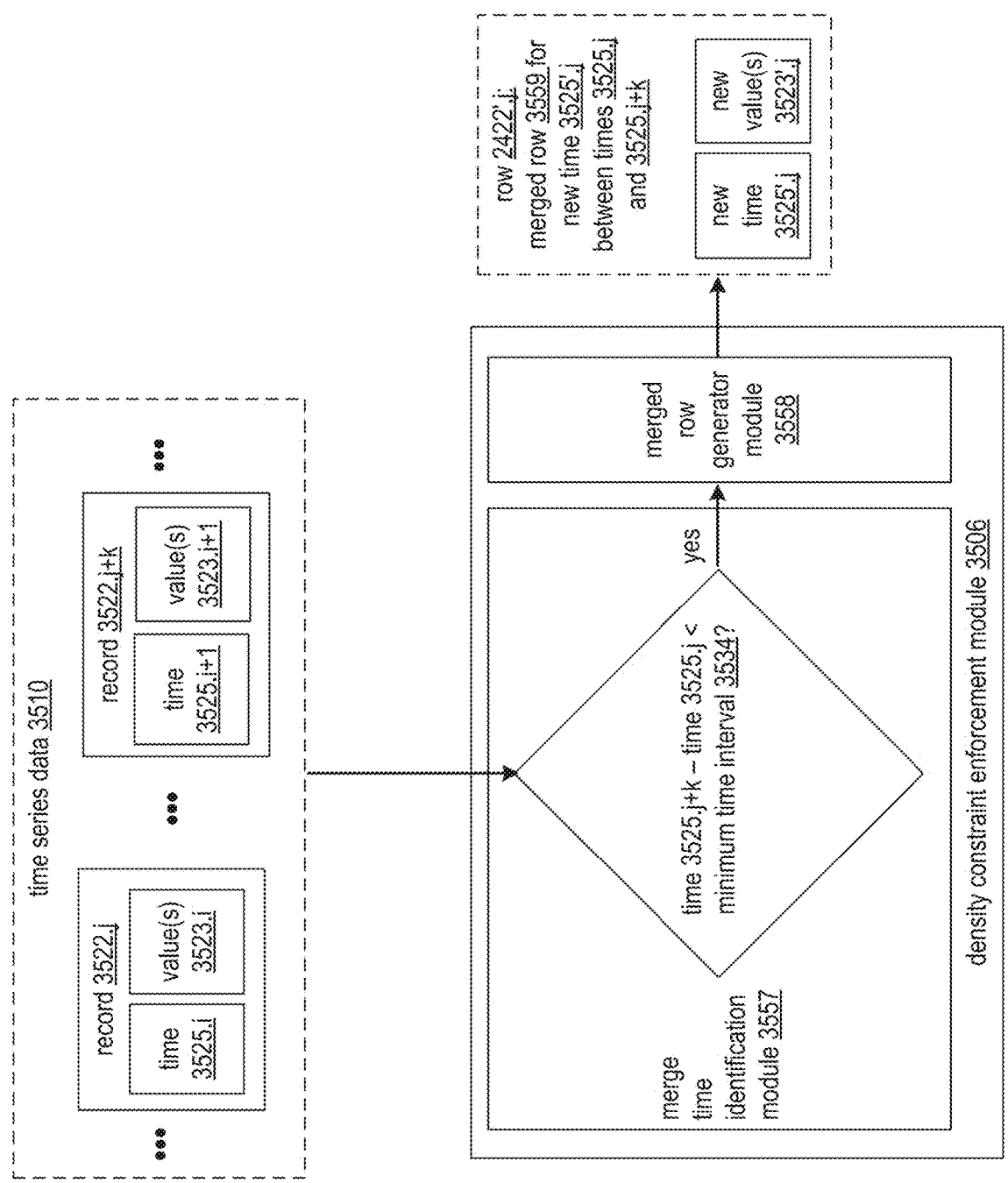
FIG. 25C is a schematic block diagram of a data ingress module for enforcing a density constraint on time series data in accordance with various embodiments.

FIG. 25C is a schematic block diagram of a data ingress module 3505 that includes a density constraint enforcement module 3506 in accordance with various embodiments. The density constraint enforcement module 3506 includes merge time identification module 3557 and a merged row generator module 2588. The density constraint enforcement module 3506 operates to merge two or more rows of data records for time series data 3510 into a single row of time series data based on a density constraint (e.g., a minimum time interval 3534).

In an example of operation, the density constraint enforcement module 3506 obtains (e.g., generates, receives, etc.) time series data 3510, which contains a plurality of records 3522.j through 3522.j+k. Each of the records 3522 includes a time 3525 (e.g., timestamp, date and time of day, etc.) of a particular time period for the time series data 3510 and more and more values associated with the corresponding time. Note in some examples, the records are not received in chronological order (e.g., batch records, received in parallel, etc.) and the data ingress module organizes the records 3522 based on the time associated with each record for the data records received in a particular time period.

The merge time identification module 3557 determines whether any two or more of the times 3525 associated with the records 3522 are less than a minimum time interval 3534 based on density constraint data associated with the time series data 3510 and/or the database system 10. For example, the merge time identification module 3557 subtracts a first time of a first record 3522 from an adjacent time (e.g., next time (e.g., a second time)) of an adjacent record (e.g., closest time in time series data to the first record) and determines whether the difference between the first time and the adjacent time has violated (e.g., is less than) a minimum time interval 3534. As a specific example, when the minimum time interval 3534 is one second (Is), and a difference between the first time and the adjacent time is 0.4 s, the merge time identification module 3557 determines to merge the records 3522 associated with the first time and the adjacent time.

When determining to merge the records 3522, the merged row generator module 3588 merges values for the records 3522 in violation (e.g., the first and adjacent records) to produce new row 2422'.j, which is a merged row 3559 for a new time 3525' between and/or including times 3525.j and 3525.j+k. As a specific example, the merged row generator module 3588 generates a new row 2422'.j that includes a time equidistant between the first time and the adjacent time, and averages values 3523 between the records 3522.j and 3522.j+k. As another example, the merged row generator module 3558 determines, for a set of 10 records in violation (e.g., a record every 0.1 s from 0.0 s to 0.9 s), to merge the records into a single record by selecting one of the records (e.g., at random, based on a record source (e.g., higher confidence, oldest data source, additional security verification, etc.), closest to desired time interval, etc.). For example, the merged row generator module takes a record associated with a time of 0.5 s, when the record is associated with a highest confidence value and merged row generator also takes the data values from the record as the new row 2422'.

Figure 25D:
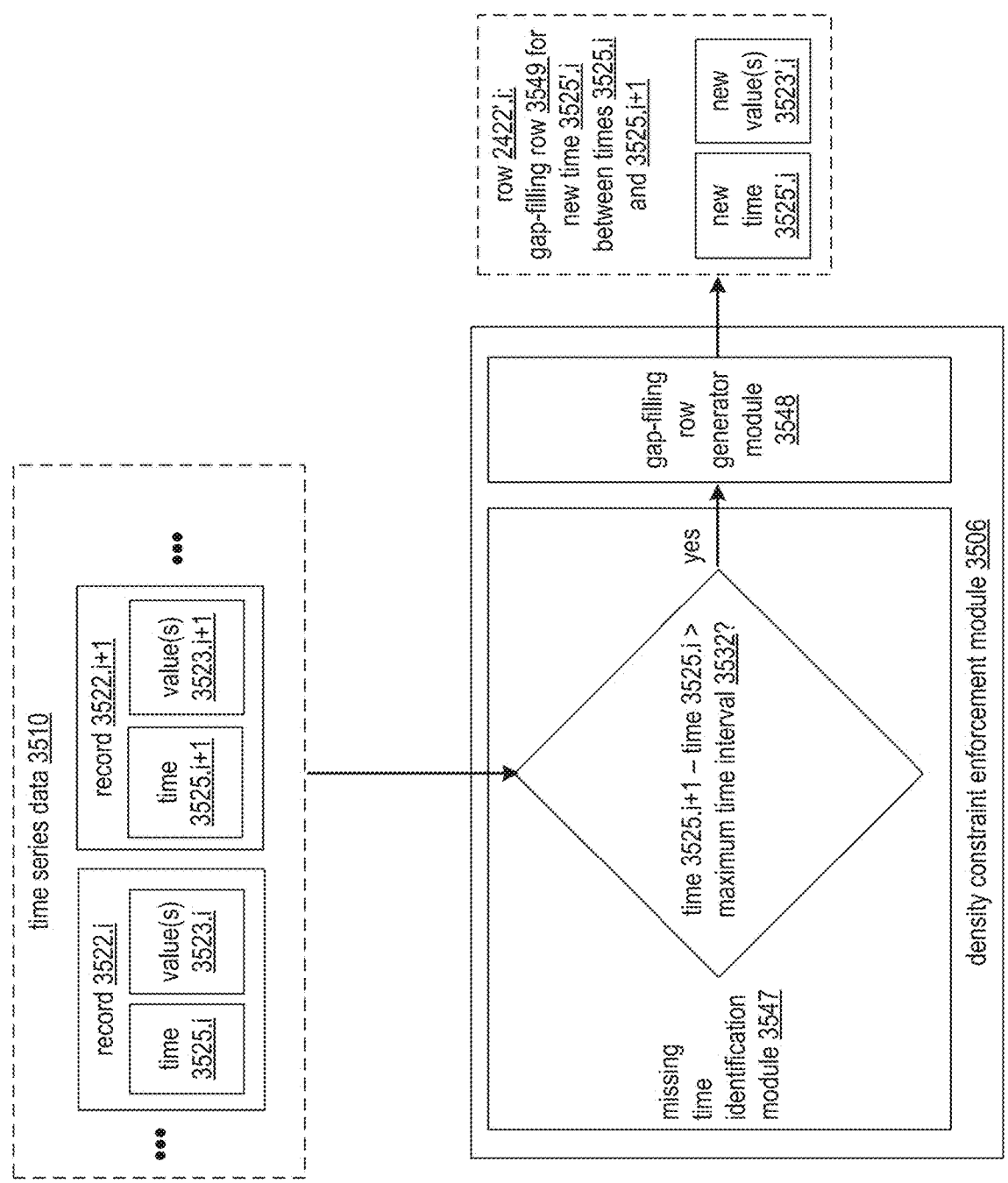
FIG. 25D is a schematic block diagram of a data ingress module for enforcing a density constraint on time series data in accordance with various embodiments.

FIG. 25D is a schematic block diagram of a data ingress module 3505 that includes a density constraint enforcement module 3506 in accordance with various embodiments. The density constraint enforcement module 3506 includes a missing time identification module 3547 and a gap-filling row generator module 3548. The data ingress module functions to enforce a density constraint on time series data in accordance with various embodiments.

In an example of operation, the missing time identification module 3547 obtains time series data 3510 and determines whether a difference between any two adjacent records (e.g., in time) exceeds a maximum time threshold. For example, the missing time identification module determines that a time difference between a first timestamp associated with record 3522.i and a second timestamp associated with record 3522.i+1 exceeds the maximum time threshold. When receiving an indication that time difference exceeds the maximum time threshold, the gap filling row generator module 3548 generates row 2422'.1, which is a gap-filling row 3549 for new time 3525'.i between times 3525.i and 3525.i+1.

As a specific example, times series data 3510 is regarding location of a delivery drone. A density constraint associated with time series data 3510 indicates a maximum time interval 3532 is ten seconds. Thus, time series data 3510 should include a record for every ten seconds of time that elapses. The missing time identification module 3547 determines that for the time series data received in a particular time period (e.g., the last minute, hour, the last "x" number of batches, etc.), that a time between a first record 3522.i and a second record 3522.i_1 is twenty seconds, and thus violates the maximum time interval 3532. For example, a time 3525.i of record 3522.i has a value of 12:22:20 and a time 3525.i of record 3522.i has a value of 12:22:40.

Thus, the gap-filling row generator module 3548 generates a record for time 12:22:30, where the record includes the new time 3525'.i of 12:22:30, and a new location value. For example, when the location associated with record 3522.i is the same location as the location associated with record 3522.i+1, the gap-filling row generator module 3548 generates the new value 3523'.i to be the constant location. In another example, when the location associated with record 3522.i is a different location than the location associated with record 3522.$i$+1, the gap-filling row generator module 3548 generates the new value 3523'.$i$ based on an estimation of the location for the gap-filling row 3549.

As an example, the new value 3523'.$i$ is generated based on an average of the first location and the different location. In another example, other values (e.g., velocity, acceleration, etc.) of the records 3522 are utilized to more accurately estimate the location for the record associated with the new time 3525.$i$.

Figure 25E:
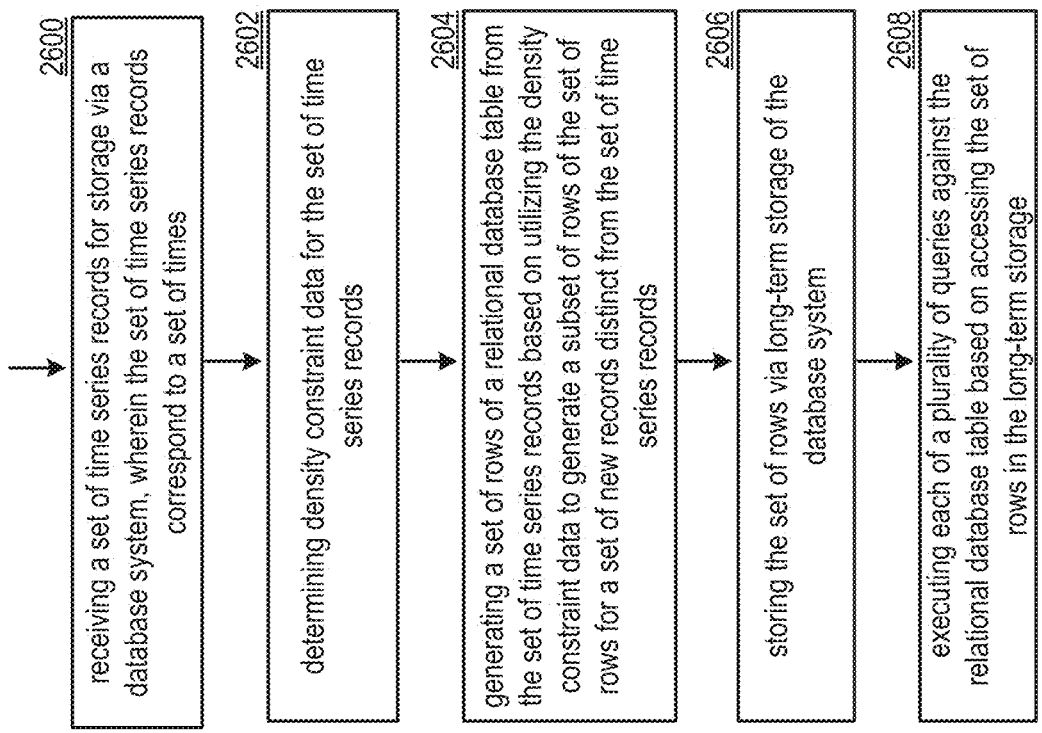
FIG. 25E is a logic diagram illustrating an example of a method for enforcing a density constraint on time series data in accordance with various embodiments.

FIG. 25E illustrates a method for execution by one or more computing entities of a database system for enforcing a density constraint on time series data in accordance with various embodiments. Step 2600 includes receiving a set of time series records for storage via a database system, wherein the set of time series records correspond to a set of times.

Step 2602 includes determining density constraint data for the set of time series records. The density constraint data indicates a time interval size, which can include a minimum or maximum time interval for at least some of the set of time series records. A minimum density constraint indicates a maximum time interval between consecutive ones of the set of rows in an ordering of the set of rows by time, and a maximum density constraint indicates a minimum time interval between consecutive ones of the set of rows in the ordering of the set of rows by time.

Step 2604 includes generating a set of rows of a relational database table from the set of time series records based on utilizing the density constraint data to generate a subset of rows of the set of rows for a set of new records distinct from the set of time series records. Based on generating the set of rows by utilizing the density constraint data, the set of rows is guaranteed to include a row for every one of a uniformly spaced set of times included in a full time period spanned by the set of times having a spacing between consecutive ones of the uniformly spaced set of times equal to the time interval size. Further, each of the set of time series records includes measurement value captured at a corresponding time of the set of times, where generating each row of the subset of rows includes generating a new measurement value (e.g., synthetical) for the each row of the subset of rows.

In an example, the subset of rows is generated to include a set of gap-filling rows (e.g., minimum density constraint violated (e.g., no records received for a time period that should have a record)), and each gap-filling row of the set of gap-filling rows is generated based on identifying a missing time in a full time period spanned by the set of times to be filled based on the density constraint data and generating the each gap-filling row for the missing time.

In another example, the subset of rows is generated to include a set of merged rows, where each merged row of the set of merged rows is generated based on identifying multiple consecutive times in the set of times to be merged as a single time based on the density constraint data (e.g., a maximum density constraint violated (e.g., more records received for a time period than should have been received based on the minimum time interval)) and generating the each merged row for the single time.

In an example, each of a second subset of rows of the set of rows are generated directly from a corresponding one of the set of time series records, and the subset of rows and the second subset of rows are mutually exclusive and collectively exhaustive with respect to the set of rows. In some examples, the relational database table is generated to include a plurality of columns that includes one or more of a time column, at least one measured and/or synthetic value column, and a synthetic row tracking column denoting whether each row of the set of rows corresponds to a new record of the set of new records (e.g., a column of the row includes a synthetic value) or an original record of the set of time series records.

In some examples, the method includes receiving a time series record for storage via the database system, where the time series record corresponds to a time within the set of times, and replacing a first new record of the set of new records with the received time series record in the long-term storage, wherein the synthetical row tacking column associated with the time series record includes a denotation that the received time series record is an original record. In an example, the synthetical row tacking column is a hidden column.

Step 2606 includes storing the set of rows via long-term storage of the database system. For example, the set of rows are sent, in parallel, to a plurality of nodes of the database system for storage therein.

Step 2608 includes executing each of a plurality of queries against the relational database table based on accessing the set of rows in the long-term storage. In some embodiments, the generating the set of rows includes generating a second subset of rows of the set of rows based on the received set of time series records, where the second subset of rows correspond with time series records of the set of times series records that were actually received, and, upon receiving a query of the plurality of queries, generating the subset of rows, where the subset of rows include synthetic data generated to replace missing time series records of the set of time series records (e.g., records that should have been received for the time series data). In an example, the subset of rows only includes rows associated with the query. In another example, the subset of rows includes rows associated with more rows (e.g., anticipated, related, within a time period from rows associated with the query, etc.) than just the rows associated with the query up to all the missing time series records.

In some embodiments, the method further includes determining the set of time series records are received in an ascending by time order, determining based on the density constraint data and at least some of the received set of time series records that a time series record that should be included in the set of time series records is missing, and generating a new record of the set of new records, wherein the new record includes a synthetic data point, and wherein the new record is inserted into the set of rows based on the time series record and in accordance with the ascending by time order.

In some embodiments, the method further includes determining the set of time series records are received in parallel via multiple streams, and determining, based on the density constraint data and bloom filter arrays associated with the multiple streams, that a time series record of the set of time series records is missing. The method further includes generating a new record of the set of new records, where the new record includes a synthetic data point, and the new record is inserted into the set of rows based on the time series record and in accordance with a time associated with the missing time series record.

In some embodiments, the method further includes determining the set of time series records are received in parallel and as a batch load, and ordering, the set of time series records, in accordance with the density constraint data. The method further includes determining, based on the ordered set of time series records, that a time series record is missing, and generating a new record of the set of new records, where the new record includes a synthetic data point, and the new record is inserted into the set of rows based on the time series record and in accordance with a time associated with the missing time series record.

In some embodiments, the set of times include a first column of a corresponding time series records of the set of time series records, where the first column includes a calendar date, and a second column of the corresponding time series record, where the second column includes a time of the set of times. In some examples, the density constraint data is based on a composite key.

In some embodiments, the method of FIG. 25E further includes each of a second subset of rows of the set of rows are generated to include the at least one value from a corresponding one of the set of time series records, where the second subset of rows correspond with time series records of the set of time series records that include a measured value. In an example, the subset of rows and the second subset of rows are mutually exclusive and collectively exhaustive with respect to the set of rows.

In an example, a query resultant for a query of the plurality of queries is generated in conjunction with execution of the query based on accessing and processing the at least one value for at least some of the second subset of rows. In an example, the query resultant is further based on accessing and processing the at least one synthetical value for at least some of the subset of rows.

In various embodiments, any one of more of the various examples listed above are implemented in conjunction with performing some or all steps of FIG. 25E. In various embodiments, any set of the various examples listed above can be implemented in tandem, for example, in conjunction with performing some or all steps of FIG. 25E, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25E described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 25E, for example, in conjunction with further implementing any one or more of the various examples described above.

In various embodiments, the operational instructions, when executed by the at least one processor, cause the database system to: receive a set of time series records for storage via a database system, wherein the set of time series records correspond to a set of times; determine density constraint data for the set of time series records; generate a set of rows of a relational database table from the set of time series records based on utilizing the density constraint data to generate a subset of rows of the set of rows for a set of new records distinct from the set of time series records; store the set of rows via long-term storage of the database system; and execute each of a plurality of queries against the relational database table based on accessing the set of rows in the long-term storage.

Figure 25F:
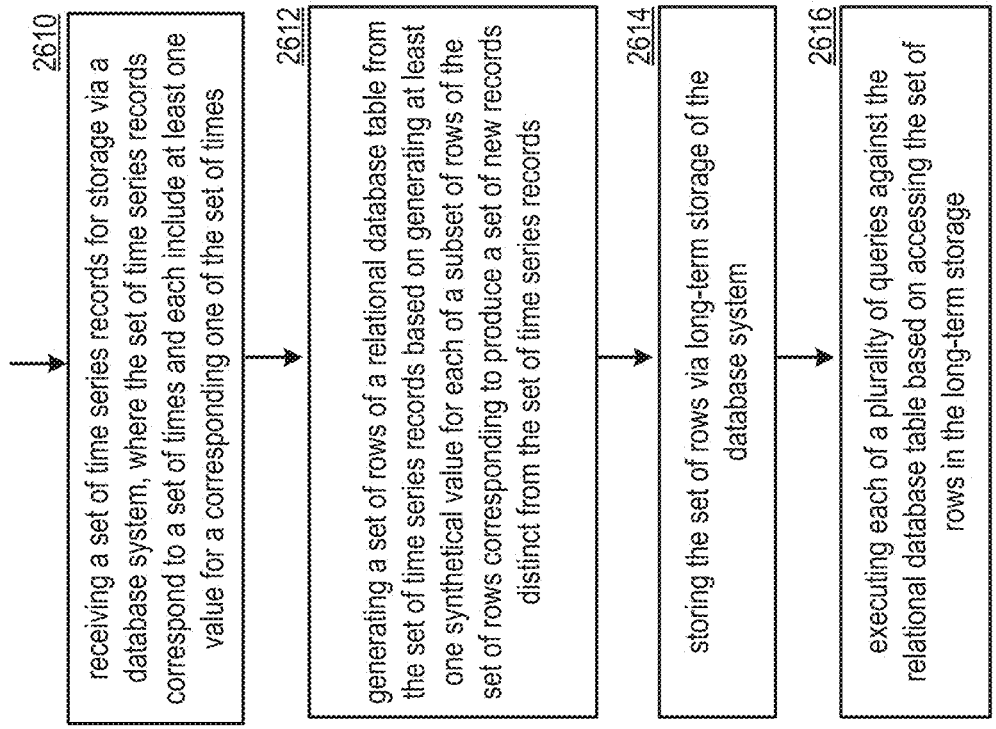
FIG. 25F is a logic diagram illustrating an example of a method for enforcing a density constraint on time series data in accordance with various embodiments.

FIG. 25F illustrates a method for execution by one or more computing entities of a database system for enforcing a density constraint on time series data in accordance with various embodiments.

Step 2610 includes receiving a set of time series records for storage via a database system, where the set of time series records correspond to a set of times within a time period and each includes at least one value for a corresponding one of the set of times. In an example, the set of time series records is identified to have at least one missing record corresponding to a time of the set of times.

Step 2612 includes generating a set of rows of a relational database table from the set of time series records based on generating at least one synthetical value for each of a subset of rows of the set of rows corresponding to produce a set of new records distinct from the set of time series records. In an example, the subset of rows is generated to include a set of gap-filling rows, where each gap-filling row of the set of gap-filling rows is generated based on identifying a missing time in a full time period spanned by the set of times to be filled based on density constraint data associated with the set of time series records, and generating the at least one synthetical value for the each gap-filling row for the missing time based on applying a missing time filling strategy.

In an example, the missing time is identified between two consecutive times of the set of times spanning a time interval greater than a maximum time interval indicated in the density constraint data. The applying the missing time filling strategy includes one or more of generating the each gap-filling row to include default values as the at least one synthetical value, generating the each gap-filling row to include null values as the at least one synthetical value, generating the each gap-filling row based on computing the at least one synthetical value via one of: a interpolation method or a extrapolation method, and generating the each gap-filling row based on computing the at least one synthetical value via executing a generic SQL expression.

In an example, the interpolation or extrapolation method is one of a pre-defined interpolation or extrapolation. In some examples, determining the pre-defined interpolation or extrapolation is based on one or more of, determining how many data records are missing, determining in a pseudo-random fashion, determining how many consecutive data records are missing, etc. For example, the interpolation method includes utilizing a first interpolation type when the missing time is adjacent to another missing time of the full time period. As another example, the interpolation method includes utilizing a second interpolation type when the missing time is not adjacent to another missing time of the full time period. As another example, the extrapolation method includes utilizing a first extrapolation type based on a number of missing times of the set of times exceeding a threshold for a subset of times of the set of times. As yet another example, the extrapolation method includes utilizing a second extrapolation type based on the number of missing times exceeding a second threshold for the subset of times.

In an example, the interpolation includes a type of one of a spline interpolation, a polynomial interpolation, a linear interpolation, a mimetic interpolation, a piecewise constant interpolation, and an inverse distance weighted interpolation. In some examples, the extrapolation includes a type of one of a conic extrapolation, a polynomial extrapolation, a linear extrapolation, and a French curve extrapolation.

In some examples, the subset of rows is generated to include a set of merged rows, and where each merged row of the set of merged rows is generated based on identifying multiple consecutive times in the set of times to be merged as a single time based on the density constraint data, and generating the at least one synthetical value for the each merged row for the missing time based on applying a time merging strategy.

In some examples, the applying the time merging strategy includes one or more of generating the each merged row to include default values as the at least one synthetical value, generating the each merged row to include null values as the at least one synthetical value, generating the each gap-filling row based on computing the at least one synthetical value via one of: a predefined interpolation method or a predefined extrapolation method, and generating the each gap-filling row based on computing the at least one synthetical value via executing a generic SQL expression.

In some examples, the applying the time merging strategy includes generating the each merged row from at least one value of multiple records corresponding to the multiple consecutive times based on computing the at least one synthetical value based on one or more of applying linear interpolation to the at least one value of multiple records corresponding to the multiple consecutive times, applying proportional interpolation to the at least one value of multiple records corresponding to the multiple consecutive times, and computing a percentile value from the at least one value of multiple records corresponding to the multiple consecutive times.

Step 2614 includes storing the set of rows via long-term storage of the database system. For example, the set of rows are sent, in parallel, to a plurality of nodes of the database system for storage therein.

Step 2616 includes executing each of a plurality of queries against the relational database table based on accessing the set of rows in the long-term storage. The queries, being executed against the relational database table as generated by one or more of the previous examples described herein, is able to be executed with less complexity, in a faster time frame, which provides numerous benefits (e.g., more accurate queries, etc.) to the database system.

In some embodiments, the method of FIG. 25F further includes determining density constraint data for the set of time series records, wherein the density constraint data includes a minimum density constraint indicating a maximum time interval between consecutive ones of the set of rows in an ordering of the set of rows by time, and a maximum density constraint indicating a minimum time interval between consecutive ones of the set of rows in the ordering of the set of rows by time.

In some embodiments, the method of FIG. 25F further includes each of a second subset of rows of the set of rows are generated to include the at least one value from a corresponding one of the set of time series records, wherein the second subset of rows correspond with time series records of the set of time series records that include a measured value. In an example, the subset of rows and the second subset of rows are mutually exclusive and collectively exhaustive with respect to the set of rows.

In an example, a query resultant for a query of the plurality of queries is generated in conjunction with execution of the query based on accessing and processing the at least one value for at least some of the second subset of rows. In an example, the query resultant is further based on accessing and processing the at least one synthetical value for at least some of the subset of rows.

In various embodiments, any one or more of the various examples listed above are implemented in conjunction with performing some or all steps of FIG. 25F. In various embodiments, any set of the various examples listed above can be implemented in tandem, for example, in conjunction with performing some or all steps of FIG. 25F, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25F described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 25F, for example, in conjunction with further implementing any one or more of the various examples described above.

In various embodiments, the operational instructions, when executed by the at least one processor, cause the database system to: receive a set of time series records for storage via a database system, wherein the set of time series records correspond to a set of times and each include at least one value for a corresponding one of the set of times; generate a set of rows of a relational database table from the set of time series records based on generating at least one synthetical value for each of a subset of rows of the set of rows corresponding to produce a set of new records distinct from the set of time series records; store the set of rows via long-term storage of the database system; and execute each of a plurality of queries against the relational database table based on accessing the set of rows in the long-term storage.

Figure 25G:
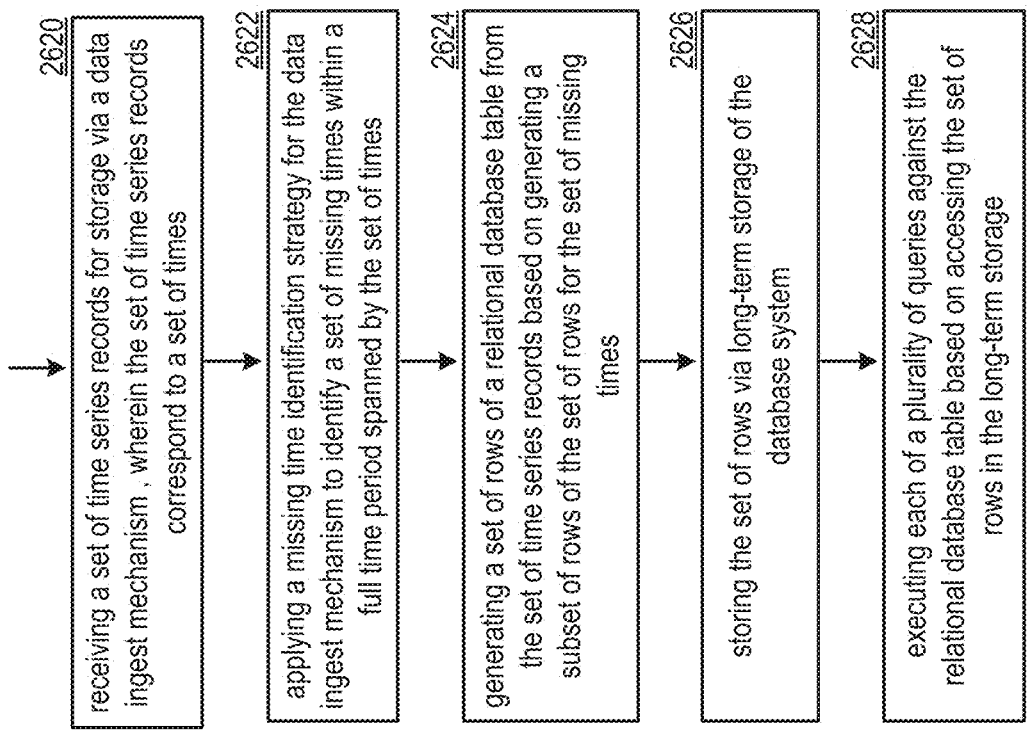
FIG. 25G is a logic diagram illustrating an example of a method for enforcing a density constraint on time series data in accordance with various embodiments.

FIG. 25G illustrates a method for execution by one or more computing entities of a database system for enforcing a density constraint on time series data in accordance with various embodiments.

Step 2620 includes receiving a set of time series records for storage via a database system via a data ingest mechanism, wherein the set of time series records corresponds to a set of times. Step 2622 includes applying a missing time identification strategy for the data ingest mechanism to identify a set of missing times within a full time period spanned by the set of times. Step 2624 includes generating a set of rows of a relational database table from the set of time series records based on generating a subset of rows of the set of rows for the set of missing times.

In an example, the data ingest mechanism corresponds to a single time-ordered streaming ingest mechanism, and the applying the missing time identification strategy includes, based on the set of time series records being received one at a time in a single record stream in order by time of the set of times via the single time-ordered streaming ingest mechanism.

In an example, for each next record received in the single record stream, the method includes determining whether a corresponding next time of the set of times corresponding to the each next record is greater than a predetermined maximum time interval from a previous time of the set of times corresponding to an immediately prior record received in the single record stream. When the corresponding next time is determined to be greater than a predetermined maximum time interval from the previous time, the method further includes identifying a new missing time of the set of missing times between the corresponding next time and the previous time and generating a new row of the subset of rows for the new missing time.

In some examples, the data ingest mechanism corresponds to a parallelized time-ordered streaming ingest mechanism, and the applying the missing time identification strategy includes, based on the set of time series records being received across a plurality of parallelized record streams that each receive a corresponding subset of the set of time series records one at a time in order by time of the set of times via the parallelized time-ordered streaming ingest mechanism. The method further includes maintaining, for each parallelized record stream of the plurality of parallelized record streams, a bloom filter for received ones of a corresponding subset of a set of times for the corresponding subset of the set of time series records included in the each parallelized record stream. The method further includes determining to create a data structure from a received subset of records included in the set of records received across the plurality of parallelized record streams in conjunction with preparing the received subset of records for the long-term storage based on a size of the received subset of records meeting predetermined data structure generation size criteria. The method further includes accessing all bloom filters for all of the plurality of parallelized record streams to identify at least one new missing time of the set of missing times for the received subset of records. The method further includes creating the data structure to include rows for the received subset of records and at least one additional row for the at least one new missing time, where the received subset of records are stored in long-term storage based on creation of the data structure.

In some examples, the data ingest mechanism corresponds to an unordered batch ingest mechanism, and the applying the missing time identification strategy includes, based on the set of time series records being received in an unordered batch of records, searching the unordered batch of records to identify the set of missing times, and creating at least one data structure in conjunction with preparing the received subset of records for the long-term storage set of rows of a relational database table from the set of time series records based on generating the subset of rows of the set of rows for the set of missing times.

In an example, the set of time series records are received as the unordered batch of records in a first temporal period, and the method further includes tracking the set of missing times in the long-term storage, receiving a second set of time series records as a second unordered batch of records in a second temporal period strictly after the first temporal period, and searching the second unordered batch of records to identify a second set of missing times. Based on tracking of the set of missing times in the long-term storage, the method further includes searching the second unordered batch of records to identify at least one record of the second unordered batch of records that corresponds to at least one of the set of missing times identified for the unordered batch of records received in the first temporal period, and replacing at least one row of the subset of rows with a new row corresponding to the at least one record of the second unordered batch of records in the long-term storage.

In some examples, the missing time identification strategy includes, when a particular time of the set of times includes both a measured value and a synthetic value, discarding the synthetic value; and generating a second subset of rows of the set of rows to include the measured value for the particular time. In some examples, the missing time identification strategy includes, when a particular time of the set of times includes two separate values for two time series records of the set of records, generating a synthetic value based on the two separate values, and inserting the synthetic value into a row of the set of rows that corresponds to the particular time. In an example, the generating the synthetic value includes averaging the two separate values to create an average value as the synthetic value. In an example, the averaging the two separate values further includes selecting a function from a set of functions, where the function is selected based on a type of value associated with each value of the two separate values. In an example, the type includes one of a measured value type, and a synthetic value type.

In some embodiments, the relational database table includes a synthetical row tracking column denoting whether each row of the set of rows corresponds to a new record of the set of new records or an original record of the set of time series records.

The method may further includes tracking the set of missing times by identifying the subset of rows as synthetical rows based on setting a Boolean value in the synthetical row tracking column to indicate the subset of rows correspond to synthetical rows, and identifying the at least one replacement row as a non-synthetical row includes setting the Boolean value in the synthetical row tracking column to indicate the at least one replacement row corresponds to at least one non-synthetical row.

In some embodiments, the generating a row of the subset of rows further includes generating a synthetic value for a column of the row, wherein the synthetic value is estimated based on one or more values of a particular column of a second subset of rows, and wherein the second subset of rows include measured values included in the particular column.

In some embodiments, the generating a row of the subset of rows further includes obtaining a measured value for a column of the row, wherein the measured value is included in the received set of time series records. In an example, the subset of rows and the second subset of rows are mutually exclusive and collectively exhaustive with respect to the set of rows Step 2626 includes storing the set of rows via long-term storage of the database system. For example, the set of rows are sent, in parallel, to a set of nodes of the database system for storage therein. Step 2628 includes executing each of a plurality of queries against the relational database table based on accessing the set of rows in the long-term storage. In an example, a query resultant for a query of the plurality of queries is generated in conjunction with execution of the query based on accessing and processing a second subset of rows of the set of rows, wherein the second subset of rows includes measured values associated with the received set of time series records. In an example, the query resultant is further based on accessing and processing at least one synthetical value for at least one of the subset of rows.

In some embodiments, the method further includes determining a density constraint associated with the set of times, where the density constraint indicates a predetermined maximum time interval, and determining the missing time identification strategy based on the predetermined maximum time interval.

In various embodiments, any one of more of the various examples listed above are implemented in conjunction with performing some or all steps of FIG. 25G. In various embodiments, any set of the various examples listed above can be implemented in tandem, for example, in conjunction with performing some or all steps of FIG. 25G, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 25G described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 25G, for example, in conjunction with further implementing any one or more of the various examples described above.

In various embodiments, the operational instructions, when executed by the at least one processor, cause the database system to: receive a set of time series records for storage via a database system via a data ingest mechanism, wherein the set of time series records correspond to a set of times; apply a missing time identification strategy for the data ingest mechanism to identify a set of missing times within a full time period spanned by the set of times; generate a set of rows of a relational database table from the set of time series records based on generating a subset of rows of the set of rows for the set of missing times; store the set of rows via long-term storage of the database system; and execute each of a plurality of queries against the relational database table based on accessing the set of rows in the long-term storage.

FIG. 26A is a schematic block diagram of a database system that functions to externally control SQL statement execution. In an example, the external control improves testing on database systems as discussed herein. In various examples, a database system can be programmed to expedite execution of SQL statements (e.g., in particular queries). However, there are situations where expediting execution is counter productive (e.g., certain instances of testing the database system) and can cause issues.

For example, a requirement in some examples of testing of the database system can include avoiding time-based synchronization, because time-based synchronization can be unreliable. However, the database system needs a way to run tests, and monitor the tests and the test results to increase accuracy of analytical data (e.g., predicted performance, measured performance, etc.) regarding the database system.

In some examples, setting up tests can include the following use cases and/or issues:

Monitoring tests: One or more test queries are actively running in the database system when retrieving monitoring information. If the query starts execution or finishes because the timing of the tests was inaccurate or incurred an error, different results may be returned—and the test code has to deal with those. Further, it is challenging to catch queries in different phases (e.g., if different monitoring data is available). For example, a query in the virtual machine (VM) may track heap consumption while a query currently being optimized may have a counter for the number of different plans analyzed so far.

Cancellation tests: One or more queries needs the be running in the database system. Further, testing cancellation during different phases (e.g., queuing, parsing, optimization, execution vs. result set fetching, etc.) can be problematic.

Precisely stress testing: generally, there are challenges in obtaining a great amount of accuracy to test a volume for certain component. For example, having many queries queued up for the scheduler to handle at once or to saturate network components to the points that TCP/IP stacks run full.

Use cases (1) and (2) above are faced with the issue of having sufficiently long running SQL statement, while use case (3) above needs very fine-grained control of execution phases of SQL statements or components. Some examples of setting up tests for the above use cases include to use complex queries and/or huge data volumes to have a longer runtime. In this example, controlling the runtime of such statements is difficult, for example, when a query produces an intermediate table of $500^4=62,500,000,000$ rows.

Further, performance improvements in the optimizer/system may make such tests fail as side effects, but such a test failure hardly indicates that the improvements are faulty (instead, the test case design is problematic to begin with). Still further, some query statements (e.g., CREATE SCHEMA) don't lend themselves for any kind of control. In some examples, tests use some sleep( ) functionality (e.g., a query statement of SELECT . . . , sleep(30) FROM . . . ). However, this comes with the usual problem of time-based synchronization: that is for robust tests, longer sleep times are used but prolong the test execution time, Also alternatively, shorter sleeps lead to brittle and flaky tests.

In some examples, the database system employs some user-defined functions (UDFs) as a hook that's invoked during query execution. This hook can be used to wait for conditions (e.g., rows inserted/modified in some other table or events stored in the file system). However, in this example, other relational tables of the database system cannot be used if the database system employs snapshot isolation because concurrent changes will not become visible. The UDF could establish a new SQL connection to circumvent this issue, but this requires handling of credentials. Further, using the file system for the synchronization is problematic in distributed database systems because a shared file system is needed if it cannot be controlled what is executing on which node. Furthermore, having node-specific control may be problematic (e.g., for testing cancellation behavior in different parts of the system). Still further, if a shared file system is used, paths have to be handled, increasing overhead. Even further, management of the file system state is required (including collision avoidance).

In an example of implementation of improving testing on database systems via external control for SQL statement execution, the database system performs one or more of the following steps.

(1) create a new database object. For example: CREATE LATCH <name><parameters>.

(2) in an SQL session (S1) where SQL statement execution shall be synchronized, subscribe to the LATCH object: SUSPEND AT LATCH <name>.

(3) in S1, start the SQL statement execution, which runs until the conditions defined in <parameters> are met. At this point, the SQL statement execution is halted (e.g., suspended) in the database engine.

(4) in another SQL session (S2), monitor the LATCH object (e.g., utilizing a vtable) to determine whether the SQL statement execution in S1 has reached the desired conditions.

(5) in S2, instruct the LATCH object to resume any suspended SQL statement execution when the desired conditions are found.

(6) in S1, the resumed statement execution runs until encountering the next condition in LATCH.

Some examples of an SQL expression for use in testing database systems include:

CREATE LATCH <name><parameters>
ALTER LATCH <name><new-parameters>
DROP LATCH <name>
SUSPEND AT LATCH <name>
RESUME LATCH <name>[<specific-condition>]

The parameters for the SQL LATCH expressions can include a <name> parameter. This is a unique name identifying the database object to be used for synchronization of SQL statement execution across SQL sessions. The parameters for the SQL LATCH expressions can further include a <parameters> parameter and a <new-parameters> parameter. These parameters can include conditions such as custom definitions of locations in the source code, identifying where SQL statement execution shall be suspended. In an example, these parameters may specify one or more source code locations. In an example, the parameters are logical names (e.g. "optimization complete"). In another example, the parameters include more specific function names. Note that the source code is specifically instrumented at those locations.

In an example, SQL statement execution will be suspended at the first source code location identified by a condition that is encountered. Upon resuming the execution, the SQL statement execution continues until it reaches the next source code location or the statement execution finishes.

The parameters for the SQL LATCH expressions can further include a <specific-condition> parameter. This specific condition specifics a source code location at which a waiting queries will resume processing. In some examples, SQL expressions for the monitoring of the testing of the database systems include CREATE EXEC_SYNC and SUSPEND AT EXEC_SYNC, and then kicks of the execution of the SQL statement. After kicking of statement execution, the test driver may need to know that statement execution has indeed reached the synchronization point (defined in <conditions>). Thus, some monitoring infrastructure needs to be included in the test in order to ensure the synchronization point was reached.

In some examples, the database system uses system tables (e.g., a vtable) to externalize state information. In an example, the vtable is the infrastructure also utilized for externalizing which SQL statement execution is currently suspended at which source code location. An example of an SQL query expression for monitoring includes:

SELECT *
FROM sys.statement_execution suspension_status
WHERE exec_name=<name>

In this example, the implementation of the monitoring is done with substantially no additional overhead (e.g., <5%, <0.1%, etc.). This is because the source code is already being instrumented for suspending execution. Thus, once a suspension request has been detected, monitoring information can be externalized.

For example, suspending SQL statement execution after statement optimization could be implemented by the following expressions:

TKTOptimizer::optimize( . . . ) {
  preOptimize( );
  optimize( );
  postOptimize( );
  if (shallSuspendAfterOptimizationo) {
    populateMonitoringDataForSuspensiono;
    waitForResume( );
  }
}

Note that without a suspension request, the additional check (e.g., in shallSuspendAfterOptimization( )) is the only added overhead. And this can be minimized because <parameters> are known during CREATE LATCH, and this can be populated into the connection-specific configuration setting during the execution of SUSPEND AT LATCH. Thus, the condition check can be the lookup of a simple Boolean value. In an example, this Boolean value does not require atomic memory access. For example, the Boolean value toggles between true for a suspension of execution of a query and false for resuming the query after being suspended.

In examples using a distributed and highly parallel database system, an important aspect is to synchronize this Boolean value across clusters and nodes. For example, operator instances may be requested to suspend during their end-of-file (EOF) processing. When many (e.g., tens, hundreds, etc.) operator instances are active across different processes and on different machines, the Boolean value needs to be available to the clusters and the nodes running the processes. Fortunately, there is no complex synchronization needed as only the initial state has to be transmitted. In an example, the initial state is transmitted when the query execution is kicked off. Then, the transition from true to false will be transmitted when the execution of the query is suspended. Note: the communication protocol between the nodes must not be suspended so that this transition can reach all rolehostd processes on all nodes.

In some examples, the database system ensures not to suspend regular intra-cluster communication (e.g., raft protocols) during testing, at least not for a duration that may exceed configured timeouts.

In some examples, the database system enables the functionality in specific build types only (e.g., "test_release"), which can be compiled-out in production deployments. In some examples, the implementation of waitForResume( ) can be based on existing low-level mechanisms that include one or more of latches, mutexes, and monitors. A regular check for a "resume request" is done (e.g., via polling or sleeping and waiting for a notification). In some examples, a Boolean flag is sufficient to communicate the "resume request"—either for the complete LATCH object or possibly more fine-granular on the level of individual source code locations.

In an example, the waitForResume( ) does not only check for "resume requests" but also for statement cancellations, loss of connection from the client, and/or system errors, which helps the testing to not get stuck in problematic situations.

In some examples, a publish or subscribe model can be adopted for the LATCH objects. Multiple subscribers, i.e., multiple SQL sessions, can subscribe themselves to the same object using SUSPEND AT LATCH <name>. This allows all SQL statements to wait together. When RESUME LATCH is run, all statements will stop waiting and resume execution together. This allows putting targeted stress on individual components in the database kernel.

In some examples, state changes are communicated/externalized via monitoring information. For example, states include "reached suspension point X" and "finished execution". In an alternative example, the database system counts at each suspension point how many SQL statements have reached it and are suspended and for which latch. In this example, if <parameters> is defined like "suspend execution until "n" queries have reached this point", an automatic RESUME could be triggered (e.g., based on an atomic counter (note that the atomic counter would have to be synchronized across all nodes in the cluster)). This example provides the benefit that no active polling of monitoring information will be required.

In another example, the externalizing SQL statement execution includes utilizing a syntax that combines WAIT FOR LATCH and the actual SQL statement (e.g., a query or an INSERT statement). As an example, SUSPEND AT LATCH <SQL-statement>. This provides the benefit that it is inherently clear that the wait-for-latch functionality is applicable. Thus, information that the execution of this SQL statement has reached a suspension point can be communicated back to the client application using the communication channel of the SQL session.

In an example of operation of FIG. 26A, the database system creates a synchronization database object (SDO) 4020. As a specific example the synchronization data object 4202 is created by the SQL expression CREATE LATCH <name><parameters>. The SDO 4020 includes conditions 4030 for suspending execution of queries 3522-3522.$n$. In an example, the conditions 4030 are defined by the <parameters> in the SQL expression above. The conditions include one or more of a row inserting into a table, a row of a table being modified, a source code location of source code, a logical name associated with a query expression and/or phase (e.g., "optimization complete"), and a name of a function associated with execution of a query expression.

The operation continues with establishing a first session 4000. The first session 4000 is configured to apply the synchronization data object 4020 to suspend execution of the at least one executing query expression when a condition of the set of conditions for suspension of execution is detected. The first session then subscribes to the synchronization data object 4020. In an example, the first session subscribes to the synchronization data object by using an SQL expression SUSPEND AT LATCH <name>.

The first session 4000 initiates execution of one or more queries 3522-3522.$n$ via a plurality of parallelized nodes of the database system based on processing an execute query command to execute the queries issued via the first session. In some examples, one or more queries are also executed on a different session (e.g., a third session, a fourth session, etc.).

The first session 4000 executes the queries until it detects a condition 4030 of the set of conditions being met during the execution of the queries. When the condition is detected, the first session 4000 suspends execution of the queries and updates at least one relational database 4040 with monitoring data indicating suspension of the queries. The operation continues with populating a relational database table with monitoring data regarding the execution and/or suspension of the queries.

The operation continues with establishing a second session 4002. Note the second session 4002 may be established prior to, concurrent with, or after the first session. The second session 4002 accesses the monitoring data 4042 in the at least one relational database table 4040 to verify that suspension of the queries 3522 are in accordance with at least one condition 4030.

For example, the second session determines whether an SQL statement execution of a query executing in the first session has reached the desired code location as defined by the conditions 4030 in the synchronization data object 4020.

When the second session 4002 determines that the SQL statement execution was suspended in accordance with the at least one condition 4030 of the synchronization data object 4020, the second session instructs the synchronization data object 4020 to resume any suspended queries. In the first session 4000, the resumed queries then execute (e.g., run) until the resumed queries encounter the next condition 4030 of the synchronization data object 4020. For example, the resumed queries execute until they reach a second code location in the source code.

Figure 26B:
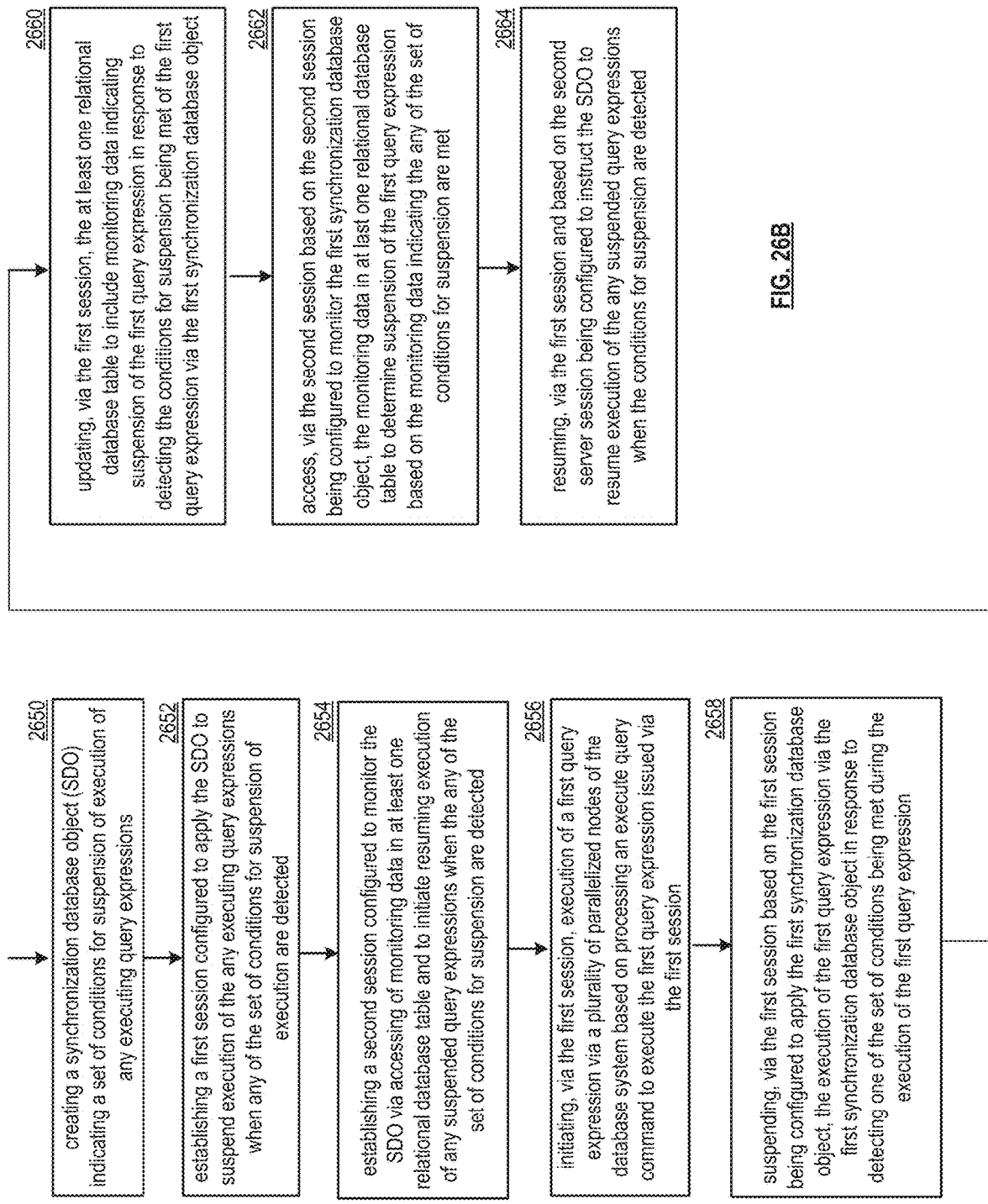
FIG. 26B is a logic diagram illustrating an example of a method for utilizing external control for SQL statement execution in accordance with various embodiments.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26B, for example, based on participating in execution of a query being executed by the database system 10. Some or all of the method of FIG. 25B can be performed by nodes executing a query in conjunction with a query execution, for example, via one or more nodes 37 implemented as nodes of a query execution module 2504 implementing a query execution plan 2405. In some embodiments, a node 37 can implement some or all of FIG. 26B based on implementing a corresponding plurality of processing core resources 48-1-48-$n$. Some or all of the steps of FIG. 26B can optionally be performed by any other one or more processing modules of the database system 10. Some or all of the steps of FIG. 26B can be performed to implement some or all of the functionality of the database system 10 as described in conjunction with FIGS. 24A-24W, for example, by implementing some or all of the functionality of query execution module 2504. Some or all steps of FIG. 26B can be performed by database system 10 in accordance with other embodiments of the database system 10 and/or nodes 37 discussed herein. Some or all of the steps of FIG. 26B can be performed in conjunction with performing some or all steps of any other method described herein.

Step 2650 includes creating a synchronization database object indicating a set of conditions for suspension of execution of at least one executing query expression. In an example of creating the synchronization data object, the database systems processes a create synchronization database object command that includes a first object name for the synchronization database object as a first configurable parameter of the create synchronization database object command and the set of conditions for suspension of execution of a query expression as a second configurable parameter of the create synchronization database object command.

In an example, the first session is configured to apply the synchronization database object based on processing a suspend command that identifies the synchronization database object based on including the first object name as a configurable parameter of the suspend command.

In an example, the second session is configured to instruct the synchronization database object to resume execution of any suspended query expressions when any condition of the set of conditions for suspension are detected based on processing a resume command that identifies the synchronization database object based on including the first object name as a configurable parameter of the resume command, and a set of conditions for resuming the execution of any suspended query expressions as a second configurable parameter of the resume command, where the set of conditions for resuming the execution of the any suspended query expressions are configured based on the set of conditions for suspension of execution of any executing query expressions.

Step 2652 includes establishing a first session configured to apply the synchronization database object to suspend execution of the at least one executing query expression when a condition of the set of conditions for suspension of execution is detected.

Step 2654 includes establishing a second session configured to monitor the synchronization database object via accessing of monitoring data in at least one relational database table and resume execution of any suspended query expressions when the condition is detected.

In some examples, the first session is implemented via a first Structured Query Language (SQL) session, and the second session is implemented via a second SQL session, where the synchronization database object is implemented as a SQL LATCH object. The synchronization database object is identified by a unique name, wherein the unique name synchronizes the execution of query expressions across a plurality of SQL sessions that include the first and second SQL sessions. In some examples, the second session also subscribes to the synchronization data object.

Step 2656 includes initiating, via the first session, execution of a first query expression via a plurality of parallelized nodes of the database system based on processing an execute query command to execute the first query expression issued via the first session.

In some examples, the set of conditions indicates a source code location, where the execution of the first query expression includes executing source code for the first query expression, and the execution of the first query expression is suspended based on reaching the source code location in the source code for the first query expression while executing the source code for the first query expression.

In some examples, the initiating execution of the first query expression includes transmitting initial execution state information to the plurality of parallelized nodes indicating an execution mode for the first query expression via a first value of a Boolean variable. The suspending execution of the first query expression includes transmitting updated execution state information to the plurality of parallelized nodes indicating a suspended mode for the first query expression via a second value for the Boolean variable flipped from the first value of the Boolean variable. The resuming execution of the first query expression includes transmitting further updated execution state information to the plurality of parallelized nodes indicating the execution mode for the query expression via the first value of the Boolean variable. Note in this example, the database system maintains a communication protocol between the plurality of parallelized nodes in an active or an unsuspended state.

Step 2658 includes suspending, via the first session based on the first session being configured to apply the synchronization database object, the execution of the first query expression via the synchronization database object in response to detecting the condition of the set of conditions being met during the execution of the first query expression.

Step 2660 includes updating, via the first session, the at least one relational database table to include the monitoring data indicating suspension of the first query expression in response to detecting the condition of the set of conditions for suspension being met of the first query expression via the synchronization database object.

Step 2662 includes accessing, via the second session based on the second session being configured to monitor the synchronization database object, the monitoring data in the at least one relational database table to verify, based on the monitoring data, that suspension of the first query expression was in accordance with the condition of the synchronization data object.

In some examples, the first query expression is executed as a test query in conjunction with running a test of database functionality, and wherein the monitoring data stored in the at least one relational database table corresponds to test data for the test. In some examples, the database system cancels the test during a particular phase of the test query, where the condition of the synchronization database object indicates the particular phase. The phase may include one or more of a queuing phase, a parsing phase, an optimization phase, a result set fetching phase, and an execution phase.

Step 2664 includes resuming the execution of the first query expression, via the first session and based on the second session being configured to instruct the synchronization data object to resume execution of the first query expression based on the verification, where the first query expression runs or executes until another condition of the set of conditions is met or the first query expression execution is finished.

In various examples, the first query expression is one of a plurality of query expressions subscribed to the synchronization data object, and wherein the plurality of query expressions are executed simultaneously, suspended simultaneously, and/or resumed simultaneously to stress test a particular component of the database system.

In some embodiments, the method further includes establishing a third session configured to apply the synchronization database object to suspend execution of a second query expression when a condition of the set of conditions for suspension of execution is detected, initiating, via the third session, execution of the second query expression via a second plurality of parallelized nodes of the database system based on processing a second execute query command to execute the second query expression issued via the third session, suspending, via the third session based on the third session being configured to apply the synchronization database object, the execution of the second query expression via the synchronization database object in response to detecting the condition of the set of conditions being met during the execution of the second query expression, and updating, via the third session, the at least one relational database table to include second monitoring data indicating suspension of the second query expression in response to detecting the condition of the set of conditions for suspension being met of the second query expression via the synchronization database object.

In some examples, the method also includes accessing, via the second session based on the second session being configured to monitor the synchronization database object, the second monitoring data in the at least one relational database table to verify, based on the second monitoring data, that suspension of the second query expression was in accordance with the condition, and resuming the execution of the second query expression, via the third session and based on the second session being configured to instruct the synchronization data object to resume execution of the second query expression, until another condition of the set of conditions is met or the second query expression execution is finished.

In some examples, the method includes receiving a set of time series records for storage in the database system, where the set of time series records correspond to a set of times. The method continues with determining density constraint data for the set of time series records, generating a set of rows of a second relational database table from the set of time series records based on utilizing the density constraint data to generate a subset of rows of the set of rows for a set of new records distinct from the set of time series records, storing the set of rows via long-term storage of the database system and executing the first query expression against the second relational database table based on accessing the set of rows in the long-term storage.

In various embodiments, any one of more of the various examples listed above are implemented in conjunction with performing some or all steps of FIG. 26B. In various embodiments, any set of the various examples listed above can be implemented in tandem, for example, in conjunction with performing some or all steps of FIG. 26B, and/or in conjunction with performing some or all steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 26B described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 26B, for example, in conjunction with further implementing any one or more of the various examples described above.

As used herein, an "AND operator" can correspond to any operator implementing logical conjunction. As used herein, an "OR operator" can correspond to any operator implementing logical disjunction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution via at least one processor of a database system, the method comprising:
   creating a synchronization database object indicating a set of conditions for suspension of execution of at least one executing query expression;
   establishing a first session configured to apply the synchronization database object to suspend execution of the at least one executing query expression when a condition of the set of conditions for suspension of execution is detected;
   establishing a second session configured to:
      monitor the synchronization database object via accessing of monitoring data in at least one relational database table; and
      resume execution of any suspended query expressions when the condition is detected;
   initiating, via the first session, execution of a first query expression via a plurality of parallelized nodes of the database system based on processing an execute query command to execute the first query expression issued via the first session;
   suspending, via the first session based on the first session being configured to apply the synchronization database object, the execution of the first query expression via the synchronization database object in response to detecting the condition of the set of conditions being met during the execution of the first query expression;
   updating, via the first session, the at least one relational database table to include the monitoring data indicating suspension of the first query expression in response to detecting the condition of the set of conditions for suspension being met of the first query expression via the synchronization database object;
   accessing, via the second session based on the second session being configured to monitor the synchronization database object, the monitoring data in the at least one relational database table to verify, based on the monitoring data, that suspension of the first query expression was in accordance with the condition; and
   resuming the execution of the first query expression, via the first session and based on the second session being configured to instruct the synchronization data object to resume execution of the first query expression based on the verification, until another condition of the set of conditions is met or the first query expression execution is finished.

2. The method of claim 1, wherein creating the synchronization database object comprises:
   processing a create synchronization database object command that includes:
      a first object name for the synchronization database object as a first configurable parameter of the create synchronization database object command; and
      the set of conditions for suspension of execution of a query expression as a second configurable parameter of the create synchronization database object command.

3. The method of claim 2, wherein the first session is configured to apply the synchronization database object based on processing a suspend command that identifies the synchronization database object based on including the first object name as a configurable parameter of the suspend command.

4. The method of claim 2, wherein the second session is configured to instruct the synchronization database object to resume execution of any suspended query expressions when any condition of the set of conditions for suspension are detected based on processing a resume command that identifies:
   the synchronization database object based on including the first object name as a configurable parameter of the resume command; and
   a set of conditions for resuming the execution of any suspended query expressions as a second configurable parameter of the resume command, wherein the set of conditions for resuming the execution of the any suspended query expressions are configured based on the set of conditions for suspension of execution of any executing query expressions.

5. The method of claim 1, wherein the set of conditions indicates a source code location, wherein the execution of the first query expression includes executing source code for the first query expression, and wherein the execution of the first query expression is suspended based on reaching the source code location in the source code for the first query expression while executing the source code for the first query expression.

6. The method of claim 1, wherein the initiating execution of the first query expression includes transmitting initial execution state information to the plurality of parallelized nodes indicating an execution mode for the first query expression via a first value of a Boolean variable.

7. The method of claim 6, wherein the suspending execution of the first query expression includes transmitting updated execution state information to the plurality of parallelized nodes indicating a suspended mode for the first query expression via a second value for the Boolean variable flipped from the first value of the Boolean variable.

8. The method of claim 7, wherein the resuming execution of the first query expression includes transmitting further updated execution state information to the plurality of parallelized nodes indicating the execution mode for the query expression via the first value of the Boolean variable.

9. The method of claim 8 further comprises:
   maintaining a communication protocol between the plurality of parallelized nodes in an active or an unsuspended state.

10. The method of claim 1, wherein the first query expression is executed as a test query in conjunction with running a test of database functionality, and wherein the monitoring data stored in the at least one relational database table corresponds to test data for the test.

11. The method of claim 10 further comprises:
    cancelling the test during a particular phase of the test query, wherein the condition of the synchronization database object indicates the particular phase.

12. The method of claim 11, wherein the particular phase comprises one of:
    a queuing phase;
    a parsing phase;
    an optimization phase;
    a result set fetching phase; and
    an execution phase.

13. The method of claim 1, wherein the first query expression is one of a plurality of query expressions subscribed to the synchronization data object, and wherein the plurality of query expressions are executed simultaneously to stress test a particular component of the database system.

14. The method of claim 1, wherein the first session is implemented via a first Structured Query Language (SQL) session, wherein the second session is implemented via a second SQL session, and wherein the synchronization database object is implemented as a SQL LATCH object.

15. The method of claim 14, wherein the synchronization database object is identified by a unique name, wherein the unique name synchronizes the execution of query expressions across a plurality of SQL sessions that include the first and second SQL sessions.

16. The method of claim 1 further comprises:
establishing a third session configured to apply the synchronization database object to suspend execution of a second query expression when a condition of the set of conditions for suspension of execution is detected;
initiating, via the third session, execution of the second query expression via a second plurality of parallelized nodes of the database system based on processing a second execute query command to execute the second query expression issued via the third session;
suspending, via the third session based on the third session being configured to apply the synchronization database object, the execution of the second query expression via the synchronization database object in response to detecting the condition of the set of conditions being met during the execution of the second query expression; and
updating, via the third session, the at least one relational database table to include second monitoring data indicating suspension of the second query expression in response to detecting the condition of the set of conditions for suspension being met of the second query expression via the synchronization database object.

17. The method of claim 16 further comprises:
accessing, via the second session based on the second session being configured to monitor the synchronization database object, the second monitoring data in the at least one relational database table to verify, based on the second monitoring data, that suspension of the second query expression was in accordance with the condition; and
resuming the execution of the second query expression, via the third session and based on the second session being configured to instruct the synchronization data object to resume execution of the second query expression, until another condition of the set of conditions is met or the second query expression execution is finished.

18. The method of claim 1 further comprises:
receiving a set of time series records for storage via a database system, wherein the set of time series records correspond to a set of times;
determining density constraint data for the set of time series records;
generating a set of rows of a second relational database table from the set of time series records based on utilizing the density constraint data to generate a subset of rows of the set of rows for a set of new records distinct from the set of time series records;
storing the set of rows via long-term storage of the database system; and
executing the first query expression against the second relational database table based on accessing the set of rows in the long-term storage.

19. A database system includes:
at least one processor; and
at least one memory storing operational instructions that, when executed by the at least one processor, causes the database system to:
create a synchronization database object indicating a set of conditions for suspension of execution of at least one executing query expression;
establish a first session configured to apply the synchronization database object to suspend execution of the at least one executing query expression when a condition of the set of conditions for suspension of execution is detected;
establish a second session configured to:
monitor the synchronization database object via accessing of monitoring data in at least one relational database table; and
resume execution of any suspended query expressions when the condition is detected;
initiate, via the first session, execution of a first query expression via a plurality of parallelized nodes of the database system based on processing an execute query command to execute the first query expression issued via the first session;
suspend, via the first session based on the first session being configured to apply the synchronization database object, the execution of the first query expression via the synchronization database object in response to detecting the condition of the set of conditions being met during the execution of the first query expression;
update, via the first session, the at least one relational database table to include the monitoring data indicating suspension of the first query expression in response to detecting the condition of the set of conditions for suspension being met of the first query expression via the synchronization database object;
access, via the second session based on the second session being configured to monitor the synchronization database object, the monitoring data in the at least one relational database table to verify, based on the monitoring data, that suspension of the first query expression was in accordance with the condition; and
resume the execution of the first query expression, via the first session and based on the second session being configured to instruct the synchronization data object to resume execution of the first query expression, until another condition of the set of conditions is met or the first query expression execution is finished.

20. A non-transitory computer readable storage medium comprises:
at least one memory section that stores operational instructions that, when executed by at least one processing module that includes a processor and a memory, causes the at least one processing module to:
create a synchronization database object indicating a set of conditions for suspension of execution of at least one executing query expression;
establish a first session configured to apply the synchronization database object to suspend execution of the at least one executing query expression when a condition of the set of conditions for suspension of execution is detected;
establish a second session configured to:
monitor the synchronization database object via accessing of monitoring data in at least one relational database table; and
resume execution of any suspended query expressions when the condition is detected;
initiate, via the first session, execution of a first query expression via a plurality of parallelized nodes of the database system based on processing an execute query command to execute the first query expression issued via the first session;

suspend, via the first session based on the first session being configured to apply the synchronization database object, the execution of the first query expression via the synchronization database object in response to detecting the condition of the set of conditions being met during the execution of the first query expression;

update, via the first session, the at least one relational database table to include the monitoring data indicating suspension of the first query expression in response to detecting the condition of the set of conditions for suspension being met of the first query expression via the synchronization database object;

access, via the second session based on the second session being configured to monitor the synchronization database object, the monitoring data in the at least one relational database table to verify, based on the monitoring data, that suspension of the first query expression was in accordance with the condition; and resume the execution of the first query expression, via the first session and based on the second session being configured to instruct the synchronization data object to resume execution of the first query expression, until another condition of the set of conditions is met or the first query expression execution is finished.

\* \* \* \* \*